United States Patent
Fan et al.

(10) Patent No.: US 11,478,747 B2
(45) Date of Patent: Oct. 25, 2022

(54) ULTRAFAST CATALYTIC $CO_2$ CAPTURE CATALYZED BY A NOVEL ULTRASOUND-TREATED IONIC LIQUID

(71) Applicant: University of Wyoming, Laramie, WY (US)

(72) Inventors: Maohong Fan, Ames, IA (US); Xiaowen Zhang, Laramie, WY (US); Yangyan Gao, Laramie, WY (US); Armistead G Russell, Atlanta, GA (US); Xin He, Laramie, WY (US)

(73) Assignees: UNIVERSITY OF WYOMING, Laramie, WY (US); GEORGIA TECH RESEARCH CORPORATION, Atlanta, GA (US)

(*) Notice: Subject to any disclaimer, the term of this patent is extended or adjusted under 35 U.S.C. 154(b) by 0 days.

(21) Appl. No.: 17/177,766

(22) Filed: Feb. 17, 2021

(65) Prior Publication Data
US 2021/0387144 A1    Dec. 16, 2021

Related U.S. Application Data

(60) Provisional application No. 63/088,880, filed on Oct. 7, 2020, provisional application No. 62/977,610, filed on Feb. 17, 2020.

(51) Int. Cl.
| | |
|---|---|
| *B01J 31/02* | (2006.01) |
| *B01D 53/86* | (2006.01) |
| *B01J 37/34* | (2006.01) |

(52) U.S. Cl.
CPC ..... *B01D 53/8671* (2013.01); *B01D 53/8693* (2013.01); *B01J 31/0278* (2013.01); *B01J 37/343* (2013.01); *B01D 2257/504* (2013.01); *B01D 2259/816* (2013.01)

(58) Field of Classification Search
None
See application file for complete search history.

(56) References Cited

FOREIGN PATENT DOCUMENTS

CN        103923015 A    *    7/2014    ........... C07D 233/56

OTHER PUBLICATIONS

Wang et al., "One-pot synthesis of N-doped carbon dots by pyrolyzing the gel composed of ethanolamine and 1-carboxyethyl-3-methylimidazolium chloride and their selective fluorescence sensing for Cr(VI) ions." Analyst (2018), vol. 143, pp. 1906-1915 (published on Mar. 7, 2018).*

(Continued)

*Primary Examiner* — Daniel Berns
(74) *Attorney, Agent, or Firm* — Goodhue, Coleman & Owens, P.C.

(57) ABSTRACT

A transformational energy efficient technology using ionic liquid (IL) to couple with monoethanolamine (MEA) for catalytic $CO_2$ capture is disclosed. [EMmim$^+$][NTF$_2^-$] based catalysts are rationally synthesized and used for $CO_2$ capture with MEA. A catalytic $CO_2$ capture mechanism is disclosed according to experimental and computational studies on the [EMmim$^+$][NTF$_2^-$] for the reversible $CO_2$ sorption and desorption.

2 Claims, 92 Drawing Sheets

(56) References Cited

OTHER PUBLICATIONS

A. K. Chakraborty, G. A. a. K. B. CO2 Absorption in Aqueous Solutions of Hindered Amines. Chemical Engineering Science. 41, 997-1003 (1986).

Boyd, P. G. et al. Data-driven design of metal-organic frameworks for wet flue gas CO2 capture. Nature 576, 21 pages (2019).

Bui, M. et al. Carbon capture and storage (CCS): the way forward. Energy & Environmental Science 11, 1062-1176 (2018).

Chatel, G. & MacFarlane, D. Ionic liquids and ultrasound in combination: synergies and challenges. Chemical Society Reviews, 29 pages (2014).

Cherepanov, P. V. et al. The use of ultrasonic cavitation for near-surface structuring of robust and low-cost AlNi catalysts for hydrogen production. Green Chemistry 17, 2745-2749 (2015).

Davran-Candan, T. DFT Modeling of CO2 Interaction with Various Aqueous Amine Structures. Journal of Physical Chemistry A 118, Abstract + supporting information: 11 pages, (2014).

Delley, B. From molecules to solids with the DMol3 approach. The Journal of Chemical Physics 113, 7756-7764 (2000).

Finnie, K. S., Cassidy, D. J., Bartlett, J. R. & Woolfrey, J. L. IR spectroscopy of surface water and hydroxyl species on nanocrystalline TiO2 films. Langmuir 17, 1292-1311 (2001).

Hidetaka Yamada, S. S., Hiromichi Okabe, Yoichi Matsuzaki, Firoz A. Chowdhury, and Yuichi Fujioka. Prediction of the Basicity of Aqueous Amine Solutions and the Species Distribution in the Amine-H2O—CO2 System Using the COSMO-RS Method. Ind. Eng. Chem. Res. 49, Abstract and supporting information: 9pages (2010).

Hong-Bin Xie, Y. Z., Yingkai Zhang, and J. Karl Johnson. Reaction Mechanism of Monoethanolamine with CO2 in Aqueous Solution from Molecular Modeling. J. Phys. Chem. A 11844-11852 (2010).

Hu, J. et al. Dual-ionic liquid system: an efficient catalyst for chemical fixation of CO2 to cyclic carbonates under mild conditions. Green chemistry, 6 pages (2018).

Huang, Y. et al. Preorganization and Cooperation for Highly Efficient and Reversible Capture of Low-Concentration CO2 by Ionic Liquids. Angewandte Chemie International Edition 56, 7 pages (2017).

Jia, X. et al. Carboxylic acid-modified metal oxide catalyst for selectivity-tunable aerobic ammoxidation. Nature communications 9, 933 (2018) 7 pages.

Köck, E.-M., Kogler, M., Bielz, T., Klötzer, B. & Penner, S. In situ FT-IR spectroscopic study of CO2 and CO adsorption on Y2O3, ZrO2, and yttria-stabilized ZrO2. The Journal of Physical Chemistry C 117, 17666-17673 (2013).

Kosa, G., Shapaval, V., Kohler, A. & Zimmermann, B. FTIR spectroscopy as a unified method for simultaneous analysis of intra-and extracellular metabolites in high-throughput screening of microbial bioprocesses. Microbial cell factories 16, 195 (2017), 11 pages.

Kubota, Y., Ohnuma, T. & Bučko, T. Carbon dioxide capture in 2-aminoethanol aqueous solution from ab initio molecular dynamics simulations. The Journal of Chemical Physics 146, 094303 1-9, (2017).

Kumar, K., Parveen, F., Patra, T. & Upadhyayula, S. Hydrothermal conversion of glucose to levulinic acid using multifunctional ionic liquids: effects of metal ion co-catalysts on the product yield. New Journal of Chemistry 42, 228-236 (2018).

Lai, Q. et al. Catalyst-TiO(OH)2 could drastically reduce the energy consumption of CO2 capture. Nature communications 9, 2672, pp. 1-7 (2018).

Li, H. C., Chai, J. D. & Tsai, M. K. Assessment of Dispersion-Improved Exchange-Correlation Functionals for the Simulation of CO2 Binding by Alcoholamines. International Journal of Quantum Chemistry 114, 805-812, (2014).

Liao, F. et al. Morphology-Dependent Interactions of ZnO with Cu Nanoparticles at the Materials' Interface in Selective Hydrogenation of CO2 to CH3OH. Angewandte Chemie International Edition 50, 2162-2165 (2011).

Liu, L. et al. Unexpected quenching effect on new particle formation from the atmospheric reaction of methanol with SO3. Proceedings of the National Academy of Sciences 116, 24966-24971 (2019).

Lu, X., Leung, D. Y., Wang, H. & Xuan, J. Microfluidics-based pH-differential reactor for CO2 utilization: A mathematical study. Applied Energy 227, Abstract (2018) 3 pages.

Lv, B., Guo, B., Zhou, Z. & Jing, G. Mechanisms of CO2 capture into monoethanolamine solution with different CO2 loading during the absorption/desorption processes. Environmental science & technology 49, 10728-10735 (2015).

Ma, R. et al. Atomic imaging of the edge structure and growth of a two-dimensional hexagonal ice. Nature 577, 60-63 (2020).

Matsuzaki, Y., Yamada, H., Chowdhury, F. A., Higashii, T. & Onoda, M. Ab initio study of CO2 capture mechanisms in aqueous monoethanolamine: reaction pathways for the direct interconversion of carbamate and bicarbonate. J Phys Chem A 117, Abstract + supporting information: 8 pages, (2013).

McDonald, T. M. et al. Cooperative insertion of CO2 in diamine-appended metal-organic frameworks. Nature 519, 17 pages (2015).

Narimani, M., Amjad-Iranagh, S. & Modarress, H. CO2 absorption into aqueous solutions of monoethanolamine, piperazine and their blends: Quantum mechanics and molecular dynamics studies. Journal of Molecular Liquids 233, Abstract: 2 pages, (2017).

Nugent, P. et al. Porous materials with optimal adsorption thermodynamics and kinetics for CO2 separation. Nature 495, 80 (2013), 5 pages.

Oxley, J. D., Prozorov, T. & Suslick, K. S. Sonochemistry and sonoluminescence of room-temperature ionic liquids. Journal of the American Chemical Society 125, 11138-11139 (2003).

Perdew, J. P., Burke, K. & Emzerhof, M. Generalized gradient approximation made simple. Physical review letters 77, 3865-3868 (1996).

Richner, G. & Puxty, G. Assessing the chemical speciation during CO2 absorption by aqueous amines using in situ FTIR. Industrial & Engineering Chemistry Research 51, 14317-14324 (2012).

Rochelle, G. T. Amine scrubbing for CO2 capture. Science 325, 1652-1654 (2009).

Rogelj, J. et al. Paris Agreement climate proposals need a boost to keep warming well below 2 C. Nature 534, 631 (2016) 10 pages.

Rosenzweig, C. et al. Attributing physical and biological impacts to anthropogenic climate change. Nature 453, 353-357 (2008).

Saeidi, S. et al. Mechanisms and kinetics of CO2 hydrogenation to value-added products: A detailed review on current status and future trends. Renewable and Sustainable Energy Reviews 80, 1292-1311 (2017).

Sanna, A., Uibu, M., Caramanna, G., Kuusik, R. & Maroto-Valer, M. A review of mineral carbonation technologies to sequester CO2. Chemical Society Reviews 43, 8049-8080 (2014).

Schmitt, F. O., Johnson, C. & Olson, A. Oxidations promoted by ultrasonic radiation. Journal of the American Chemical Society 51, 370-375 (1929).

Sokol, K. P. et al. Reversible and Selective Interconversion of Hydrogen and Carbon Dioxide into Formate by a Semiartificial Formate Hydrogenlyase Mimic. Journal of the American Chemical Society 141, 17498-17502 (2019).

Stowe, H. M., Vilciauskas, L., Paek, E. & Hwang, G. S. On the origin of preferred bicarbonate production from carbon dioxide (CO2) capture in aqueous 2-amino-2-methyl-1-propanol (AMP). Physical Chemistry Chemical Physics 17, 29184-29192, (2015).

Valeur, E. & Bradley, M. Amide bond formation: beyond the myth of coupling reagents. Chemical Society Reviews 38, 606-631 (2009).

Vassilev-Galindo, V., Matus, M. H. & Morales-Cabrera, M. A. Analysis of the CO2 absorption through a series of amines within the integration of a computational chemistry and process simulation scheme. International Journal of Greenhouse Gas Control 50, (2016) 198-205.

Wang Hu, J. M. S., Timur Dogu, Gulsen Dogu. Kinetics of sodium bicarbonate decomposition. AICHE J. 32, 1483-1490 (1986).

Wasserscheid, P. & Keim, W. Ionic liquids—new "solutions" for transition metal catalysis. Angewandte Chemie International Edition 39, 3772-3789 (2000).

(56) References Cited

OTHER PUBLICATIONS

Wong, M., Bustam, M. & Shariff, A. Chemical speciation of CO2 absorption in aqueous monoethanolamine investigated by in situ Raman spectroscopy. International Journal of Greenhouse Gas Control 39, 139-147 (2015).

Wu, Y. et al. First-principles and experimental studies of [ZrO(OH)]+ or ZrO(OH)2 for enhancing CO2 desorption kinetics—imperative for significant reduction of CO2 capture energy consumption. Journal of Materials Chemistry A 6, 17671-17681 (2018).

Zeng, S. et al. Ionic-liquid-based CO2 capture systems: structure, interaction and process. Chemical reviews 117, 9625-9673 (2017).

Zhang, T., Yu, Y. & Zhang, Z. Effects of non-aqueous solvents on CO2 absorption in monoethanolamine: Ab initio calculations. Molecular Simulation 44, 815-825, (2018).

Zhang, X. et al. Reducing energy consumption of CO2 desorption in CO2-loaded aqueous amine solution using Al2O3/HZSM-5 bifunctional catalysts. Applied energy 229, 562-576 (2018).

Zhang, Y. et al. Characterization and activity of V2O5—CeO2/TiO2—ZrO2 catalysts for NH3-selective catalytic reduction of NOx. Chinese Journal of Catalysis 36, 1701-1710, (2015).

Zhang, Z., Song, J. & Han, B. Catalytic transformation of lignocellulose into chemicals and fuel products in ionic liquids. Chemical reviews 117, Abstract: 2 pages (2017).

\* cited by examiner

P2-R$_2$-WHCAT-COMPLEX 6   P2-R$_3$-WOCAT-COMPLEX 1   P2-R$_3$-WOCAT-TS 1   P2-R$_3$-WOCAT-COMPLEX 2

P2-R$_3$-WHCAT-COMPLEX 1   P2-R$_3$-WHCAT-TS 1   P2-R$_3$-WHCAT-COMPLEX 2   P2-R$_3$-WHCAT-COMPLEX 3

P1-WOCAT-A-COMPLEX 3
P1-WOCAT-D-COMPLEX 1

$H_2O$

MEACOO-

P1-WOCAT-A-TS 2
P1-WOCAT-D-TS 1

MEAH-

P1-WHCAT-A-COMPLEX 2
P1-WHCAT-D-COMPLEX 1

P1-WOCAT-A-COMPLEX 2
P1-WOCAT-D-COMPLEX 2

P1-WHCAT-A-TS
P1-WHCAT-D-TS

P2-WOCAT-A-COMPLEX 2
P2-WOCAT-D-COMPLEX 1

P2-WOCAT-A-TS
P2-WOCAT-D-TS

P2-WOCAT-A-COMPLEX 1
P2-WOCAT-D-COMPLEX 2

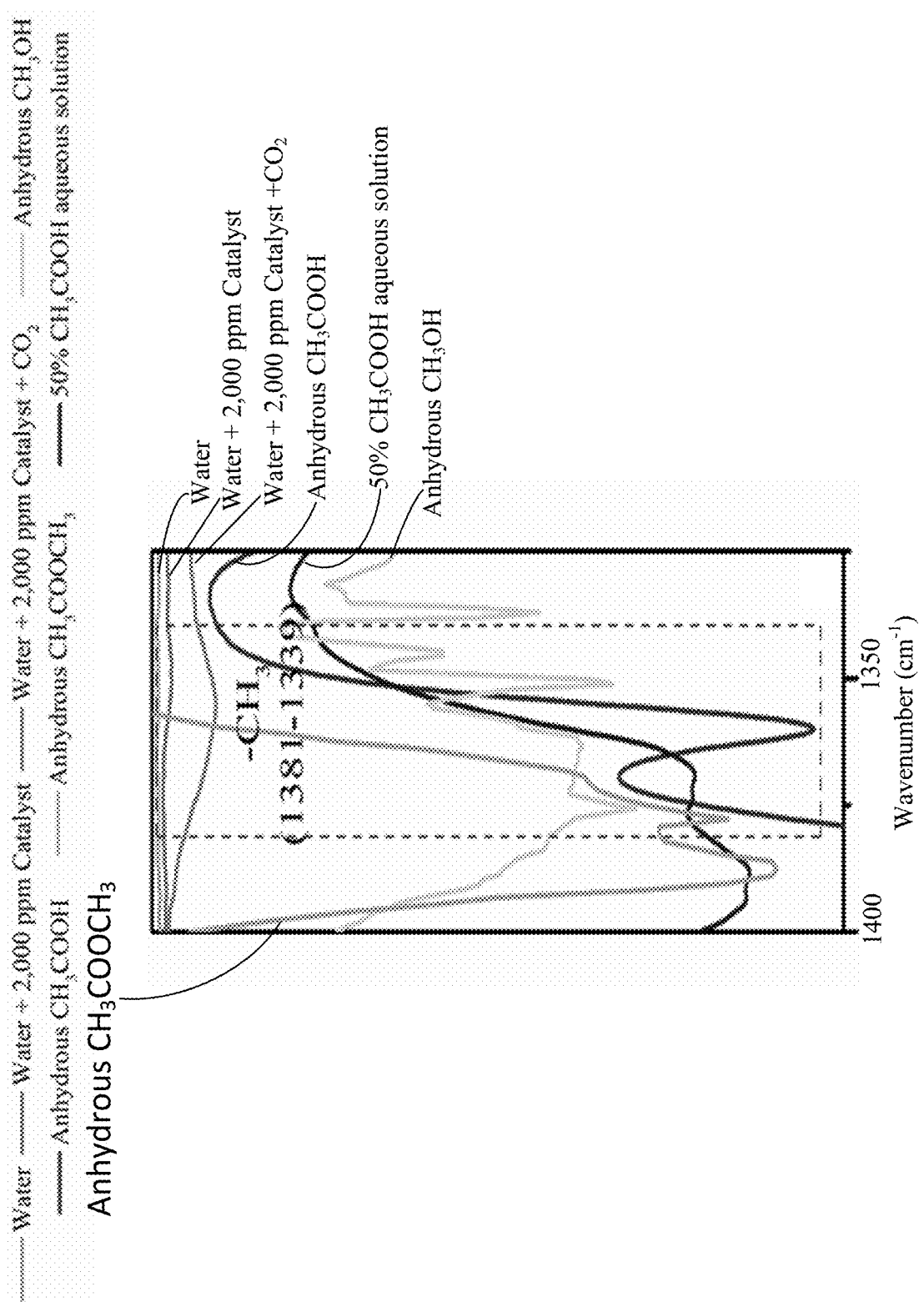
FIG. 32B(1)

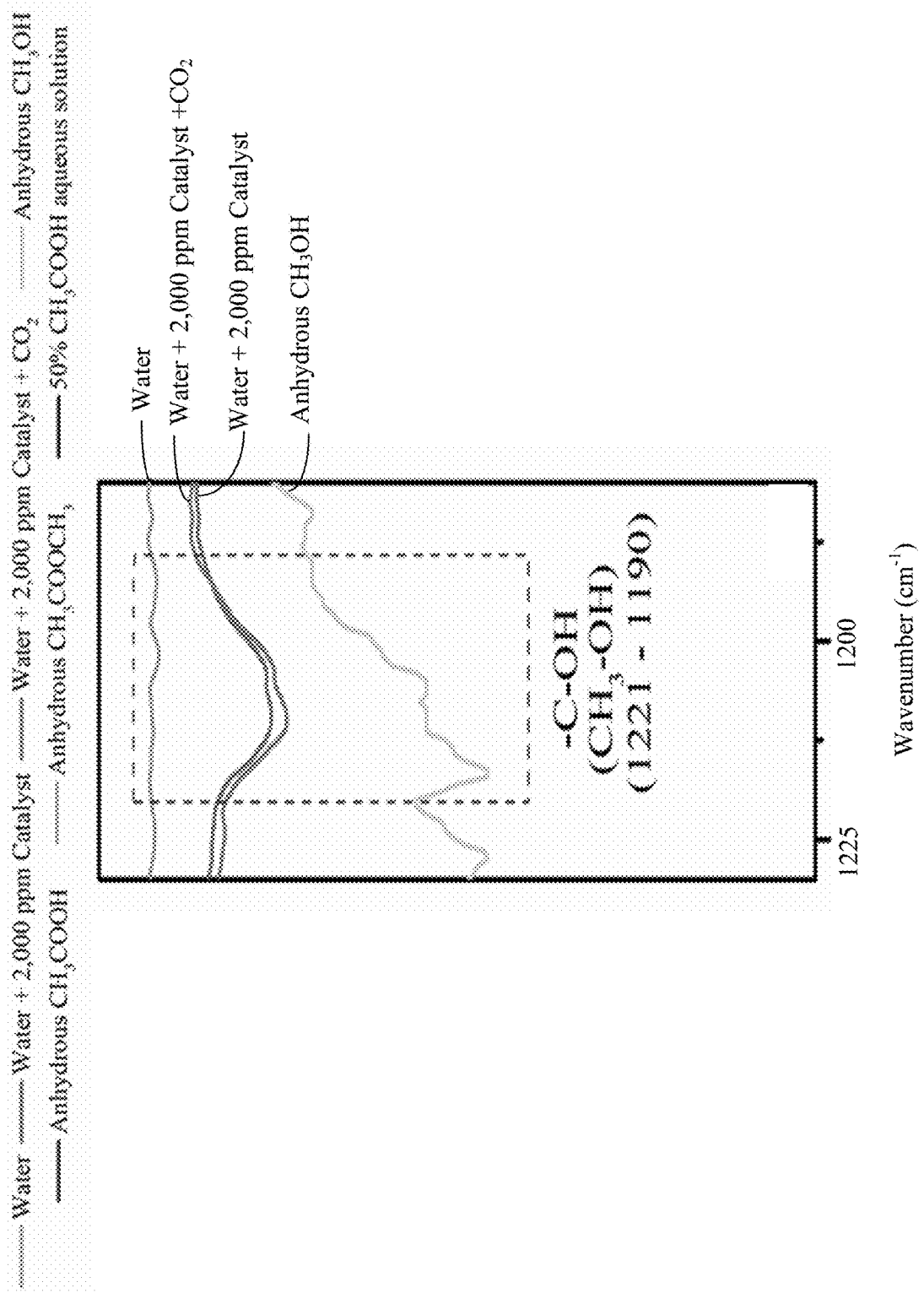
FIG. 32B(2)

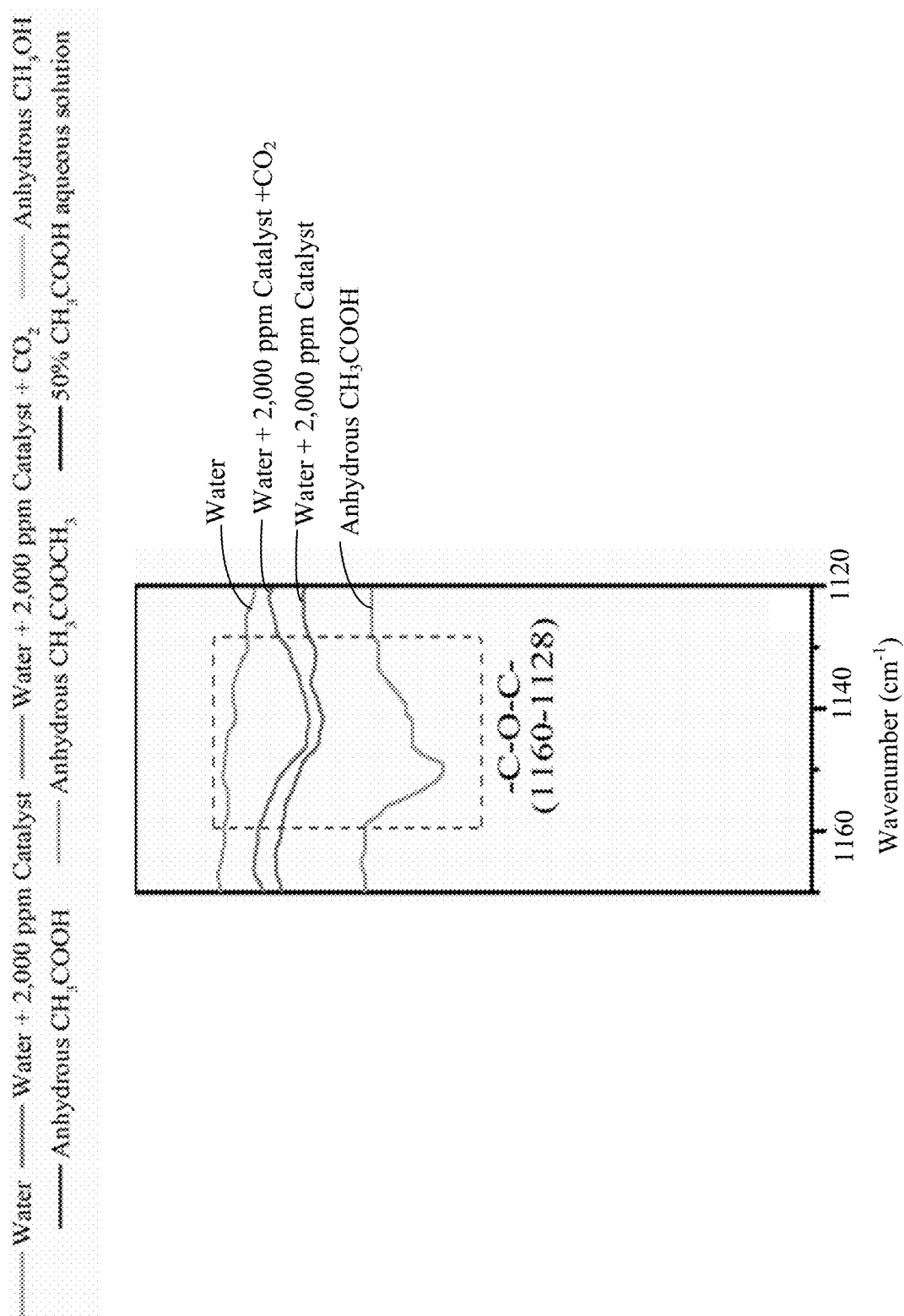
FIG. 32B(3)

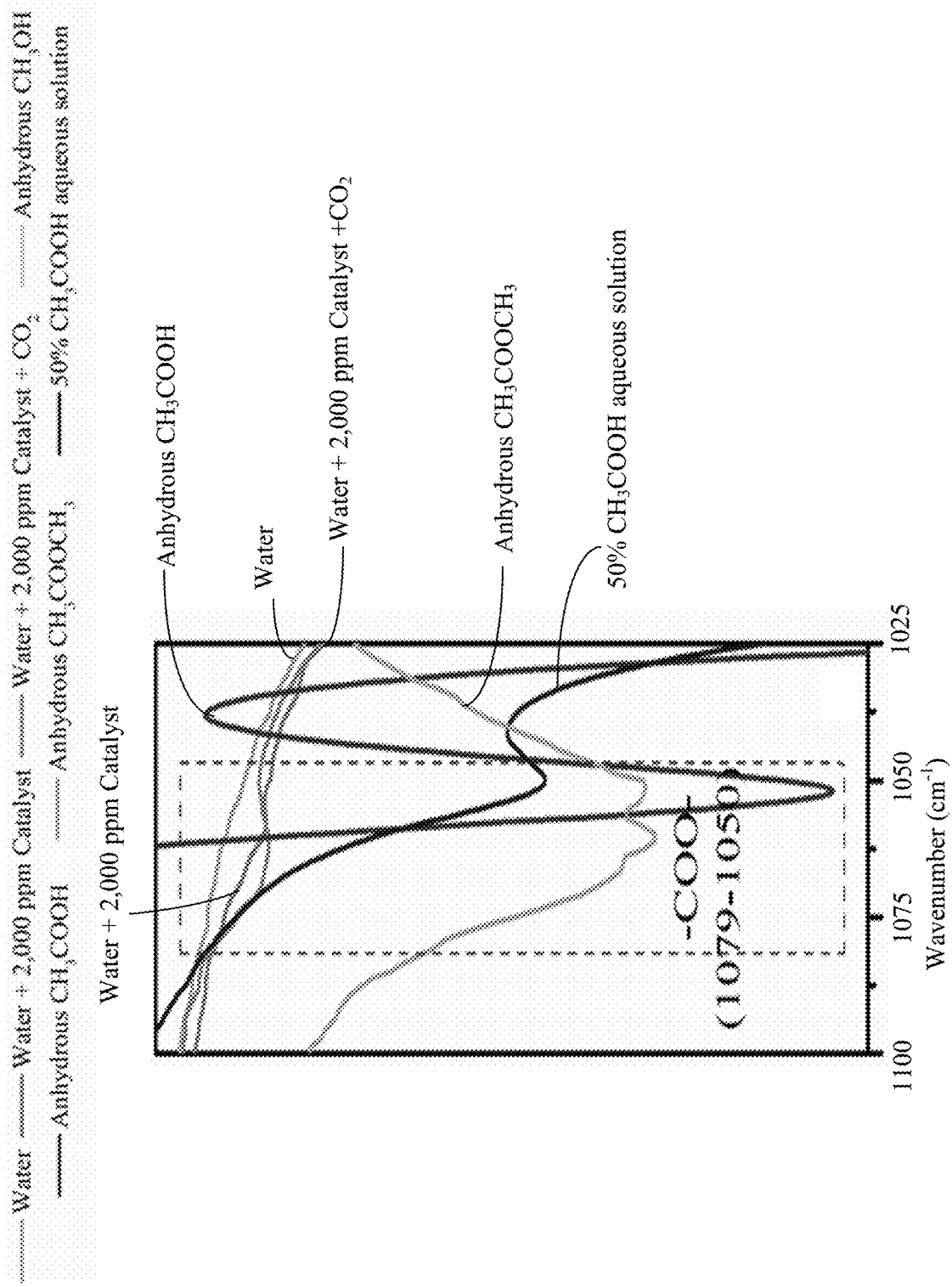
FIG. 32B(4)

ULTRAFAST CATALYTIC CO₂ CAPTURE CATALYZED BY A NOVEL ULTRASOUND-TREATED IONIC LIQUID

CROSS-REFERENCE TO RELATED APPLICATIONS

This application claims priority under 35 U.S.C. § 119 to provisional application Ser. No. 62/977,610 filed Feb. 17, 2020 and provisional application Ser. No. 63/088,880 filed Oct. 7, 2020, which are both incorporated by reference in their entirety.

GRANT REFERENCE

This disclosure was made with government support under a grant number 1903627 awarded by the National Science Foundation. The government has certain rights in the disclosure.

BACKGROUND

I. Field of the Disclosure

The present disclosure relates to a fast and stable approach for catalytic $CO_2$ capture from both gas streams (e.g., flue gas) and atmosphere. Particularly, but not exclusively, the present disclosure relates to the development of homogeneous catalyst a new bifunctional ionic liquid (IL), [CH2COOCH3mim+][NTF2−] denoted as [EMmim+][NTF2−] (see SI) in a $CO_2$ capture process and used as catalysts for $CO_2$ desporbtion and sorption instead of a sorbet. This present disclosure also relates to the integration of ultrasonic treatment into the catalysis performance improvement of [EMmim+][NTF2−] for development of a new generation of $CO_2$ capture catalysts. The ionic liquid [EMmim][NTf₂] providing a stable transformative catalyst instead of a sorbent for $CO_2$ capture.

II. Description of the Prior Art

Carbon dioxide ($CO_2$) is a primary greenhouse gas that makes a great contribution to global warming, owing to the excessive emissions from the combustion of fossil fuels. Carbon capture, utilization, and storage (CCUS) is the mature technology that can be carried out to alleviate the $CO_2$ discharge, which is urgently needed for achieving the goals set in the Paris Climate Accord. Amine-based $CO_2$ absorption is one of the potentially cost-effective options for capturing $CO_2$ from both gas streams (e.g., flue gas) and atmosphere. $CO_2$ capture is critical because of its increasing importance as a resource for material and fuel synthesis.

The fundamental challenge of chemisorption-based technologies can be the slow absorption and desorption reaction kinetics when $CO_2$ desorption at >100° C., which excessive energies may be needed to vaporize a large amount of liquid water during $CO_2$ desorption operation and condense the same amount of water vapor prior to $CO_2$ desorption during cyclic $CO_2$ sorption and desorption. Monoethanolamine (MEA) solution has low price and high reactivity with $CO_2$, which apply to the benchmark solvent for evaluating amine-based $CO_2$ capture processes at small scale. However, this technology is still not acceptable for versatile and large-scale uses mainly, attributed to (1) the critical limitations for >100° C. $CO_2$ desorption or very energy intensive MEA regeneration process, and (2) the resultant aggregated MEA degradation, as well as (3) severe corrosion at such high temperatures. In other words, to render fast $CO_2$ desorption from aqueous solvent, high temperature (120-140° C.) must be required for the current state-of-the-art, resulting in excessive energy demands for the water vaporization. Therefore, there is a need for [EMmim+][NTF2−] as the new bifunctional IL catalysts in $CO_2$ capture process instead of a sorbent, which is not only very effective for catalyzing $CO_2$ desorption but also $CO_2$ sorption. Thus, in accordance with one or more aspects of the present disclosure, [EMmim][NTf2] is used as a transformative catalyst instead of a sorbent for $CO_2$ capture.

SUMMARY

Therefore, it is a primary object, feature, or advantage of the present disclosure to improve over the state of the art.

According to at least one exemplary aspect, it is an object of the present disclosure to provide for a new use of monoethanolamine (MEA) solution According to at least one other exemplary aspect, it is an object of the present disclosure to provide for controlled ultrasonic hydrolysis to enhance the catalytic ability of [EMmim+][NTF2−] (IL).

According to at least another exemplary aspect, it is an object of the present disclosure to provide for [EMmim⁺][NTF₂⁻] based catalysts that can be synthesized and used for $CO_2$ capture with MEA.

According to at least another exemplary aspect, it is an object of the present disclosure to provide for [EMmim⁺][NTF₂⁻] based catalysts that can be used for $CO_2$ capture with MEA without the presence of $H_2O$.

According to at least another exemplary aspect, it is an object of the present disclosure to provide for [EMmim⁺][NTF₂⁻] based catalysts that can be used for solid based $CO_2$ capture.

According to at least another exemplary aspect, it is an object of the present disclosure to provide for [EMmim⁺][NTF₂⁻] based catalysts that can be used for liquid based $CO_2$ capture.

According to at least one other exemplary aspect, it is an object of the present disclosure to provide a solution where [EMmim⁺][NTF₂⁻] can not only significantly move the initial $CO_2$ desorption point to earlier times, but can also increase the rates of $CO_2$ desorption ($r_{d,\,CO_2}$) from the spent MEA solutions containing the same amounts $CO_2$.

According to at least one exemplary aspect, it is an object of the present disclosure to provide a solution for low energy efficient technologies that demonstrates much quicker $CO_2$ desorption kinetics at low temperature enabled with the use of the catalyst, which significantly advances the development of a new generation of $CO_2$ capture technologies, from at least the perspectives of decreasing the parasitic penalty of these systems, capital investment, and environmental protection.

According to at least one other exemplary aspect of the present disclosure, ionic liquid [EMmin][NTf₂] promotes both $CO_2$ absorption and desorption.

According to at least another exemplary aspect, the time needed for reaching the maximum desorption rate with the use of [EMmim][NTf₂] is shortened by 150 seconds in comparison to the time required for $CO_2$ desorption without the use of the IL catalyst.

According to at least one other exemplary aspect, the ionic liquid (ILS) [EMmim][NTf₂] catalyst can make $CO_2$ capture much less demanding for high quality energy.

According to still another exemplary aspect of the present disclosure, the increases in desorption rate and the desorbed $CO_2$ amount that can be obtained with [EMmim][NTf$_2$] can reach as high as 791% at 507 seconds and 534% at 551 seconds.

According to yet another exemplary aspect, the ionic liquid [EMmim][NTf$_2$] is beneficial to the elimination of the secondary environmental pollutants resulting from MEA degradation during high-temperature $CO_2$ desorption of conventional $CO_2$ capture technologies.

According to another exemplary aspect, MEA and the [EMmim][NTf$_2$] are optimally configured to be stable with 50 cyclic tests in view of the FT-IR spectra of the regenerated MEA solution confirming no change in both quantities of absorbed and desorbed $CO_2$ According to still another exemplary aspect of the present disclosure, ionic liquid [EMmim][NTf$_2$] can be thermally stable at temperatures as high as 300° C.

According to yet another exemplary aspect of the present disclosure, direct evidence is shown of hydrolysis of —COOCH3 in the IL into —COOH, a key function group in catalyzing the subsequent $CO_2$ desorption.

According to at least one other exemplary aspect, observations of the changes in concentrations of intermediates with FT-IR spectra may cause significant catalytic effect of the ionic liquid [EMmim][NTf$_2$].

According to still one other exemplary aspect of the present disclosure, [mimCH$_2$COOH]$^+$, P1-WH$_{cat}$-MEA-$CO_2$ decreases the overall $CO_2$ capture energy consumption.

According to at least one other exemplary aspect, a method for catalytic $CO_2$ capture is disclosed. The method includes, for example, steps such as providing a catalyst and a monoethanolamine (MEA), coupling ultrasonically treated ionic liquid with the MEA, and capturing $CO_2$ from the catalyst with the MEA.

According to at least one other exemplary aspect, a method for catalytic $CO_2$ capture is disclosed. The method includes, for example, steps such as providing a catalyst selected from the group of [EMmim$^+$][NTF$_2^-$] based catalysts and a $CO_2$ loaded monoethanolamine (MEA) solution, treating the catalyst with an ionic liquid, and capturing $CO_2$ from the catalyst with the MEA.

In accordance with at least one exemplary aspect of the present disclosure, a method for catalyzing both $CO_2$ sorption and desorption is disclosed. The method includes, in at least one aspect, the exemplary steps of providing a catalyst selected from the group of [EMmim$^+$][NTF$_2^-$] based catalysts and a $CO_2$ loaded monoethanolamine (MEA) solution, treating the MEA with an ionic liquid (IL) for providing a IL [EMmim$^+$][NTF$_2^-$] based catalyst, and absorbing and desorbing $CO_2$ with IL catalyst.

One or more of these and/or other objects, features, or advantages of the present invention will become apparent from the specification and claims that follow. No single embodiment need provide every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein, and where:

FIG. 32B(1)-(4) are schematic representations of the [EMmim][$NTf_2$] catalyst and the hydrolysis activation process in accordance with an exemplary aspect of the present disclosure;

BRIEF DESCRIPTION OF THE TABLES

Figure 1A:
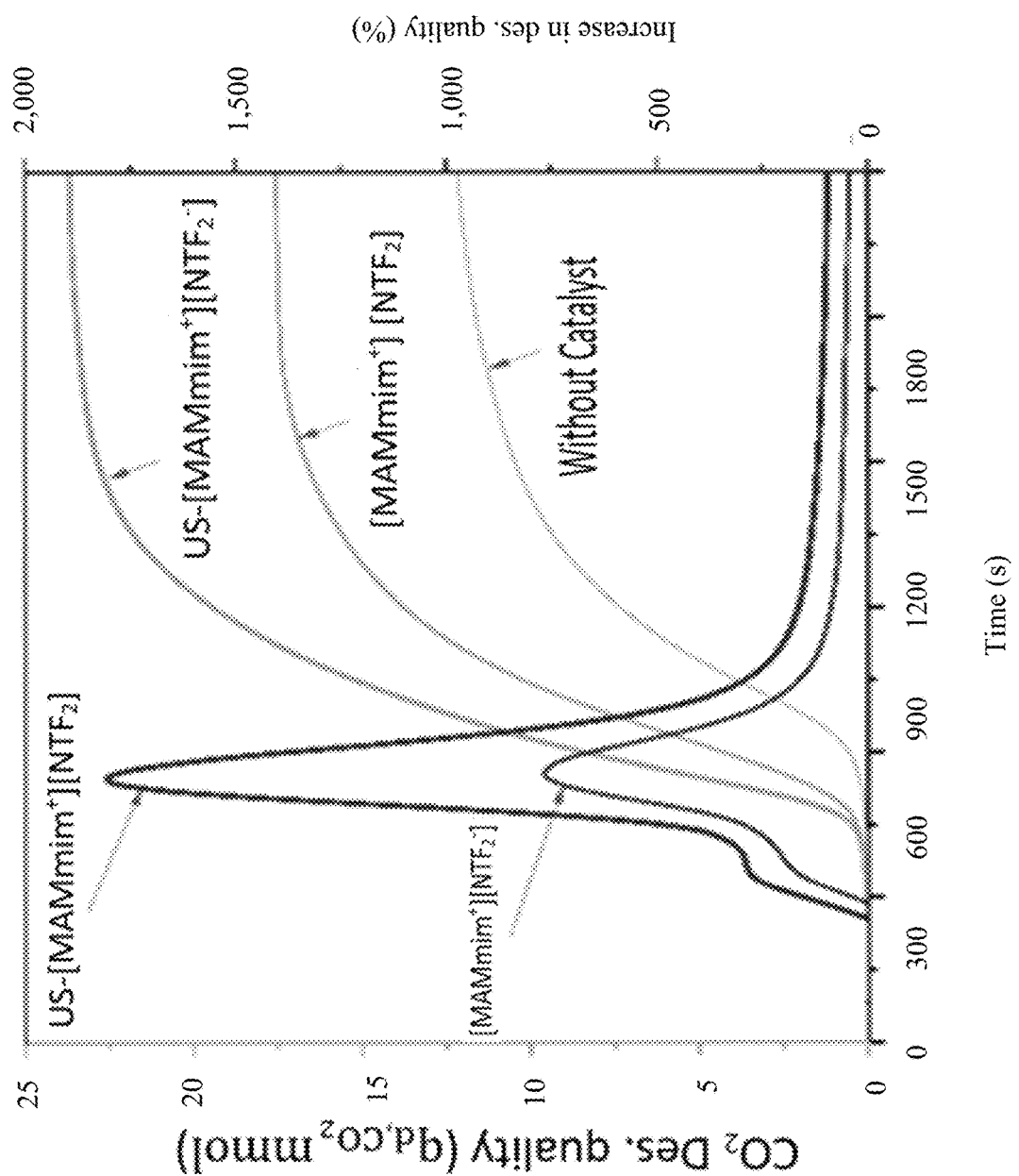
FIG. 1A provides a catalytic effect of [EMmim+][NTF2−] and US-[EMmim+][NTF2−] on the $CO_2$ desorption (des.) in accordance with an exemplary aspect of the present disclosure.

Illustrated embodiments of the disclosure are described in detail below with reference to the attached Tables, which are incorporated by reference herein, and where:

Table 1 provides tabulated pH values of aqueous IL solution and MEA solution;

Table 2 provides Hammett functions of [EMmim$^+$][$NTF_2^-$] IL in water with different concentrations and pre-treated conditions; and Table 3 provides pH values of Aqueous IL Solution and MEA Solution.

DETAILED DESCRIPTION

1. Introduction

Carbon dioxide ($CO_2$) has been determined as a primary greenhouse gas that makes a great contribution to global warming, owing to the excessive emissions from the combustion of fossil fuels. Carbon capture, utilization, and storage (CCUS) is the mature technology that can be carried out to alleviate the $CO_2$ discharge, which has been urgently needed for achieving the goals set in the Paris Climate Accord. $CO_2$ capture is critical not only because of its close connection with climate change according to Paris Climate Accord but also because of its increasing importance as a resource for material and fuel synthesis. Thus, $CO_2$ capture is very important. Chemisorption is one of the most important methods for $CO_2$ capture. The fundamental challenge of chemisorption-based technologies is the slow absorption and desorption reaction kinetics, especially the latter one, which leads to the need for $CO_2$ desorption at >100° C. Consequently, excessive energies are needed to vaporize a large amount of liquid water during $CO_2$ desorption operation and condense the same amount of water vapor prior to $CO_2$ desorption during cyclic $CO_2$ sorption and desorption. Also, severe corrosion and sorbent degradations that could result in secondary environmental and health issues, especially when organic amines are used as sorbents.

Amine-based $CO_2$ absorption can be one of the potentially cost-effective options for capturing $CO_2$ from both gas streams (e.g., flue gas) and atmosphere. It has relatively low price and high reactivity with $CO_2$, monoethanolamine (MEA) solution can be considered the benchmark solvent for evaluating amine-based $CO_2$ capture processes at small scale. However, this technology can still not be acceptable for versatile and large-scale uses mainly, attributed to (1) the critical limitations for >100° C. $CO_2$ desorption or very energy intensive MEA regeneration process, and (2) the resultant aggregated MEA degradation, as well as (3) severe corrosion at such high temperatures. For rendering fast $CO_2$ desorption from aqueous solvent, high temperature (120-140° C.) must be required for the current state-of-the-art, resulting in excessive energy demands for the water vaporization.

A key question is whether it can be possible to overcome the three challenges by desorbing $CO_2$ or regenerating spent MEA at temperatures less than 100° C., which can be the pivotal to reduce the heat duty while still achieving a desired $CO_2$ desorption rate. Heterogeneous catalysis has been considered to be a promising solution because it can not only simultaneously overcome the above-mentioned challenges, due to its function in accelerating energy-intensive $CO_2$ desorption at low temperatures, but it can also significantly lower the energy quantity and quality required for $CO_2$ capture. Fan et al. reported that the use of nanostructured $TiO(OH)_2$ to catalyze MEA-based $CO_2$ capture could drastically increase the rate of $CO_2$ desorption from spent MEA solution by over 4,000% at 88° C. with 2% or 20,000 ppm $TiO(OH)_2$. Furthermore, the $TiO(OH)_2$ catalyzed-MEA $CO_2$ capture system showed excellent stability, even with 50 cyclic $CO_2$ absorption-desorption tests. However, to date, homogeneous catalysis with no potential diffusional limitations has not been utilized for the $CO_2$ capture technologies.

Ionic liquids (ILs), consisting of organic cations and organic or inorganic anions, are environmentally friendly due to their various desired characteristics, including high chemical/thermal stability, tunable physicochemical characters (acid/base sites), low corrosiveness and low heat capacity, which can be highly desirable for $CO_2$ capture systems. To date, there can be no study reported in the disclosure on the use of ILs as the catalyst for the $CO_2$ capture process despite the fact that high solubility of $CO_2$ can be reported in some IL. After a long time of study, a homogeneous $CO_2$ capture catalyst—a new ionic liquid (IL), [$CH_3COOCH_2mim$][$NTf_2$] denoted as [EMmim][$NTf_2$] was discovered. The IL, used as a $CO_2$ capture catalyst instead of a sorbent, is not only very effective for catalyzing $CO_2$ desorption but also $CO_2$ sorption. It should be emphasized that [EMmim][$NTf_2$] is used as a transformative catalyst instead of a sorbent for $CO_2$ capture in this work. In addition, ultrasonic chemistry can be an important modern method for modifying materials. The transitory collapse of cavitation microbubbles formed during the ultrasound wave traveling process can result in high temperature, high pressure, enhanced mass transfer and shear forces in the microenvironment. It has been used for significant acceleration of chemical changes. Also, it can be utilized in modifying catalysts for improving their catalytic performance. Thus, the research can be designed to integrate ultrasonic treatment into the catalysis performance improvement of [EMmim$^+$][$NTF_2^-$] for development of a new generation of $CO_2$ capture catalysts.

A method is disclosed for chemisorption based capture $CO_2$ technologies. The method comprises providing a catalyst and a monoethanolamine (MEA); treating the catalyst with ultrasonically treated ionic liquid (IL); and capturing $CO_2$ from the catalyst with the MEA.

In another exemplary aspect of the present disclosure, a method is disclosed for chemisorption based capture $CO_2$ technologies. The method comprises providing a catalyst selected from the group of [EMmim$^+$][$NTF_2^-$] based catalysts and a $CO_2$ loaded monoethanolamine (MEA) solution; treating the MEA with an ionic liquid (IL) for providing a IL [EMmim$^+$][$NTF_2^-$] based catalyst; and absorbing and desorbing $CO_2$ with IL catalyst.

In yet another aspect of the present disclosure, another method for both $CO_2$ sorption and desorption of chemisorption-based technologies is disclosed. The method comprises providing an aqueous solution of monoethanolamine (MEA); providing $CO_2$ through a gas inlet; and absorbing and desorbing $CO_2$ without the presence of water.

2. Effect of Designed Homogeneous Il Catalyst

Figure 1B:
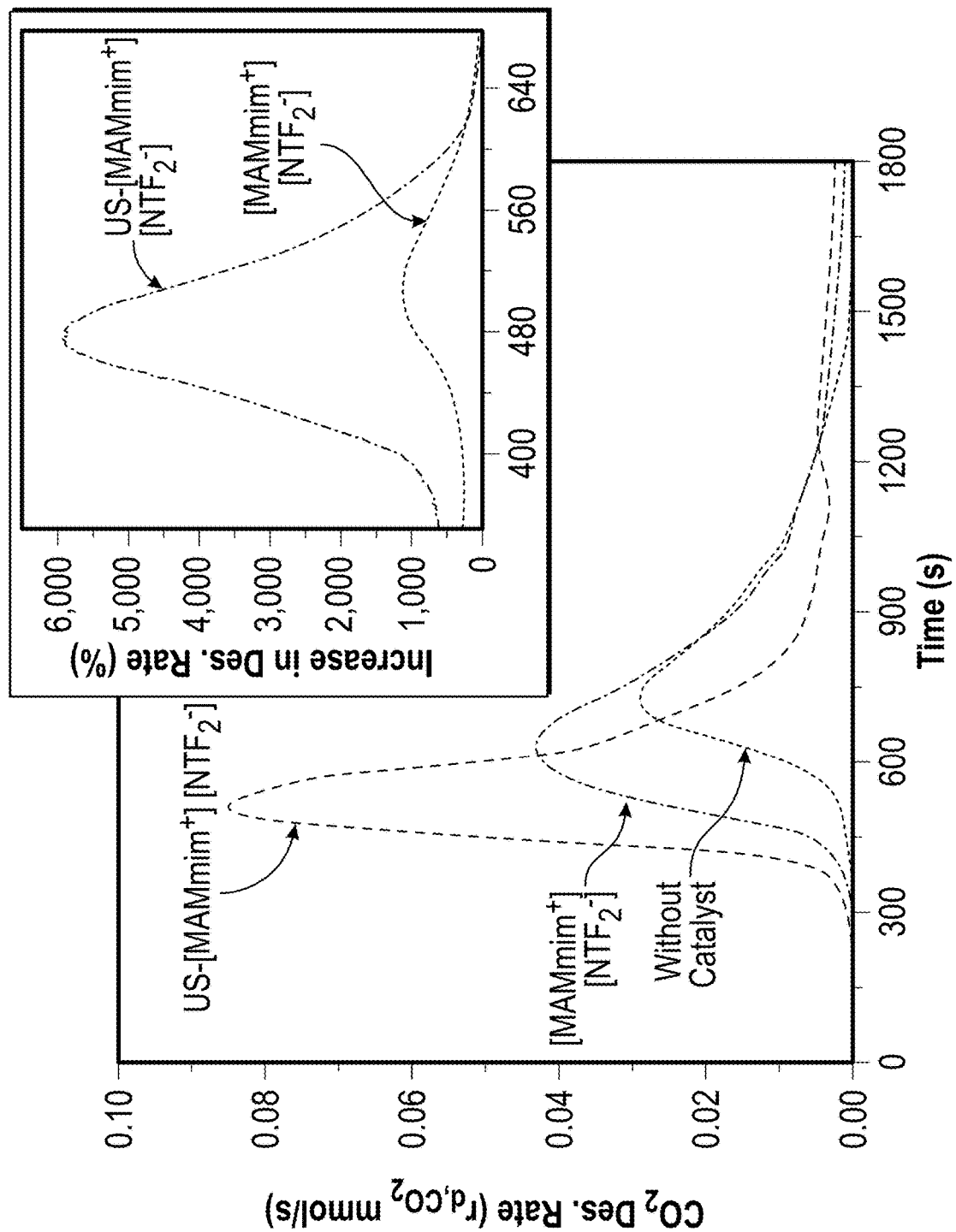
FIG. 1B provides another view of a catalytic effect of [EMmim+][NTF2−] and US-[EMmim+][NTF2−] on the $CO_2$ desorption (des.) in accordance with an exemplary aspect of the present disclosure.

FIGS. 1A and 1B display the $CO_2$ desorption performances of 20 wt % MEA solution catalyzed by [$CH_2COOCH_3mim^+$][$NTF_2^-$] or [EMmim$^+$][$NTF_2^-$] with and without ultrasonic pre-treatment. For example, as shown in FIG. 1A, the effect of catalysts on the $CO_2$ desorption rate ($q_{d, CO_2}$) and as shown for example in FIG. 1B the effect of catalysts on the quantity of desorbed $CO_2$ ($r_{d, CO_2}$). Desorption conditions: 100 g of 20 wt % spent MEA solutions without and with catalysts contain the same amounts of $CO_2$; catalyst concentrations: 2,000 ppm; flow rate of carrier gas N2: 500 mL/min; temperature: 30-85° C.; time: 1800 s. It should be noted that the methods for synthesizing [EMmim$^+$][$NTF_2^-$] and the results of [EMmim$^+$][$NTF_2^-$] characterization are provided in the FIGS. 6, and 8-11B. The catalytic $CO_2$ capture setup can be shown in FIGS. 12A and 12B. Two commercial IL catalysts [Emim$^+$][$HSO_4^-$] and [Bmim$^+$][$PF_6^-$] (FIGS. 7A and 7B) were also obtained and compared for the $CO_2$ desorption process. For example, as shown in FIG. 7A, [Emim$^+$][$HSO_4^-$] and as shown in FIG. 7B, [Bmim$^+$][$PF_6^-$]. [Emim$^+$][$HSO_4^-$] (Purity>98.0%; CAS No.: 412009-61-1; MDL Number MFCD06798195) can be purchased from Tokyo Chemical Industry Co., Ltd. (TCI). [Bmim$^+$][$PF_6^-$] (Purity>97.0% (HPLC); CAS No.: 174501-64-5; MDL number MFCD03093295) can be obtained from Sigma-Aldrich, Inc. According to FIG. 14D, [EMmim$^+$][$NTF_2^-$] can not only significantly move the initial $CO_2$ desorption point to earlier times, but can also increase the rates of $CO_2$ desorption ($r_{d, CO_2}$) from the spent MEA solutions. The FIGS. 14A-16C show the favorable catalytic effects of the [EMmim$^+$][$NTF_2^-$] on the $CO_2$ absorption process. Notice that the catalytic $CO_2$ desorption performance of the EMmim$^+$][$NTF_2^-$] gives much better performance than that without the ultrasonic pre-treatment and are significantly superior to the two commercial IL catalysts (as shown in FIGS. 13A and 13B), where, for example, the $CO_2$ absorption curves of 20 wt % MEA solution are shown in FIG. 13B. The $CO_2$ desorption rate of rich 20 wt % MEA solution, for example are shown in FIG. 13A. The catalyst dosage can be 3,000 ppm equivalently containing 10.1 ppm of —COOH. Note that the three ILs catalysts could enhance the $CO_2$ desorption performance when compared to the blank run. While the catalytic $CO_2$ desorption performance of the synthesized IL catalyst [EMmim$^+$][$NTF_2^-$] can be better than that of the two commercial IL catalysts. Thus, the FIGS. 14A-16C clearly show that the ultrasonic pre-treatment can significantly promote the catalytic function of [EMmim$^+$][$NTF_2^-$]. It has been found that the dosage of 3,000 ppm [EMmim$^+$][$NTF_2^-$] can rapidly hydrolyse the IL to give equivalently 10.1 ppm of fully disassociated —COOH moiety within 20 min using an ultrasonic power of 9 w.

The maximum rate $r_{d, CO_2}$ or $r_{m, d, CO_2}$ achieved with and without using [EMmim$^+$][$NTF_2^-$] and US-[EMmim$^+$][$NTF_2^-$], as well as the corresponding desorption times, are shown in FIGS. 1A-1B. The relative rate $r_{d, CO_2}$ improvements obtained with [EMmim$^+$][$NTF_2^-$] and US-[EMmim$^+$][$NTF_2^-$] presented in FIG. 1B can reach as high as 1,140 and 6,000% respectively, while the corresponding absolute rate $r_{d, CO_2}$ improvements shown in FIG. 1B are 149% and 293%, respectively. Also, the times needed for reaching the rate maximum $r_{m, d, CO_2}$ with [EMmim$^+$][$NTF_2^-$] and US-[EMmim$^+$][$NTF_2^-$] are shortened by 116 and 222 s, respectively, as shown, in comparison to the time required for $CO_2$ desorption without the use of the organocatalyst As shown in FIG. 1A, there can be only 12.2 mmol quantity of desorption of $CO_2$ $q_{d, CO_2}$ for the blank run, and the significant improvement of the $q_{d, CO_2}$ can be 95% (23.7 mmol) when US-[EMmim$^+$][$NTF_2^-$] can be introduced. When the desorption time can be shortened to 1,200 s, the use of US[EMmim$^+$][$NTF_2^-$] can increase the $q_{d, CO_2}$ by about 120% (as shown FIGS. 16A-16C). It can be seen from FIG. 1A that the presence of [EMmim$^+$][$NTF_2^-$] and US-[EMmim$^+$][$NTF_2^-$] can increase $q_{d, CO_2}$ as high as 766% higher at 554 s and 1,807% larger at 544 s, respectively. US-[EMmim$^+$][$NTF_2^-$] not only has a much lower dosage (6.7 times lower) but also has a higher catalytic $CO_2$ desorption rate (1.33 times higher) than that of the reported TiO(OH)$_2$ catalyst[1]. Also, as a homogeneous catalyst, US-[EMmim$^+$][$NTF_2^-$] can be used directly in existing $CO_2$ capture plants without the need for modifying the existing $CO_2$ desorption facility in an industrial application. Therefore, the experimental results demonstrate that [EMmim$^+$]

[NTF$_2^-$] can be effective and US-[EMmim$^+$][NTF$_2^-$] can be even much more effective, for catalyzing the CO$_2$ desorption.

Figure 14A:
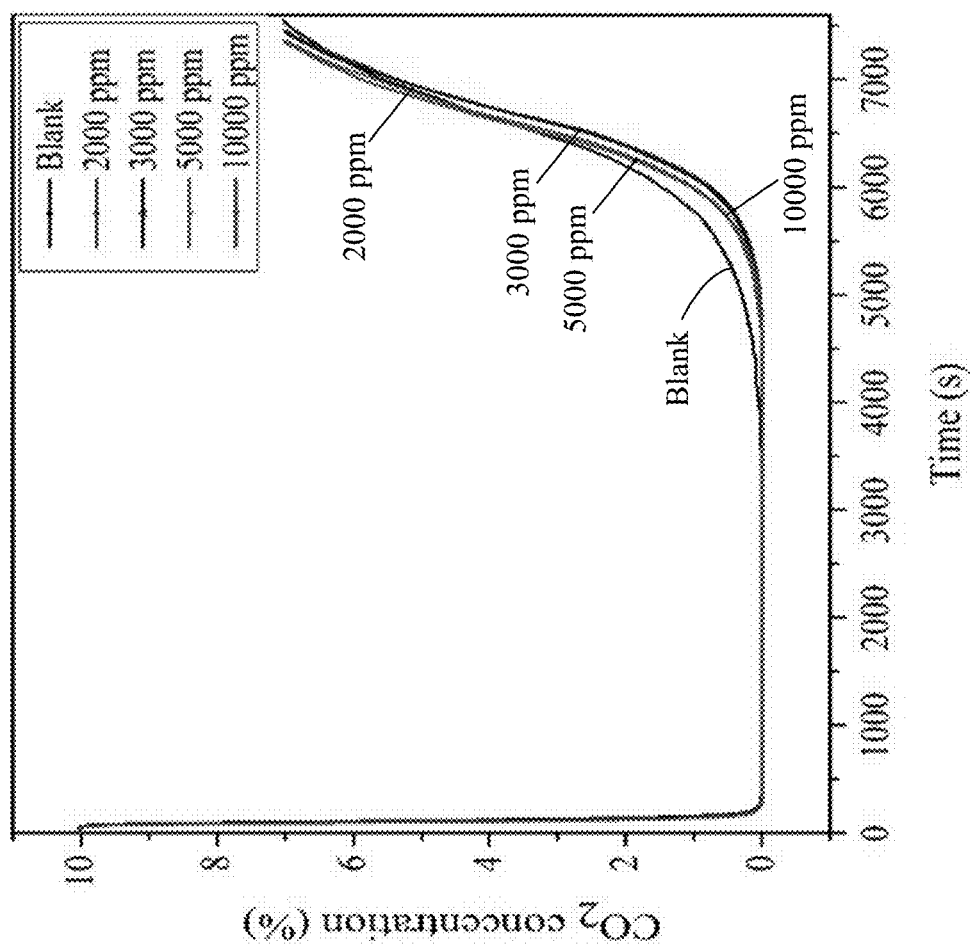
FIG. 14A provides a graph of $CO_2$ absorption curves of 20 wt % MEA solution illustrating the effect of [EMmim$^+$][NTF$_2^-$] catalyst dosage on catalytic $CO_2$ absorption performance.
Figure 14B:
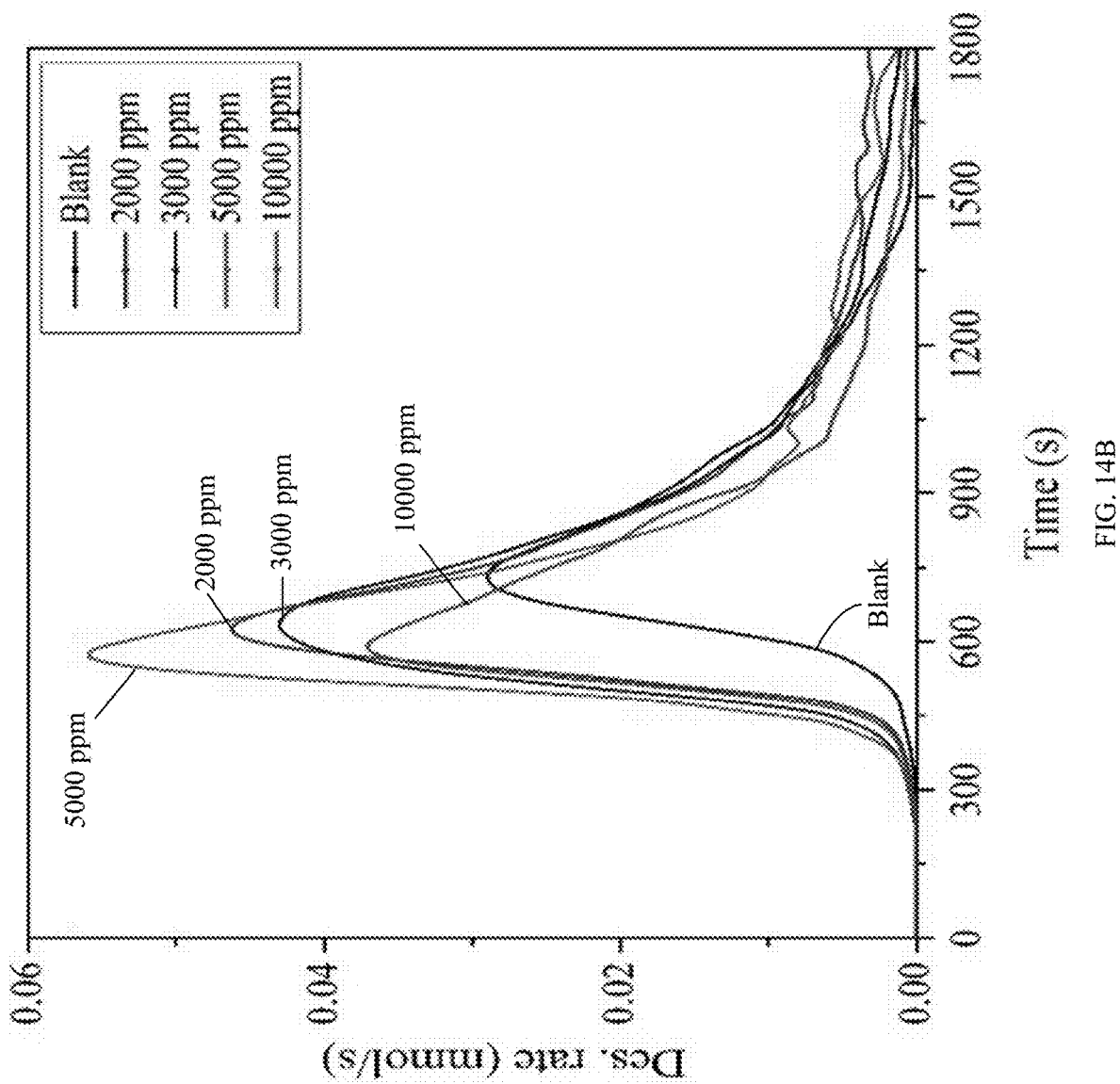
FIG. 14B provides a graph of $CO_2$ desorption rate of rich 20 wt % MEA solution illustrating the effect of [EMmim$^+$][NTF$_2^-$] catalyst dosage on catalytic $CO_2$ desorption (des.) performance.
Figure 14C:
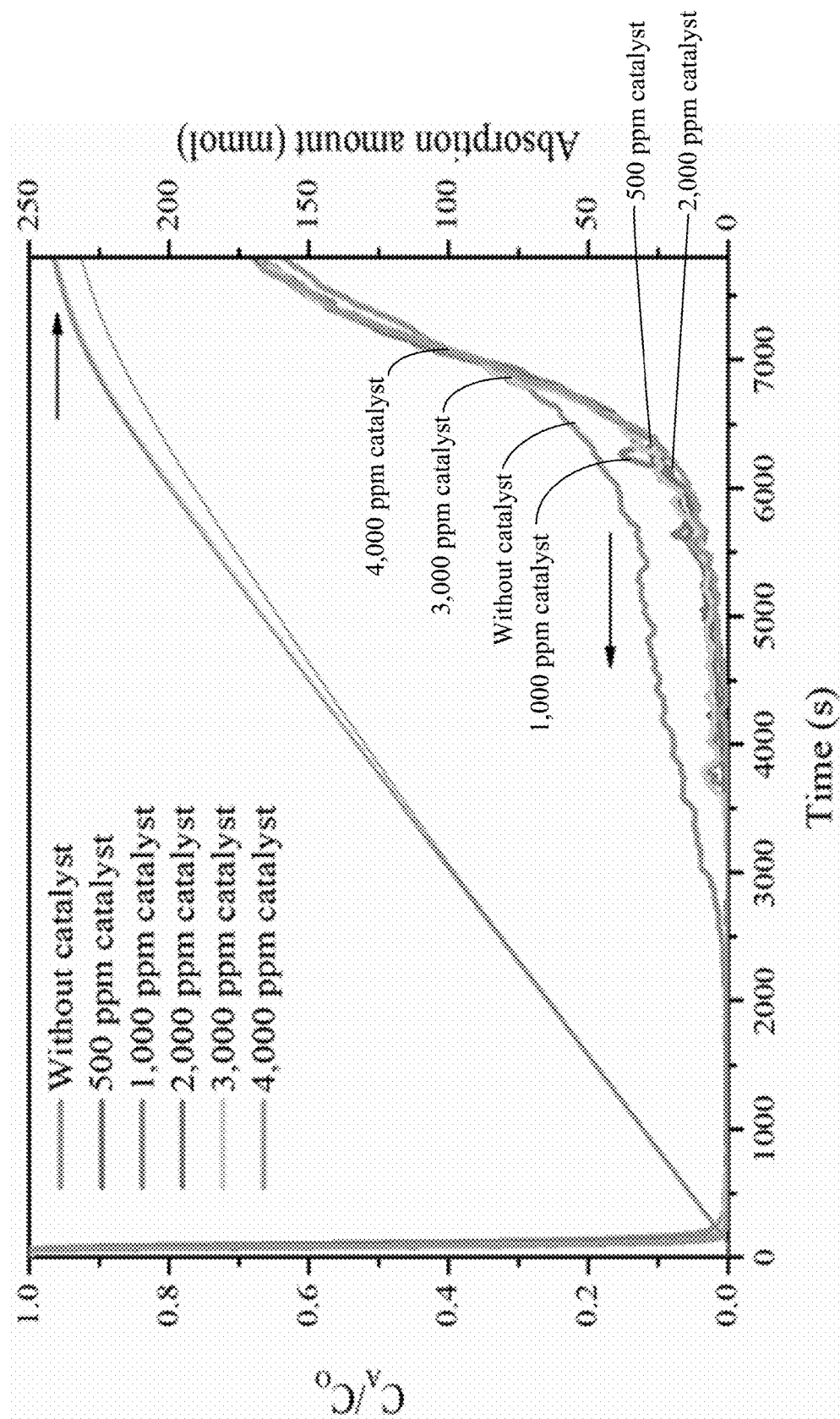
FIG. 14C is a plot illustrating the catalytic effects of [EMmim][NTf$_2$] dosage on the $CO_2$ absorption performances.
Figure 14D:
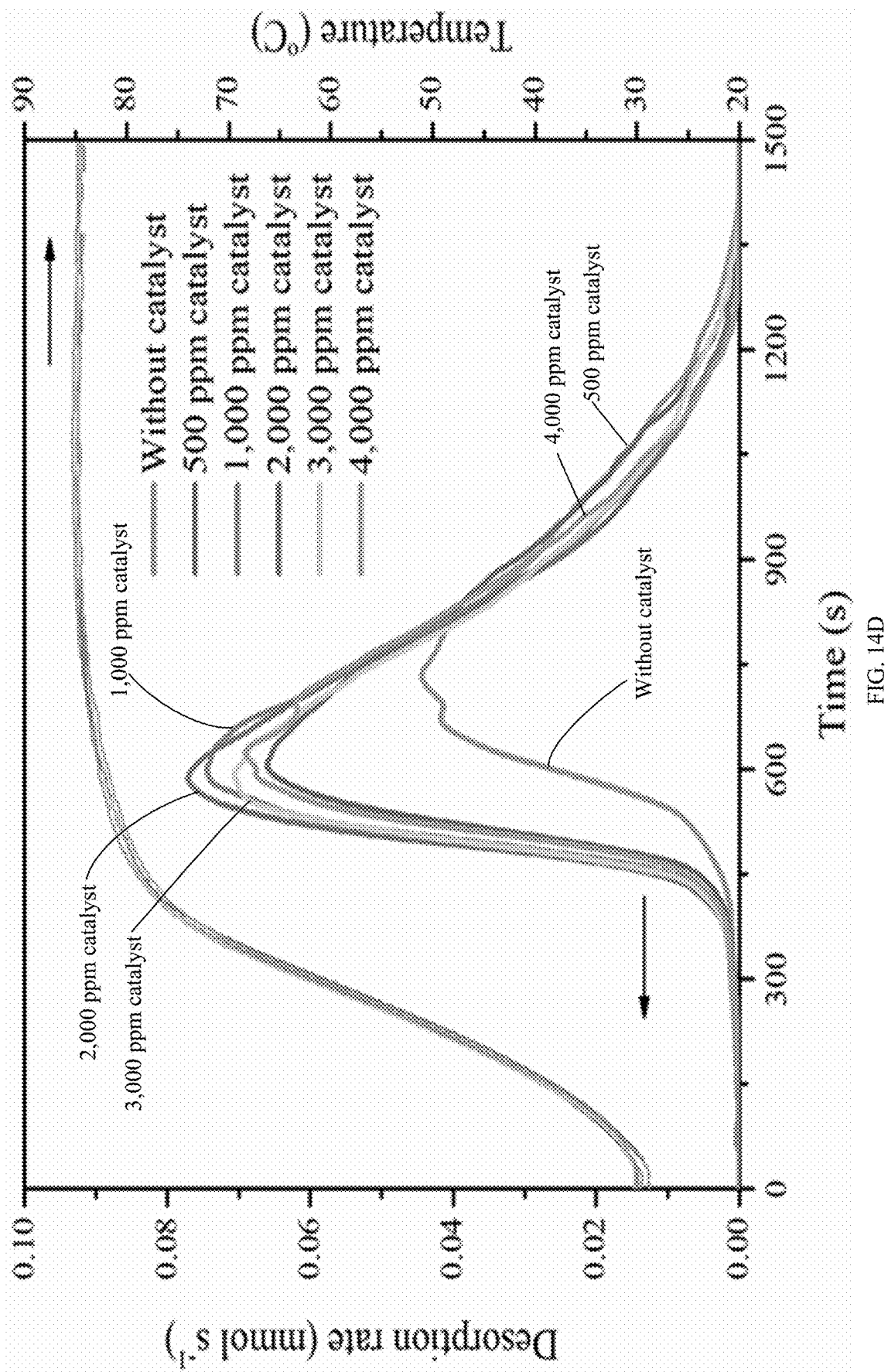
FIG. 14D is a plot illustrating the catalytic effects of [EMmim][NTf$_2$] dosage on the $CO_2$ desorption (des.) performances.
Figure 14E:
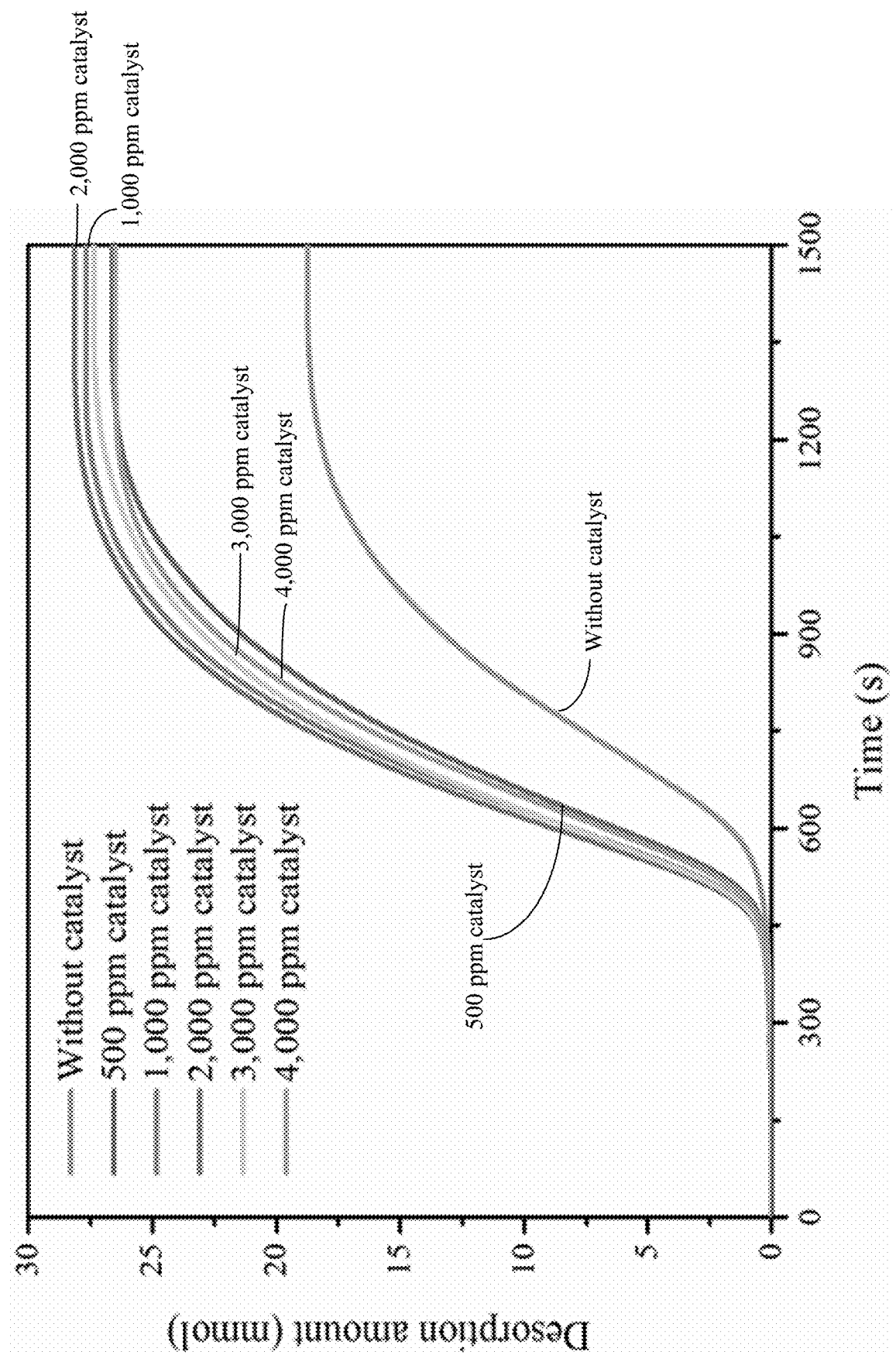
FIG. 14E is another plot illustrating the catalytic effects of [EMmim][NTf$_2$] dosage on the $CO_2$ desorption (des.) performances.

The optimal dosage of this catalyst for accelerating CO$_2$ desorption, the key step for reducing overall CO$_2$ capture energy consumption, is 2,000 ppm according to FIGS. 14C-14E, which illustrate the CO$_2$ absorption profiles of 20 wt % MEA sorbent in FIG. 14C, the CO$_2$ desorption rates of 20 wt % MEA sorbent in FIG. 14D, and the total CO$_2$ desorption amounts in FIG. 14E.

FIGS. 15C-15F exhibit the CO$_2$ absorption and desorption performances of 20 wt % MEA solution catalyzed by 2,000 ppm [EMmim][NTf$_2$]. The IL [EMmin][NTf$_2$] can promote both CO$_2$ absorption and desorption. Capturing 90% CO$_2$ is targeted by the U.S. Department of Energy, and thus the period with 90% CO$_2$ capture efficiency is defined as effective absorption time. According to FIG. 15C, 20 wt % MEA sorbent without catalyst can absorb only 144.34 mmol CO$_2$ within the shorter effective absorption time of 4,446 s, while the sorbent with 2,000 ppm IL catalyst can absorb 210.09 mmol CO$_2$, and extend effective absorption time to 6,350 s, which are 45.55% and 42.83% absorption improvements, respectively, compared to the sorbent without catalyst.

Figure 15A:
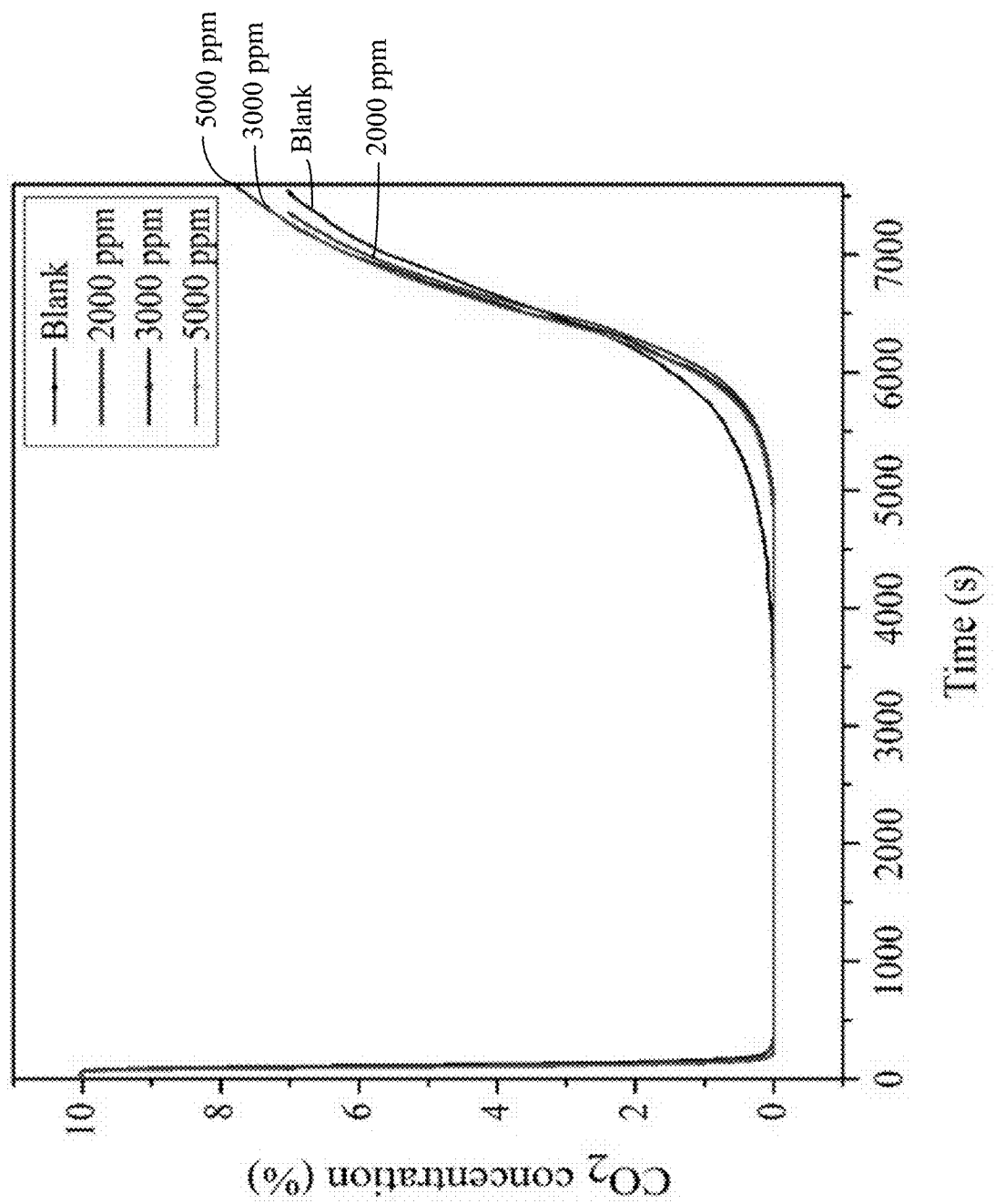
FIG. 15A provides a graph of $CO_2$ absorption curves of 20 wt % MEA solution illustrating the effect of [EMmim$^+$][NTF$_2^-$] catalyst dosage and ultrasonic treatment on catalytic $CO_2$ absorption performance. (a) $CO_2$ absorption curves of 20 wt % MEA solution. (b) $CO_2$ desorption rate of rich 20 wt % MEA solution.
Figure 15B:
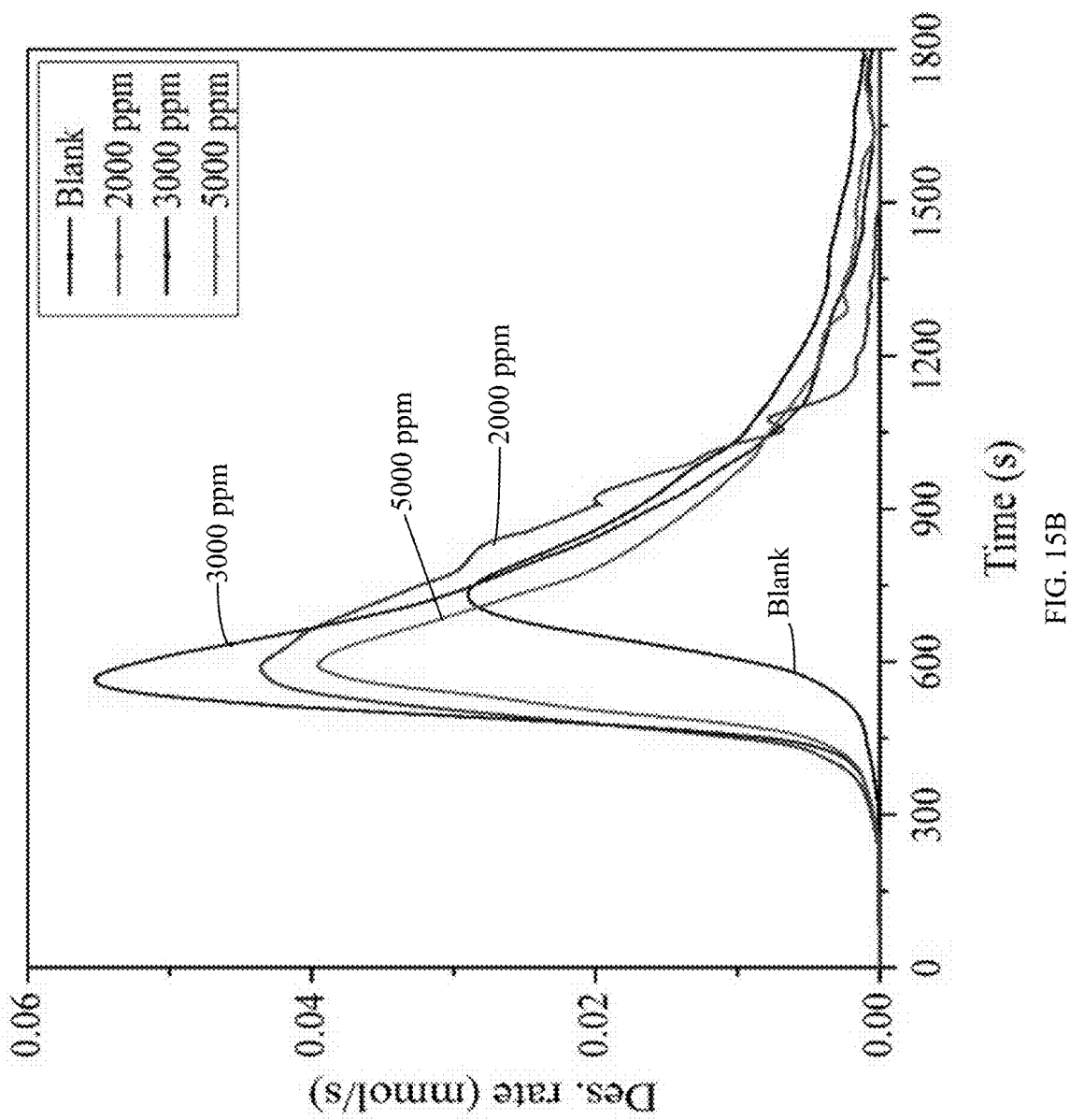
FIG. 15B provides a graph of $CO_2$ desorption rate of rich 20 wt % MEA solution illustrating the effect of [EMmim$^+$][NTF$_2^-$] catalyst dosage and ultrasonic treatment on catalytic $CO_2$ desorption (des.) performance.
Figure 15C:
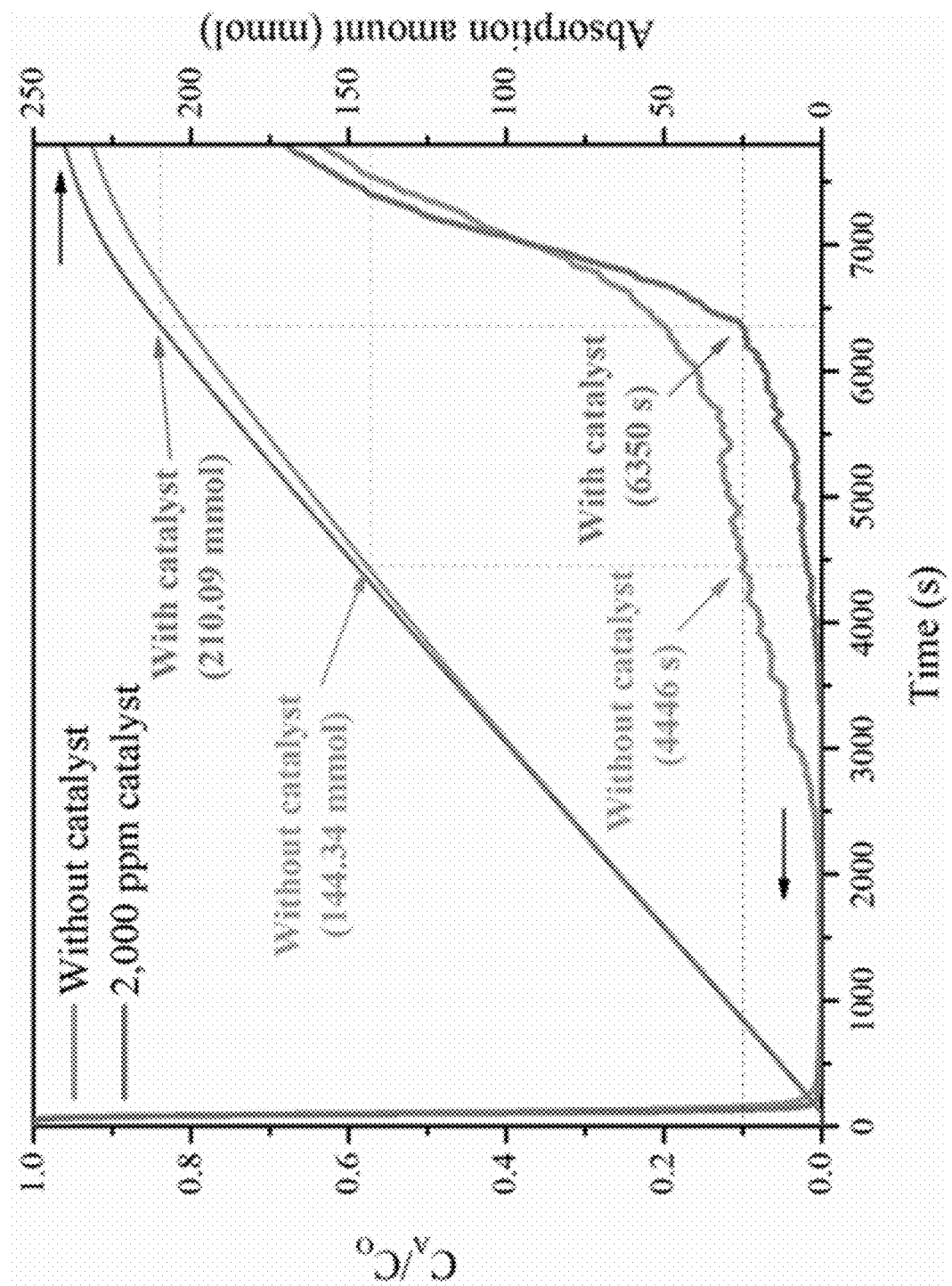
FIG. 15C is a plot illustrating the catalytic effects of [EMmim][NTf$_2$] on $CO_2$ absorption in accordance with an exemplary aspect of the present disclosure.
Figure 15D:
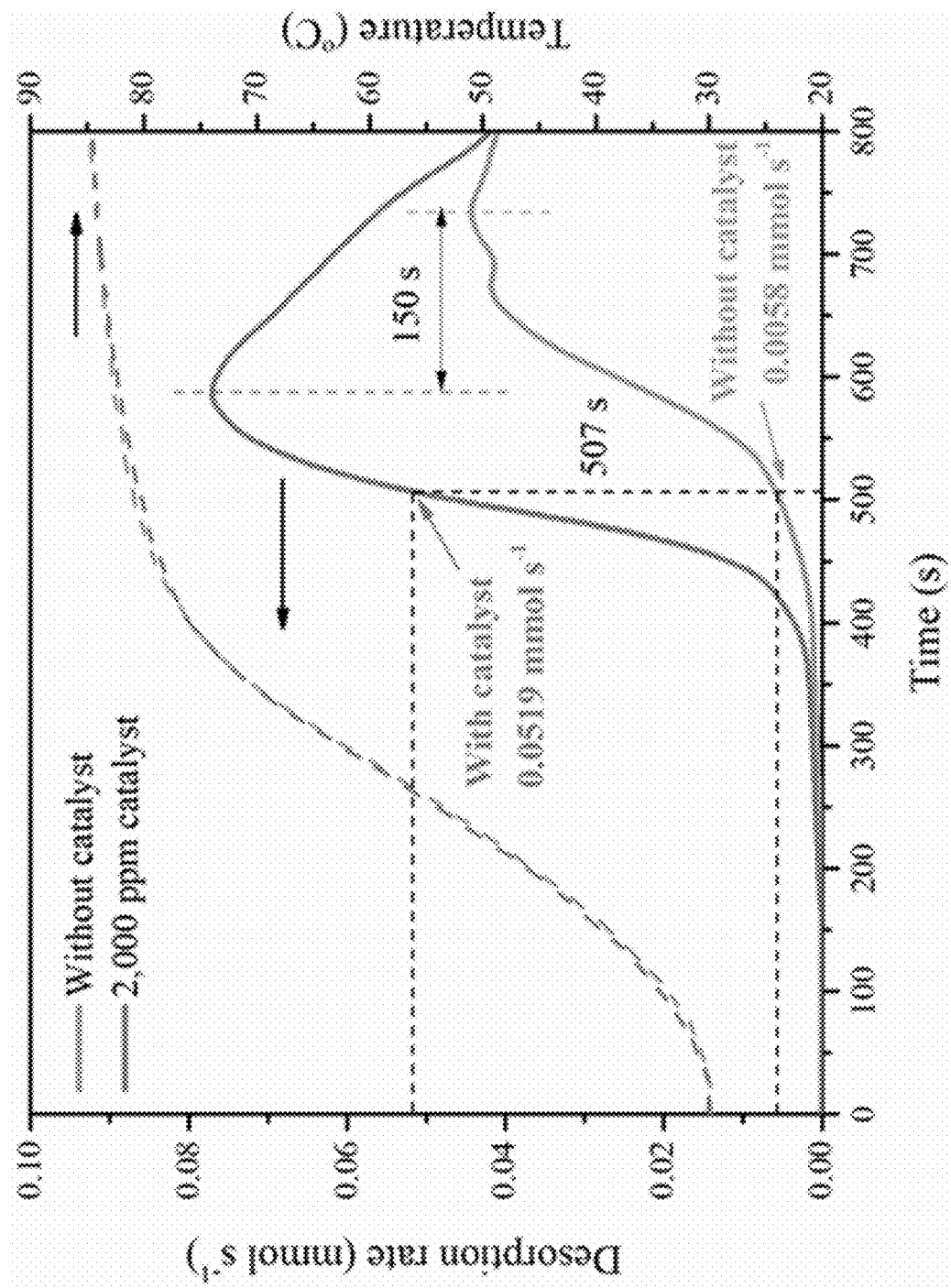
FIG. 15D is a plot illustrating the catalytic effects of [EMmim][NTf$_2$] on $CO_2$ desorption in accordance with an exemplary aspect of the present disclosure.
Figure 15E:
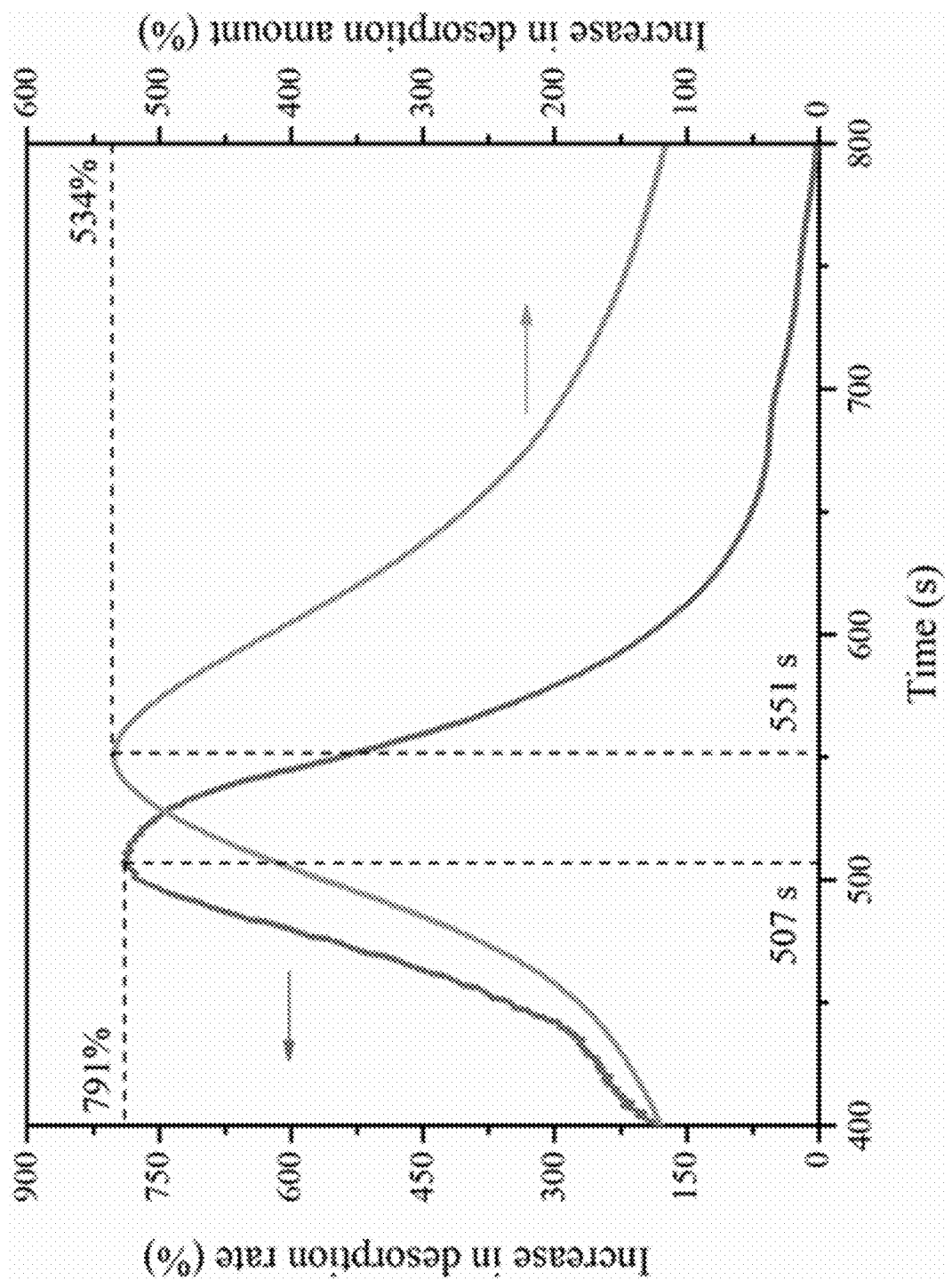
FIG. 15E is another plot illustrating the catalytic effects of [EMmim][NTf$_2$] on $CO_2$ desorption in accordance with an exemplary aspect of the present disclosure.
Figure 15F:
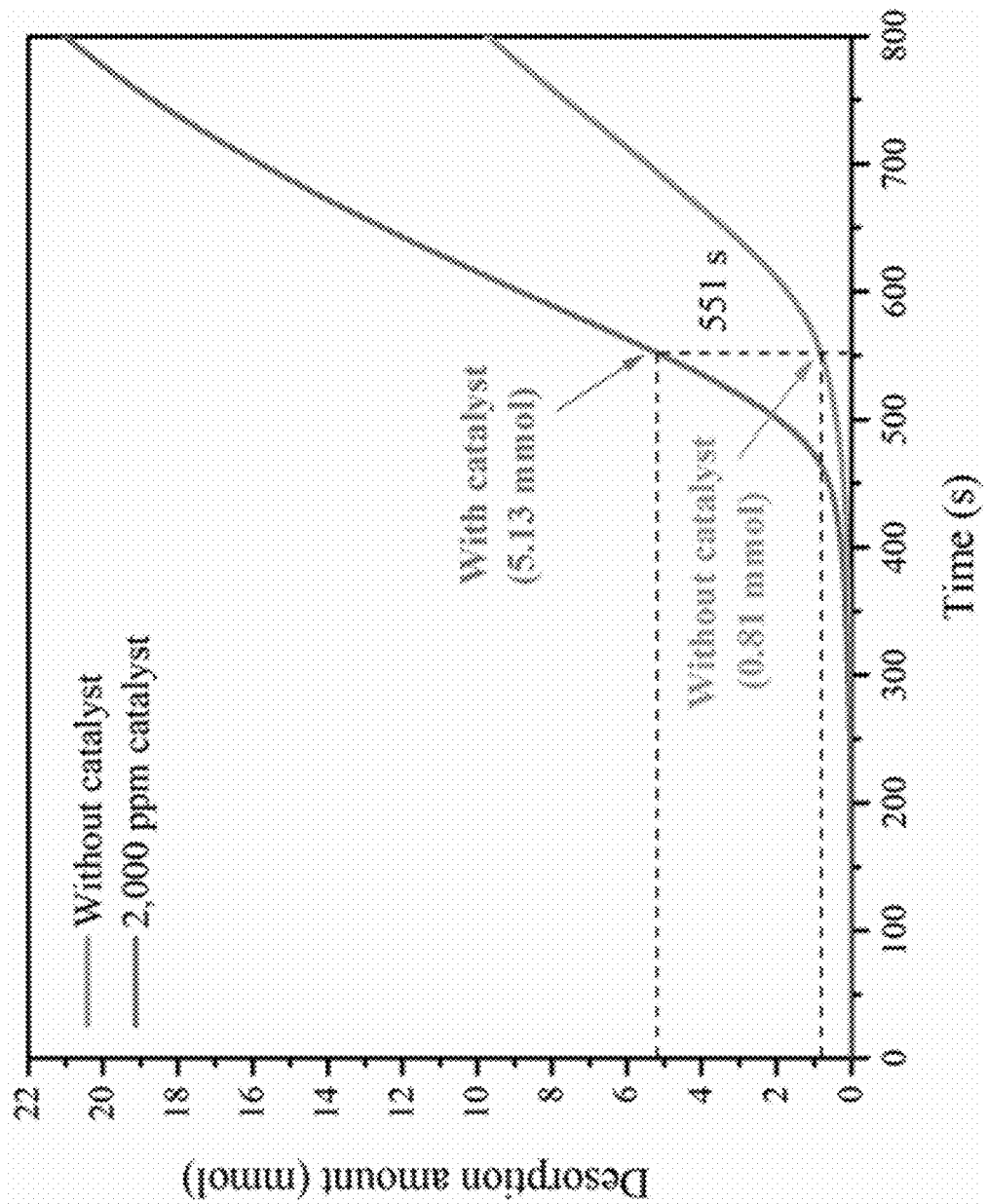
FIG. 15F is yet another plot illustrating the catalytic effects of [EMmim][NTf$_2$] on $CO_2$ desorption in accordance with an exemplary aspect of the present disclosure.
Figure 15G:
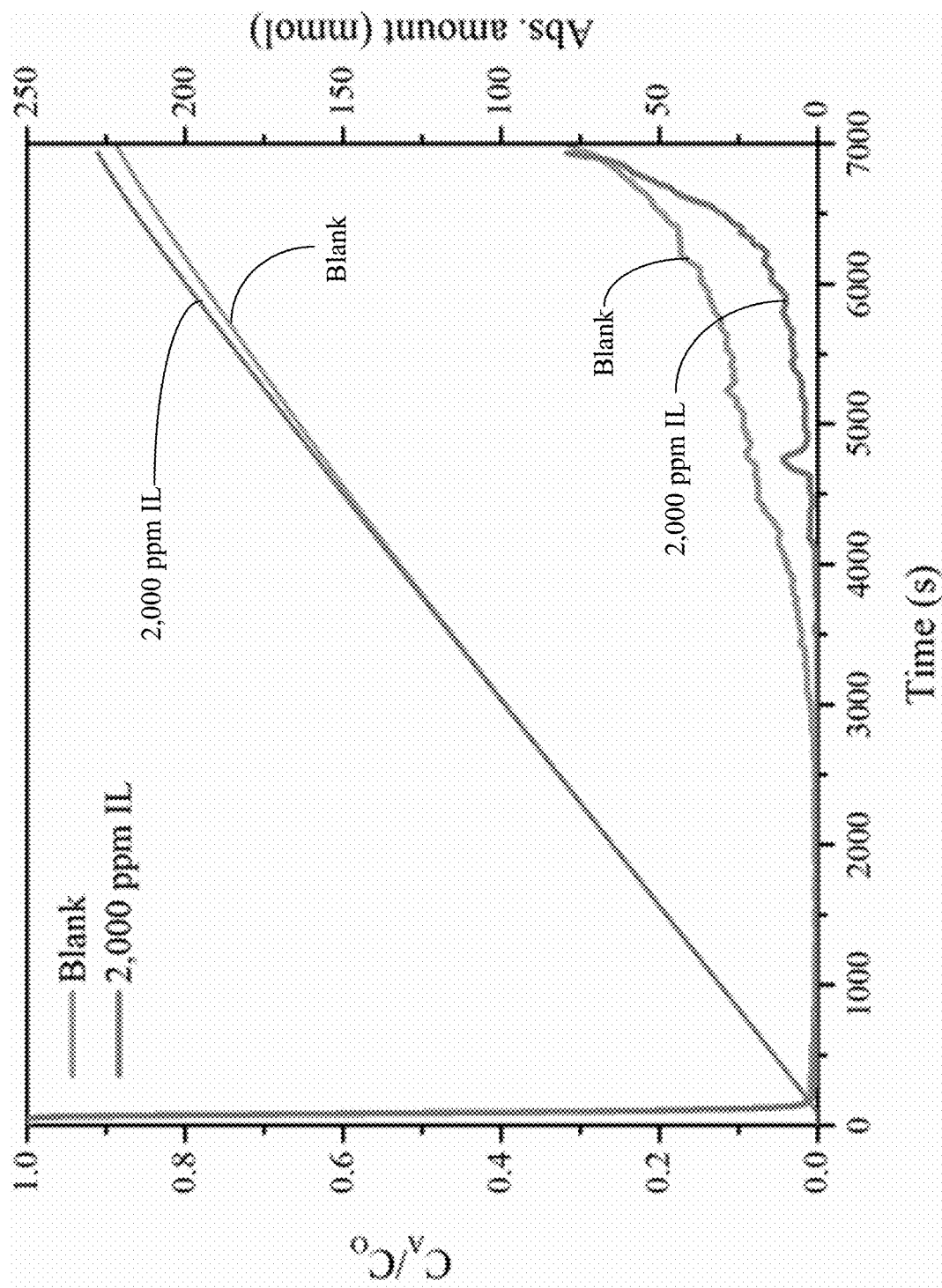
FIG. 15G is a plot illustrating $CO_2$ absorption curves with and without catalyst when the absorption processes were terminated within 7000 seconds with the same outlet $CO_2$ concentrations (3.2 vol %)
Figure 15H:
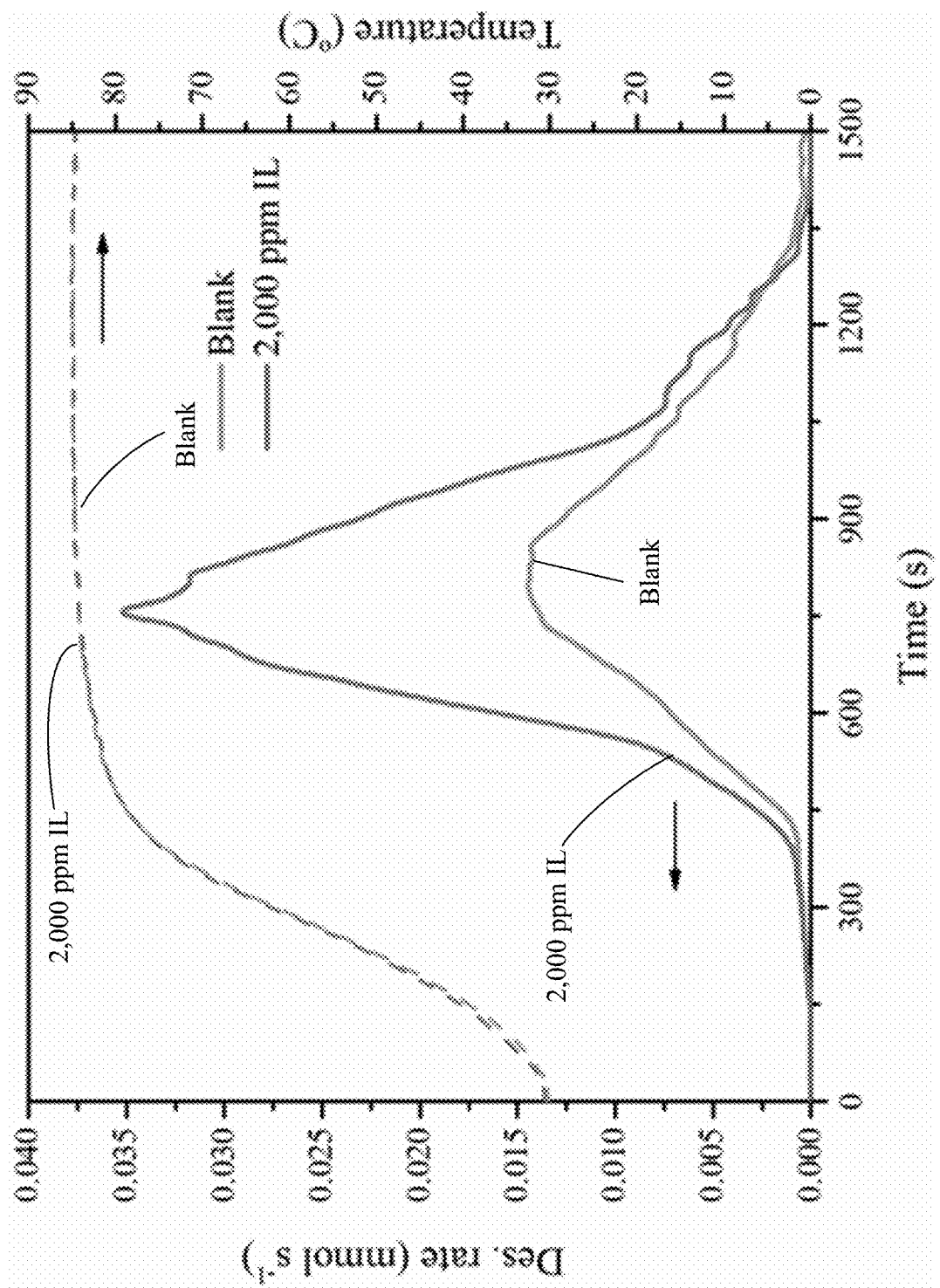
FIG. 15H is a plot illustrating $CO_2$ desorption curves with and without catalyst when the absorption processes were terminated within 7000 seconds with the same outlet $CO_2$ concentrations (3.2 vol %)
Figure 15I:
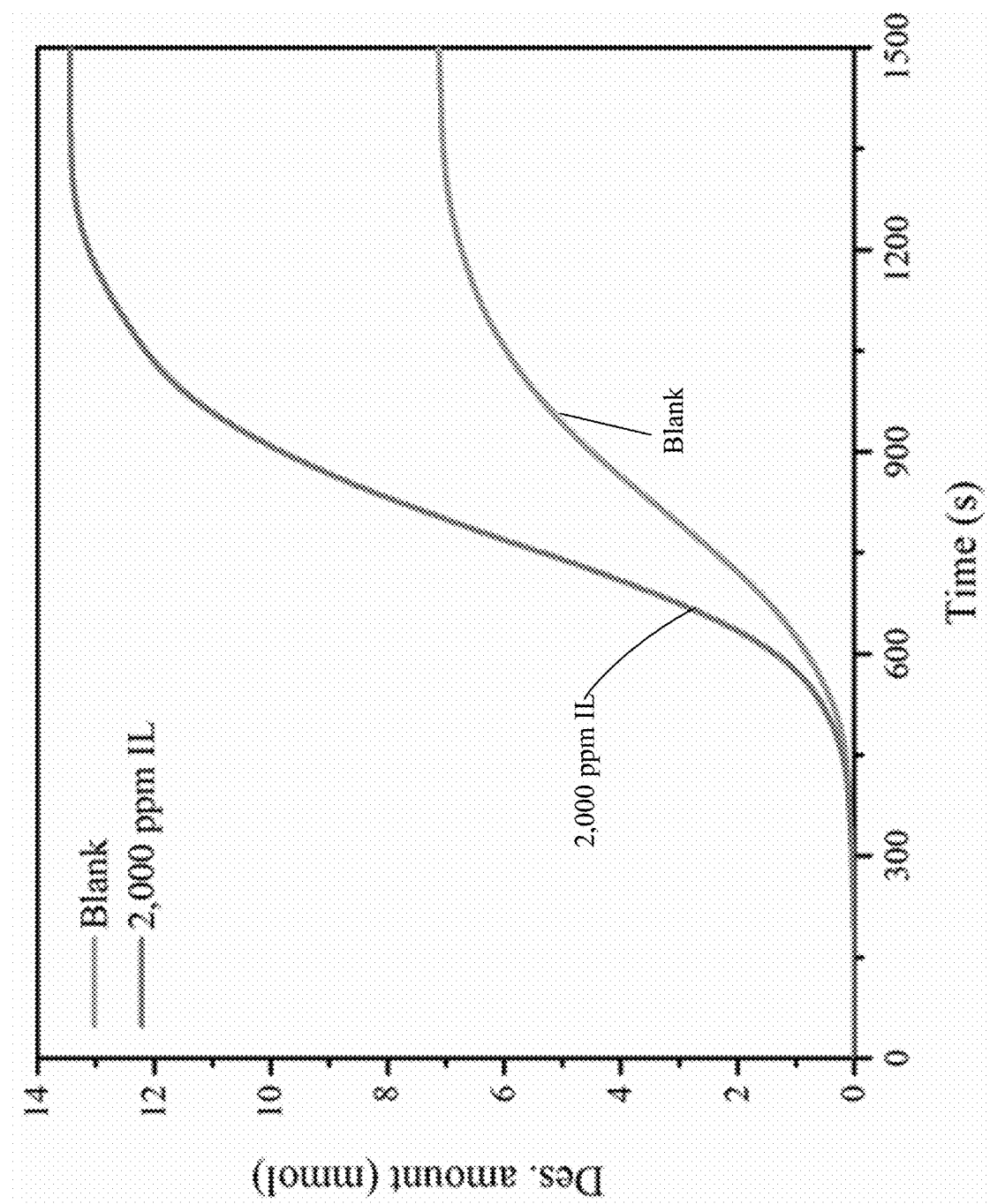
FIG. 15I is a plot illustrating $CO_2$ desorption curves with and without catalyst when the absorption processes were terminated within 7000 seconds with the same outlet $CO_2$ concentrations (3.2 vol %)
Figure 16A:
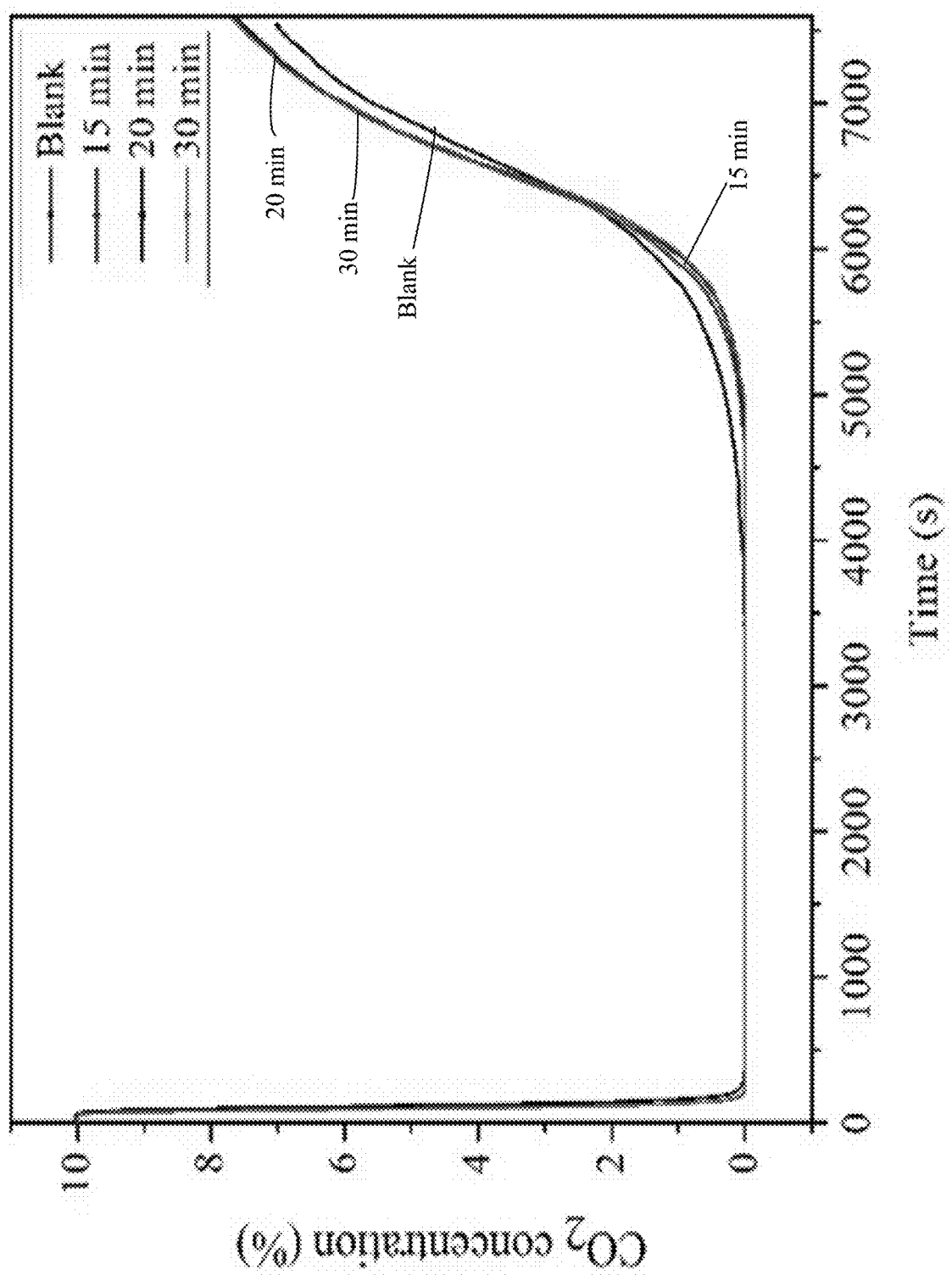
FIG. 16A provides a graph of $CO_2$ absorption curves of 20 wt % MEA solution illustrating the effect of ultrasonic treatment on catalytic $CO_2$ absorption performance.
Figure 16B:
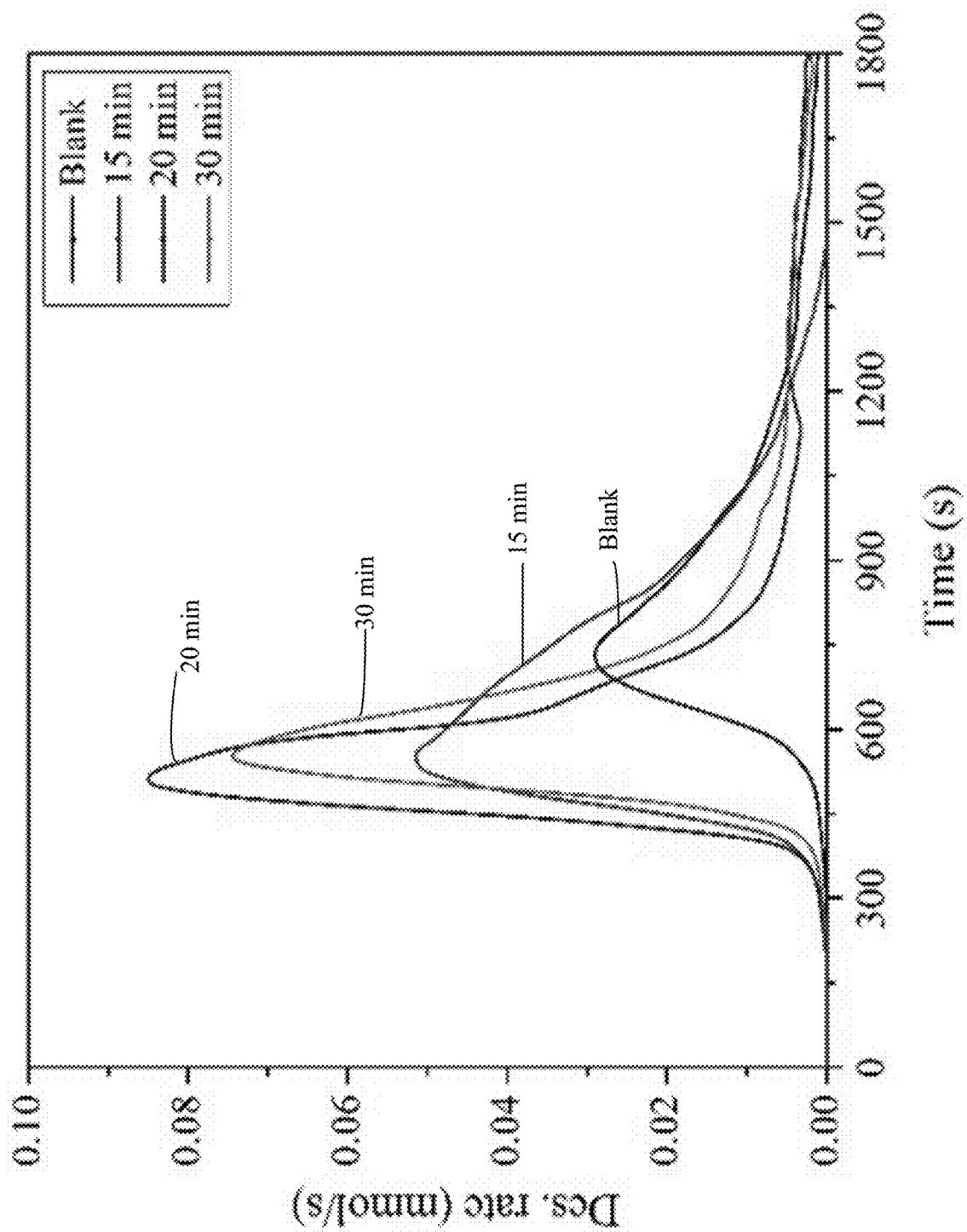
FIG. 16B provides a graph of $CO_2$ desorption rate of rich 20 wt % MEA solution illustrating the effect of ultrasonic treatment on catalytic $CO_2$ desorption (des.) performance.
Figure 16C:
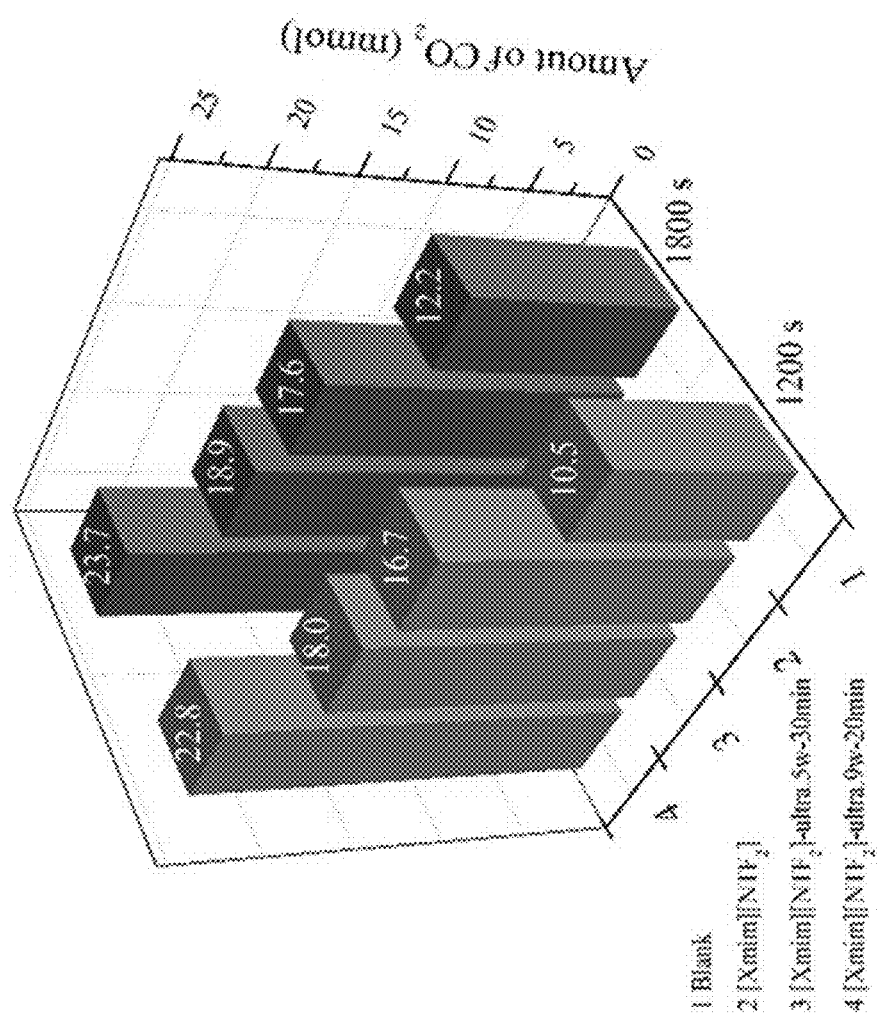
FIG. 16C provides another graph of $CO_2$ desorption rate of rich 20 wt % MEA solution illustrating the effect of ultrasonic treatment on catalytic $CO_2$ desorption (des.) performance.

Variations of desorption with time with and without uses of catalyst are illustrated in FIG. 15D. The time needed for reaching the maximum desorption rate with the use of [EMmim][NTf$_2$] is shortened by 150 s in comparison to the time required for CO$_2$ desorption without the use of the IL catalyst. Meanwhile, the peak desorption rate improvement is 175%. The increases in desorption rate and the desorbed CO$_2$ amount obtained with [EMmim][NTf$_2$] can reach as high as 791% at 507 s and 534% at 551 s (see FIG. 15D, FIG. 15E, and FIG. 15F), respectively. The quantities of CO$_2$ desorbed from uncatalytic and catalytic solutions are 18.7 and 28.2 mmol, respectively. When the absorption time is 7,000 s or the outlet CO$_2$ concentrations of both uncatalyzed and catalyzed CO$_2$ absorption are 3.2 vol % (FIGS. 15G-15I), use of [EMmim][NTf$_2$] can increase the total desorbed CO$_2$ amount by 88.90%. Where, specifically, in accordance with aspects of the present disclosure, FIG. 15G discloses the CO$_2$ absorption profiles of 20 wt % MEA sorbent. Where, specifically, in accordance with aspects of the present disclosure, FIG. 15H shows, by example, the CO$_2$ desorption rates of 20 wt % MEA sorbent. And, where, specifically, in accordance with aspects of the present disclosure FIG. 15I shows, for example, the total CO$_2$ desorption amounts. It should be noted that dosage of [EMmim][NTf$_2$] is only 2,000 ppm—the lowest dosage for achieving such significant CO$_2$ capture catalysis effect. To the best knowledge, such a low catalyst dosage has not been reported for achieving such a significant CO$_2$ capture. Also, as a homogeneous catalyst, [EMmim][NTf$_2$] is easy to use. Therefore, [EMmim][NTf$_2$] is quite effective for catalyzing both the CO$_2$ absorption and desorption processes.

3.0 Stabilities of the Catalytic CO$_2$ Capture System

Figure 2A:
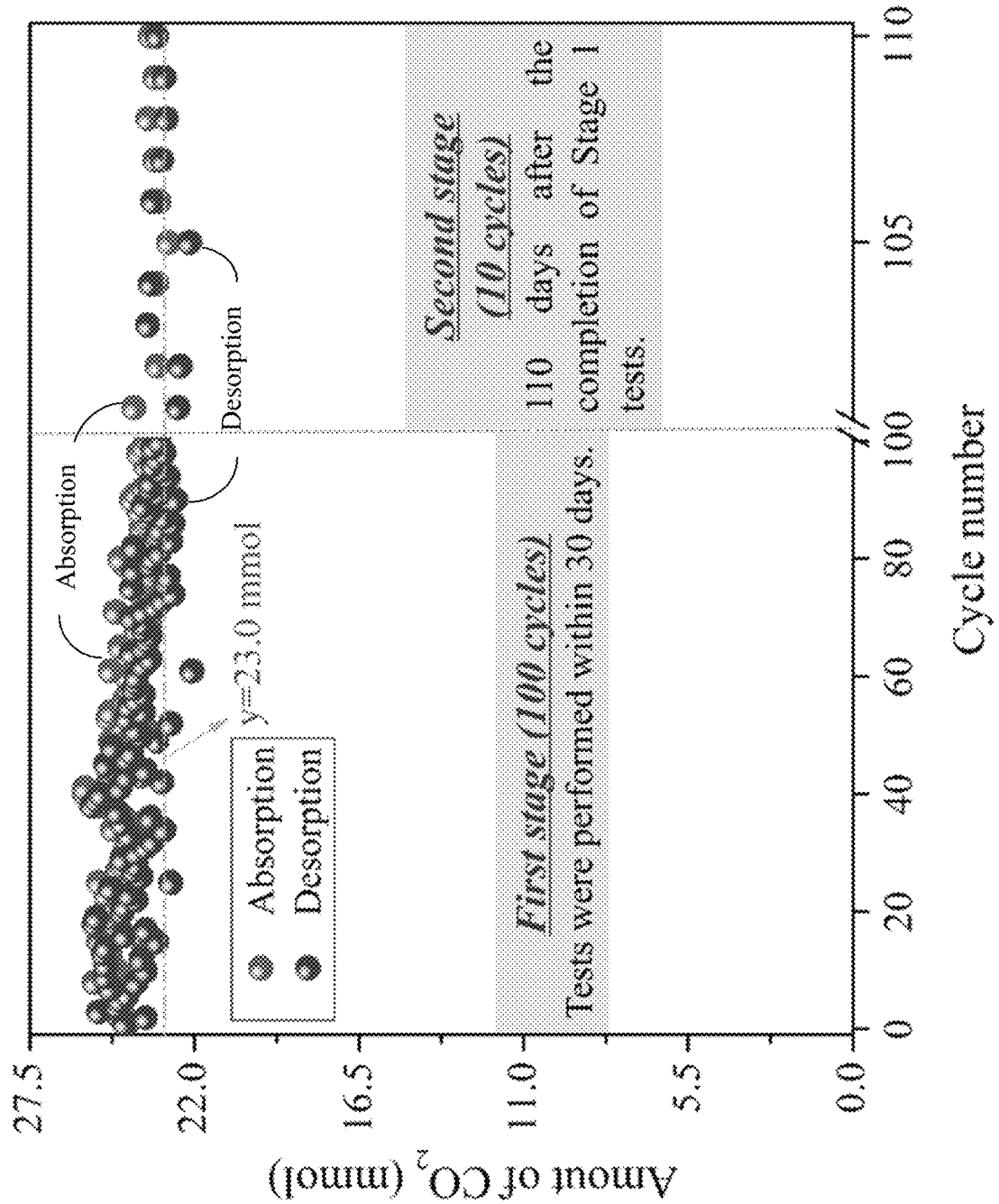
FIG. 2A is a pictorial representation demonstrating stability of the MEA/US-[EMmim+][NTF2−] $CO_2$ capture system for cyclic $CO_2$ absorption-desorption tests more than 4 months in accordance with an exemplary illustration.
Figure 2B:
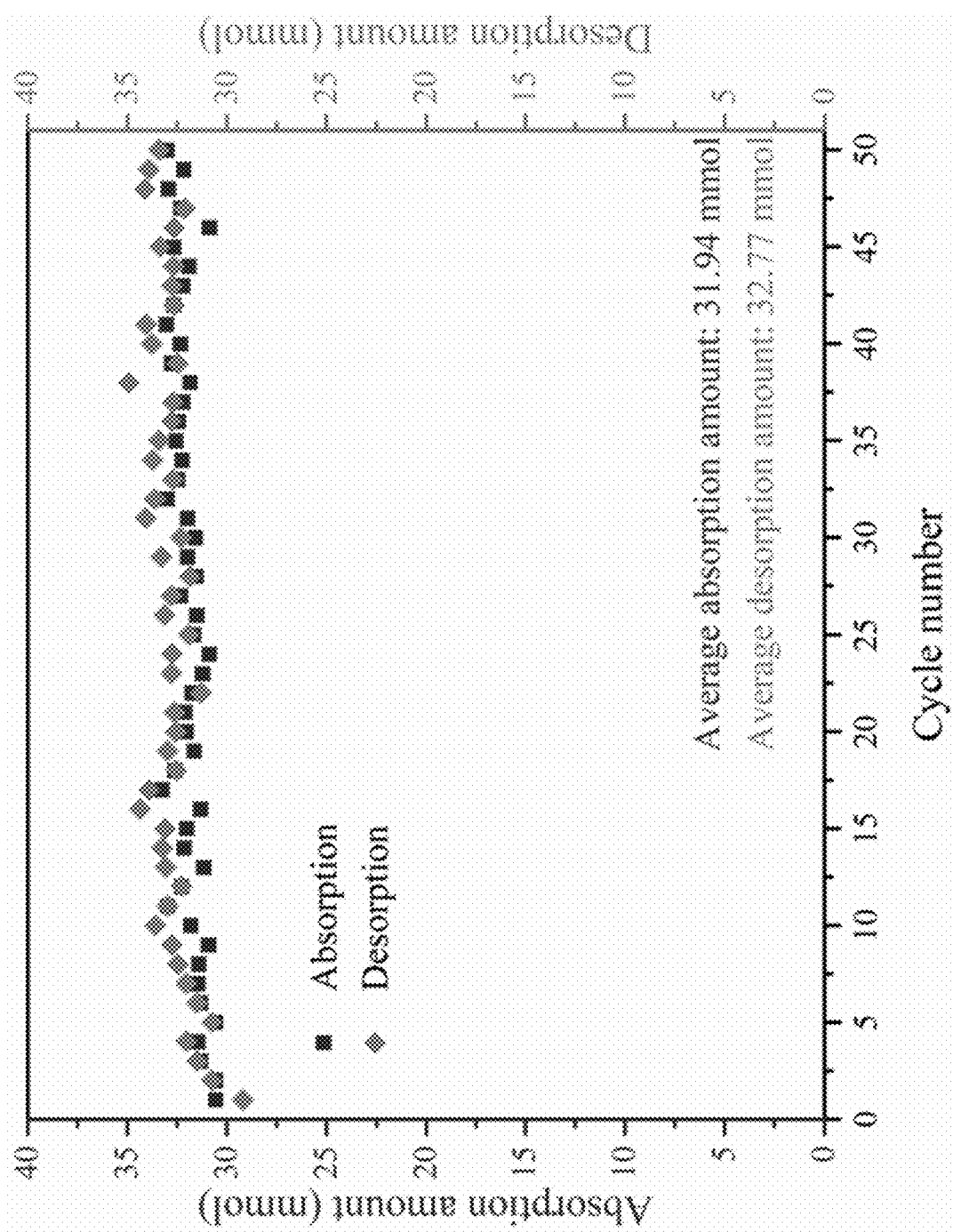
FIG. 2B is a plot illustrating an evaluation of stability of [EMmim][NTf$_2$] as a catalyst for MEA based $CO_2$ capture.
Figure 17A:
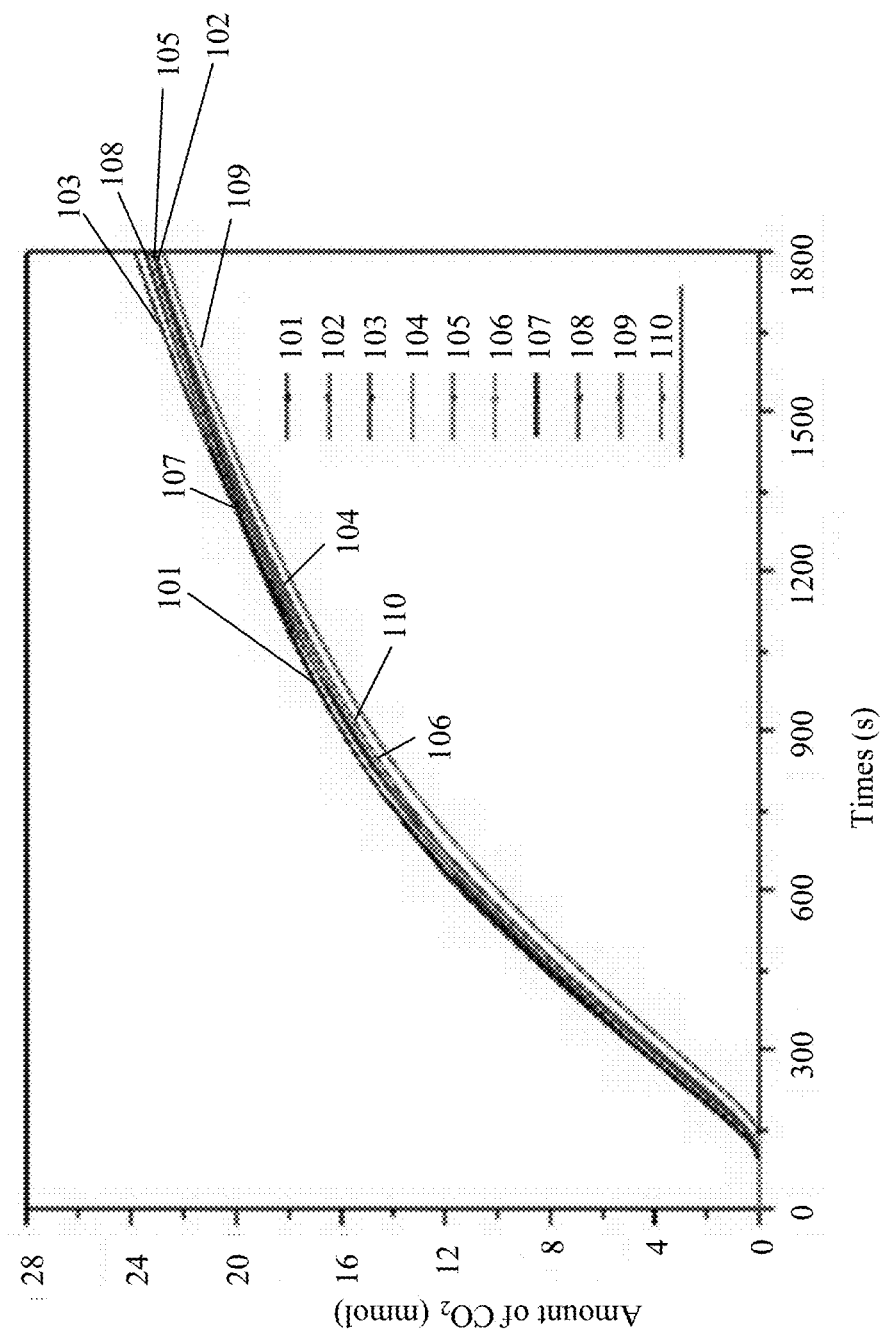
FIG. 17A provides a graph illustrating the amount of absorbed and desorbed $CO_2$ from MEA solution with US-[EMmim$^+$][NTF$_2^-$] catalyst during cycle tests.
Figure 17B:
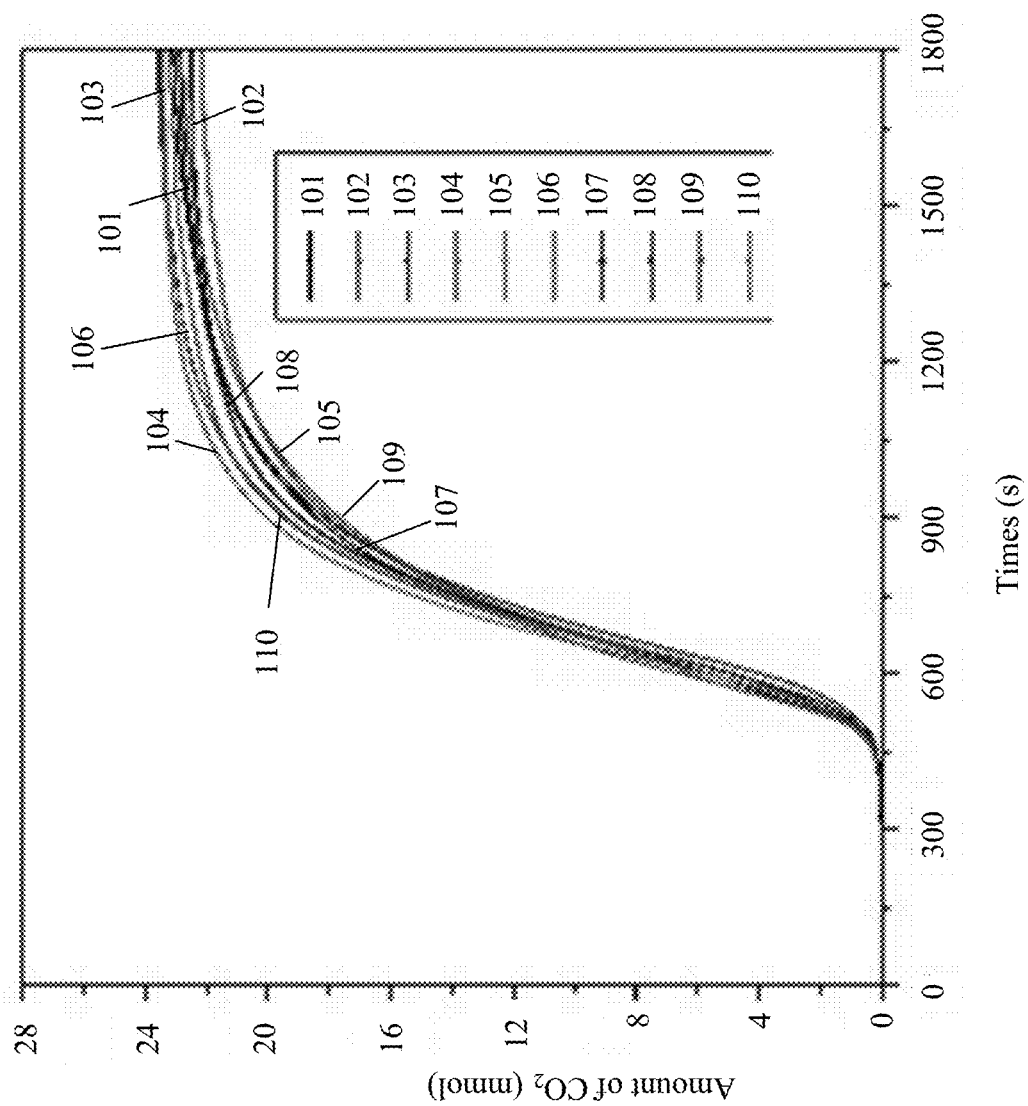
FIG. 17B provides another graph illustrating the amount of absorbed and desorbed $CO_2$ from MEA solution with US-[EMmim$^+$][NTF$_2^-$] catalyst during cycle tests.
Figure 17C:
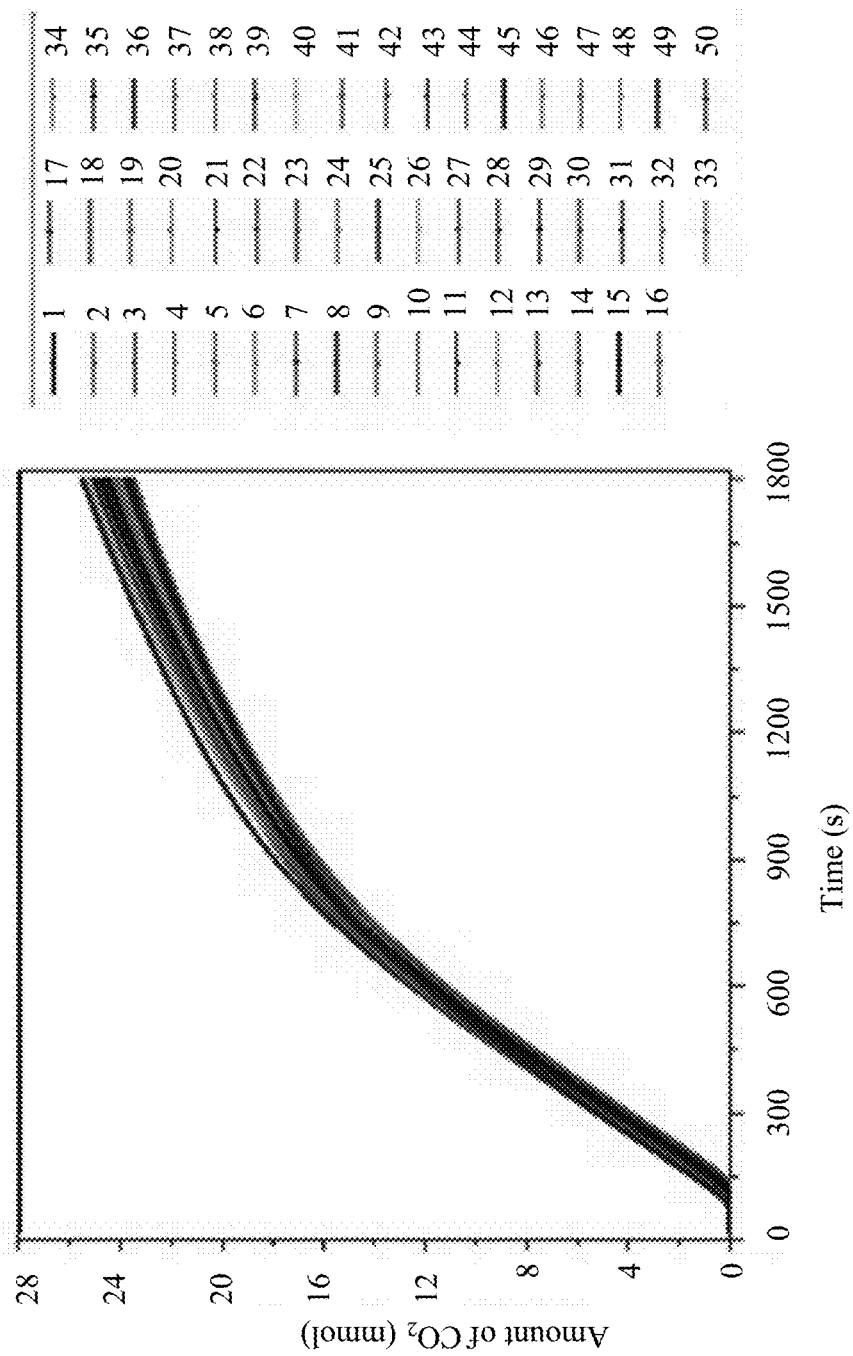
FIG. 17C provides another graph illustrating the amount of absorbed and desorbed $CO_2$ from MEA solution with US-[EMmim$^+$][NTF$_2^-$] catalyst during cycle tests.
Figure 17D:
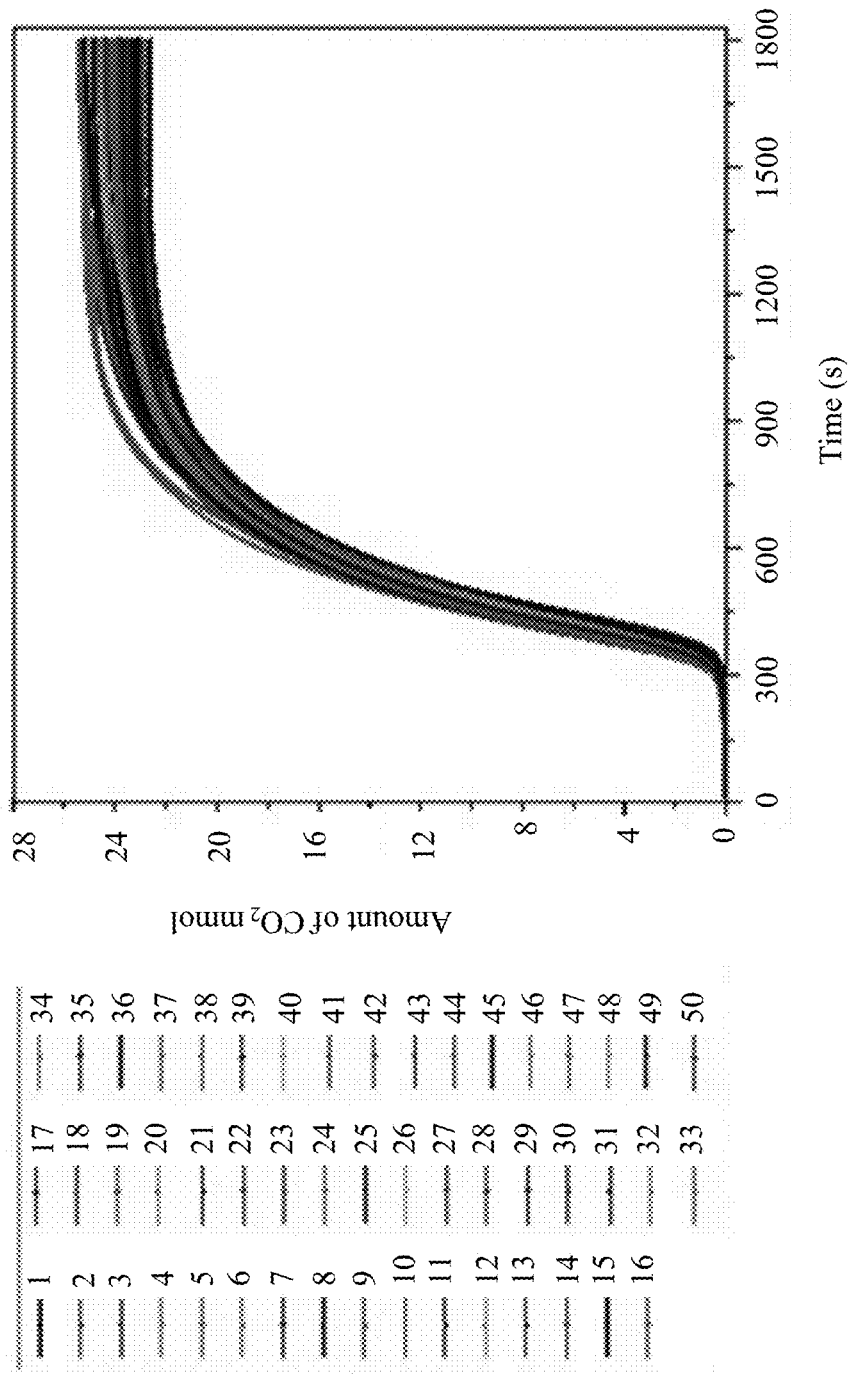
FIG. 17D provides a graph illustrating the amount of absorbed and desorbed $CO_2$ from MEA solution with US-[EMmim$^+$][NTF$_2^-$] catalyst during cycle tests.
Figure 17E:
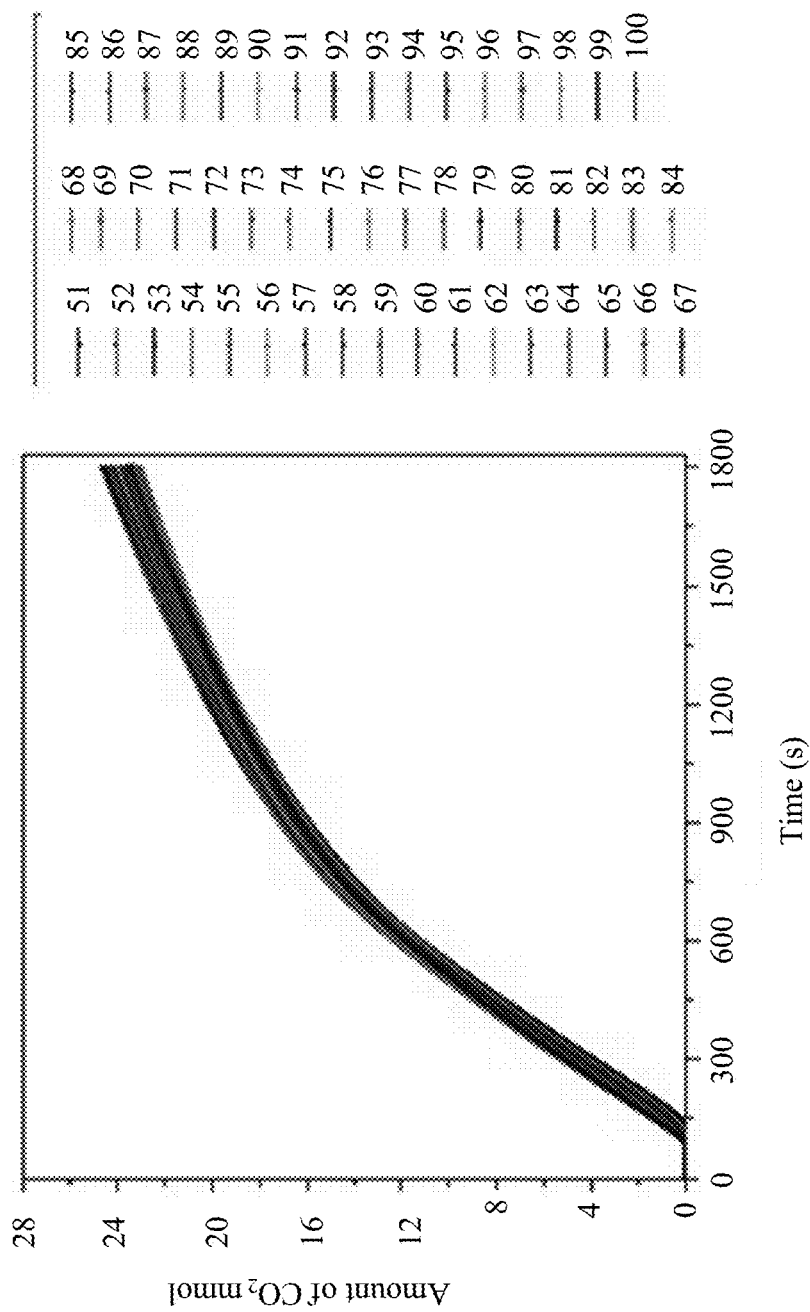
FIG. 17E provides a graph illustrating the amount of absorbed and desorbed $CO_2$ from MEA solution with US-[EMmim$^+$][NTF$_2^-$] catalyst during cycle tests.
Figure 17F:
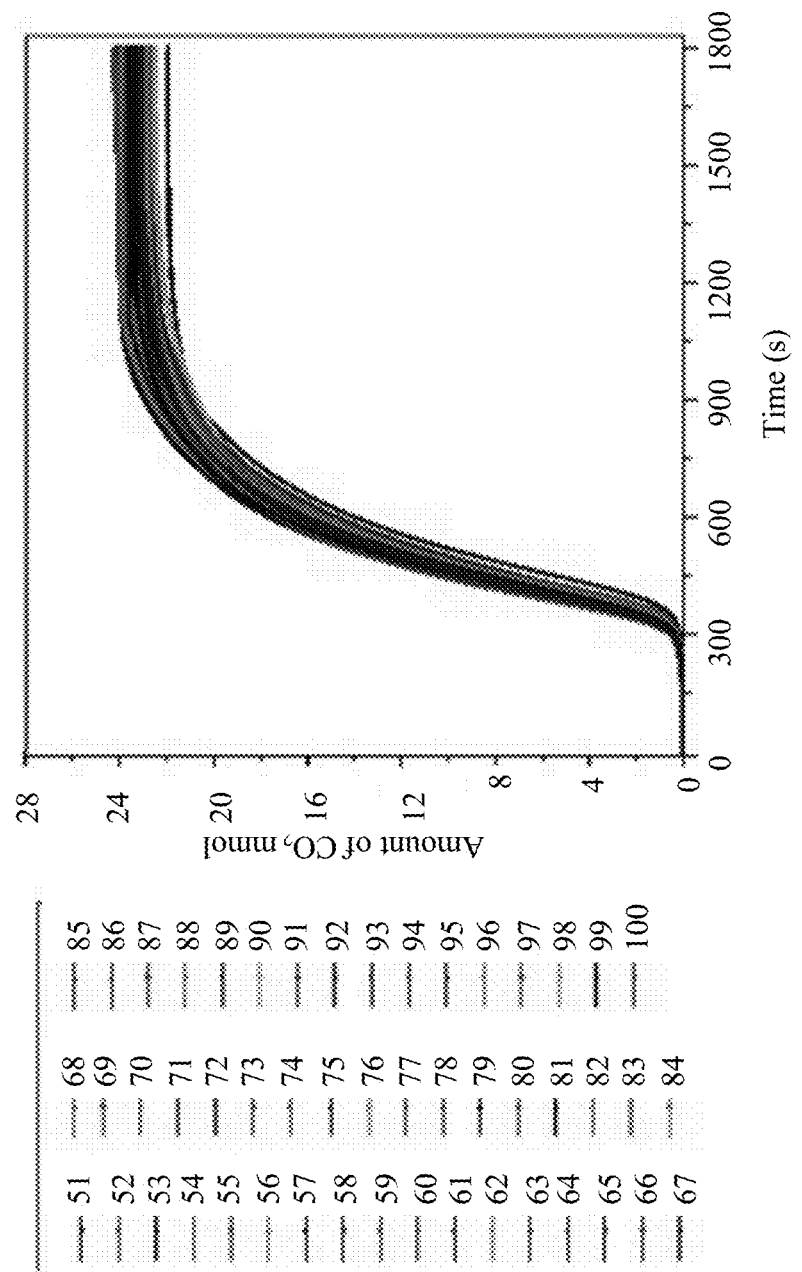
FIG. 17F provides a graph illustrating the amount of absorbed and desorbed $CO_2$ from MEA solution with US-[EMmim$^+$][NTF$_2^-$] catalyst during cycle tests.
Figure 18A:
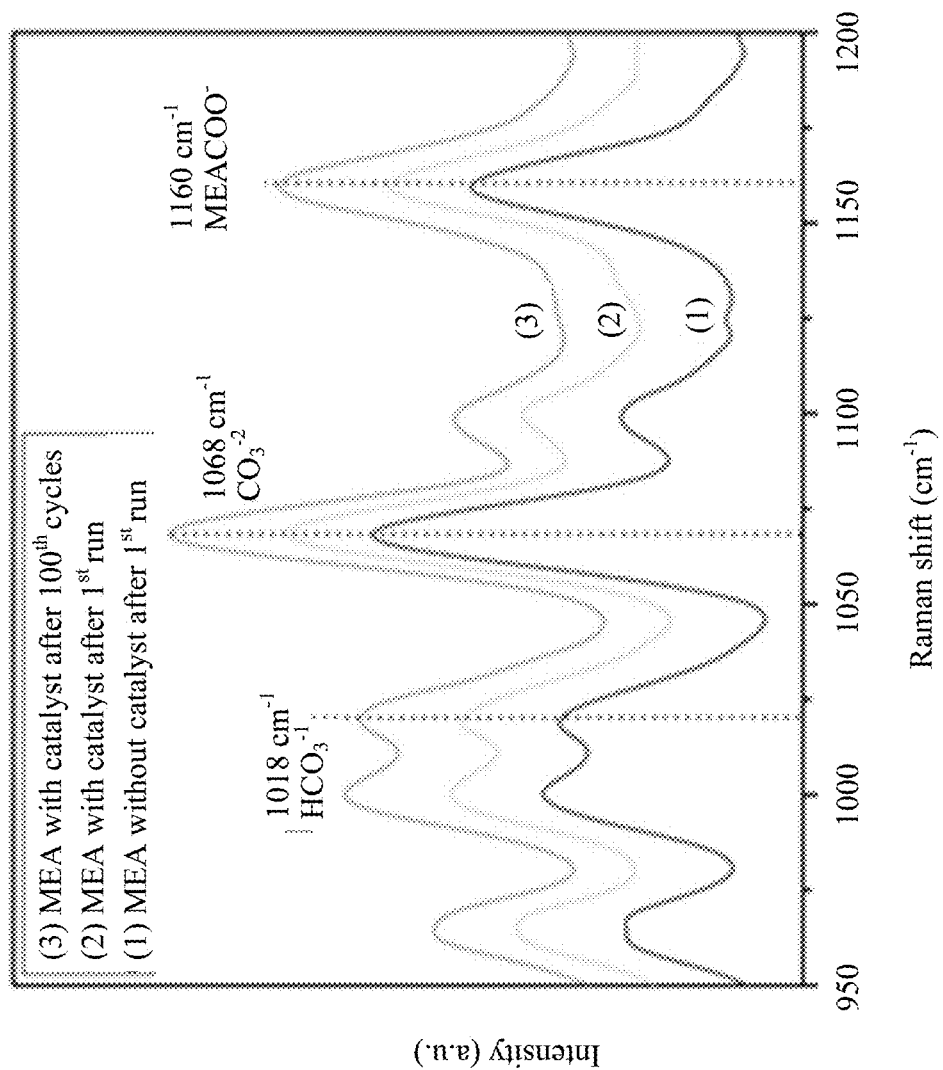
FIG. 18A illustrates exemplary FT-IR and Raman spectra of MEA solution with US-[EMmim$^+$][NTF$_2^-$] catalyst after cycle tests.
Figure 18B:
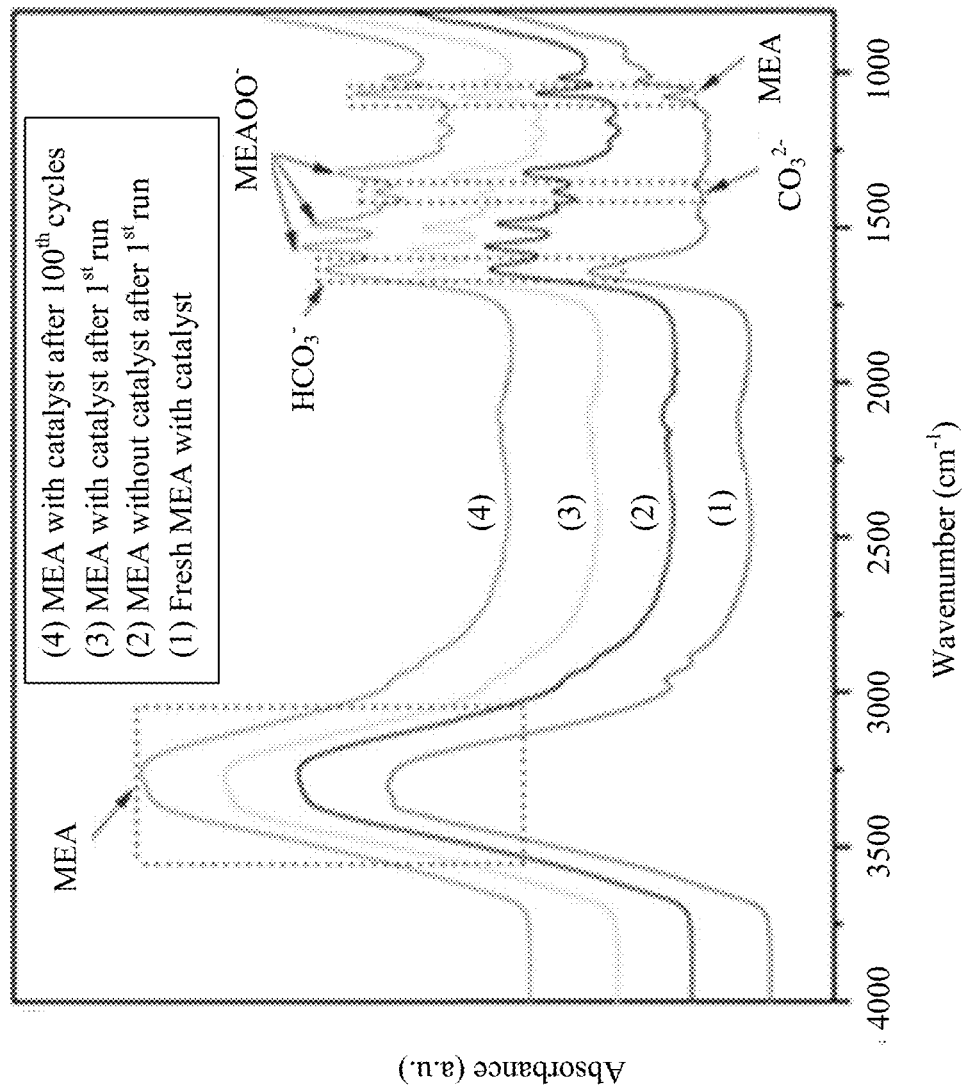
FIG. 18B illustrates another exemplary FT-IR and Raman spectra of MEA solution with US-[EMmim$^+$][NTF$_2^-$] catalyst after cycle tests.
Figure 18C:
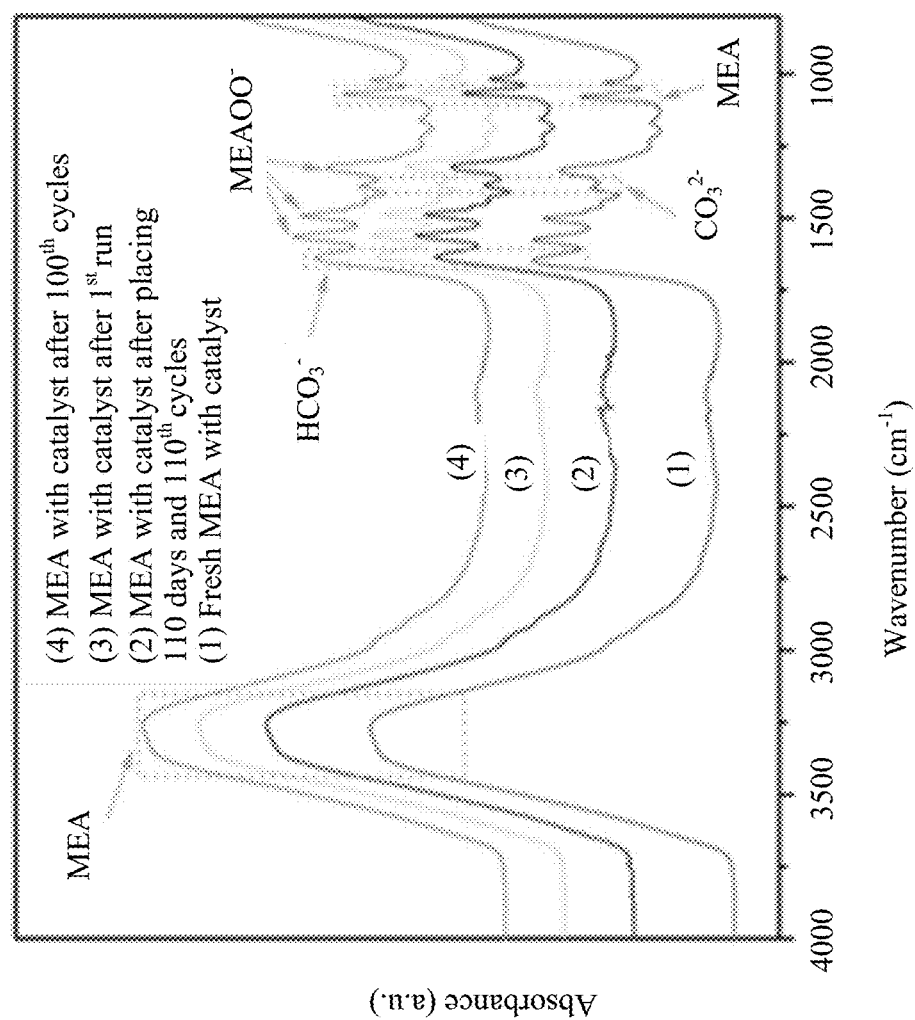
FIG. 18C illustrates exemplary FT-IR and Raman spectra of MEA solution with US-[EMmim$^+$][NTF$_2^-$] catalyst after cycle tests.
Figure 19:
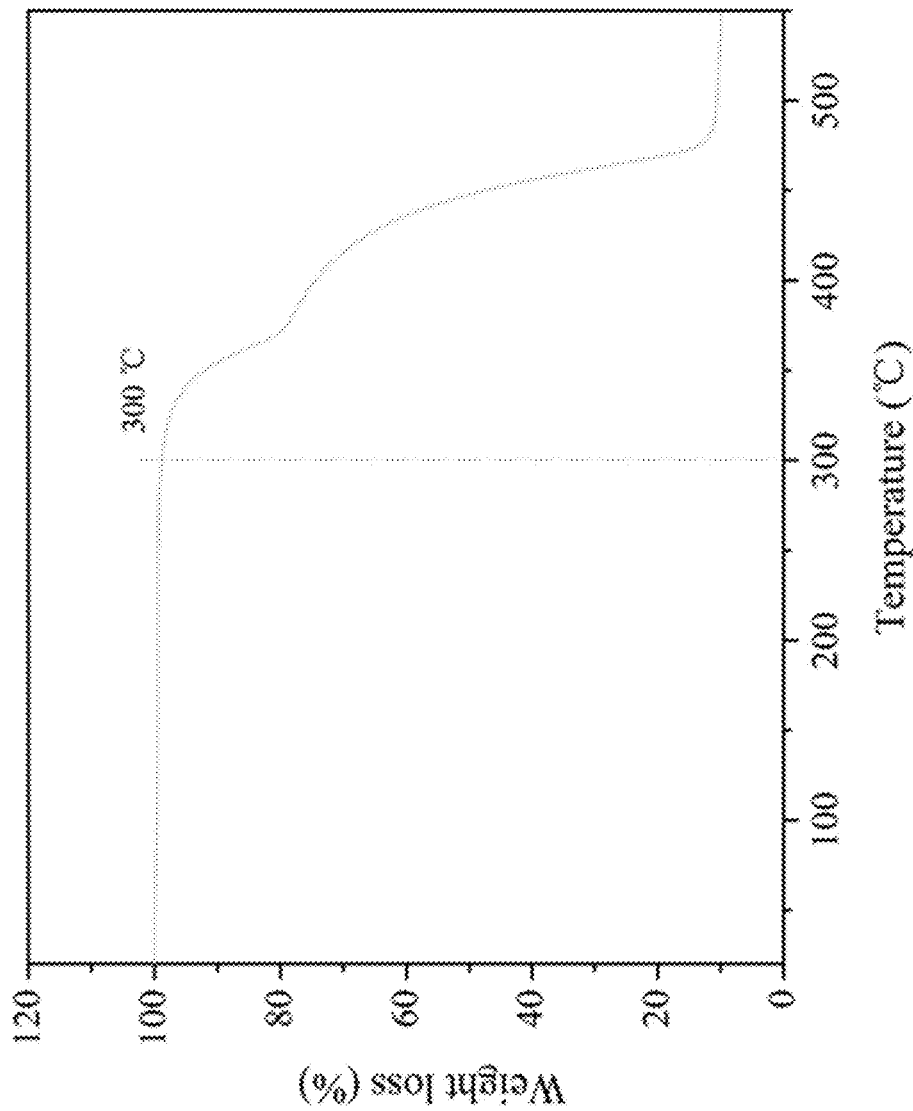
FIG. 19 illustrates the TGA curve of [EMmim$^+$][NTF$_2^-$]

The long-term stabilities of US-[EMmim$^+$][NTF$_2^-$] for CO$_2$ absorption-desorption can be studied with 110 cyclic tests during more than 4 months, and the results are shown in FIGS. 2A and 2B where, for example, For Stage 1: CO$_2$ absorption-desorption cyclic test for 1-100 cycles within 30 days. For Stage 2: tests were performed with the same solvent system used in stage 1 after the tests of stage 1 had been completed for 110 days (101-110 cyclic tests). Absorption conditions: 100 g 20 wt % MEA solution with 3,000 ppm catalyst; composition of inlet gas: 10 vol % CO$_2$, 10 vol % O$_2$, and 80 vol % N$_2$; flow rate of inlet gas: 500 mL/min; temperature: 30° C.; time: 1,800 s. Desorption conditions: flow rate of carrier gas N$_2$: 500 mL/min; temperature: 30-85° C.; time: 1,800 s, and FIG. 17A-17H, where, for example, FIGS. 17C and 17D are the amount of absorbed and desorbed CO$_2$ for the 1-50 cycle tests. FIGS. 17E and 17F are the amount of absorbed and desorbed CO$_2$ for the 51-100 cycle tests. FIGS. 17A and 17B are the amount of absorbed and desorbed CO$_2$ for the 101-110 cycle tests. For the amount absorbed and desorbed, as shown in FIGS. 17A and 17B, after the 100 cycle tests were completed, and the catalytic CO$_2$ capture system can be placed for 110 days, and then started for the 101-110 cycle tests. Absorption conditions: 100 g 20 wt % MEA solution with 3,000 ppm catalyst; composition of inlet gas: 10 vol % CO$_2$, 10 vol % O$_2$, and 80 vol % N$_2$; flow rate of inlet gas: 500 mL/min; temperature: 30° C.; time: 1,800 s. Desorption conditions: flow rate of carrier gas N$_2$: 500 mL/min; temperature: 85° C.; time: 1,800 s. It can be seen that the MEA/US-[EMmim$^+$][NTF$_2^-$] solution or both MEA and US-[EMmim$^+$][NTF$_2^-$] are stable within more than 4 months, which can be quite satisfactory from industrial application perspective. It can be seen that no apparent change in both quantities of absorbed and desorbed CO$_2$ with the 100 cycles in Stage 1. The average working CO$_2$ capture capacity within the 100 cyclic tests conducted within 30-day under the given conditions can be 23.2 mmol, which can be very close to the 24.3 mmol obtained in the first run. The slight decrease can be due to the accumulative MEA losses, resulting from the difficulty in condensing and recycling the regenerated MEA in each CO$_2$ desorption step. In other words, a trace amount of the regenerated MEA can be taken away during each cyclic CO$_2$ absorption desorption operation. As shown in FIGS. 18A-18C, FT-IR and Raman results of the regenerated MEA solution also confirm that no change in the structure of MEA molecules can be observed after 100 cycles of the tests. Thus, the chemical reversibility of both MEA and the organocatalyst can be easily realized for the tested CO$_2$ absorption and desorption temperatures, ~30° C. and 85° C., respectively. It should be noted that [EMmim$^+$][NTF$_2^-$] can thermally be stable at as high as 300° C. as shown in FIG. 19, where, for example, Thermogravimetric analyses (TGA) curve of IL can be obtained using a TA Instruments SDT Q600 apparatus with a heating ramp of 10° C./min at the temperature of 20-550° C. It should be noted that [EMmim$^+$][NTF$_2^-$] can thermally be stable at as high as 300° C.

To further confirm the outstanding stability of the coexisting MEA/US-[EMmim$^+$][NTF$_2^-$] based CO$_2$ capture solution, 10 more cyclic or Stage 2 tests were performed after 110 days of the completion of 100 cyclic or Stage 1 tests, by using the same used MEA/US-1EMmim$^+$1[NTF$_2^-$] system. For Stage 2, each of the cyclic test results are shown in FIGS. 2A and 2B and FIGS. 17A and 17B, where it can be seen that the average working CO$_2$ capture capacity can be 23.0 mmol, which represents only a 1.7% decrease compared to that obtained in Stage 1. Furthermore, the FT-IR results (FIG. 18C), of the MEA/US-[EMmim$^+$][NTF$_2^-$] CO$_2$ capture system indicate both MEA and US-[EMmim$^+$][NTF$_2^-$] are stable for more than 4 months. For example, the Raman and FT-IR spectra of MEA solution with IL after 100 cycle tests are shown in FIGS. 18A and 18B. FIG. 18C shows the FT-IR spectra of MEA solution with IL after placing 110 days and 120 cycle tests. These Raman and FT-IR spectra further confirmed the outstanding stability of the coexisting MEA/US-[EMmim$^+$][NTF$_2^-$] based CO$_2$ capture solution Such a good cyclic performance has not yet been reported in the disclosure.

The great repeatability of the CO$_2$ capture system lies in the good stability of the catalytic CO$_2$ capture solution.

Figure 20:
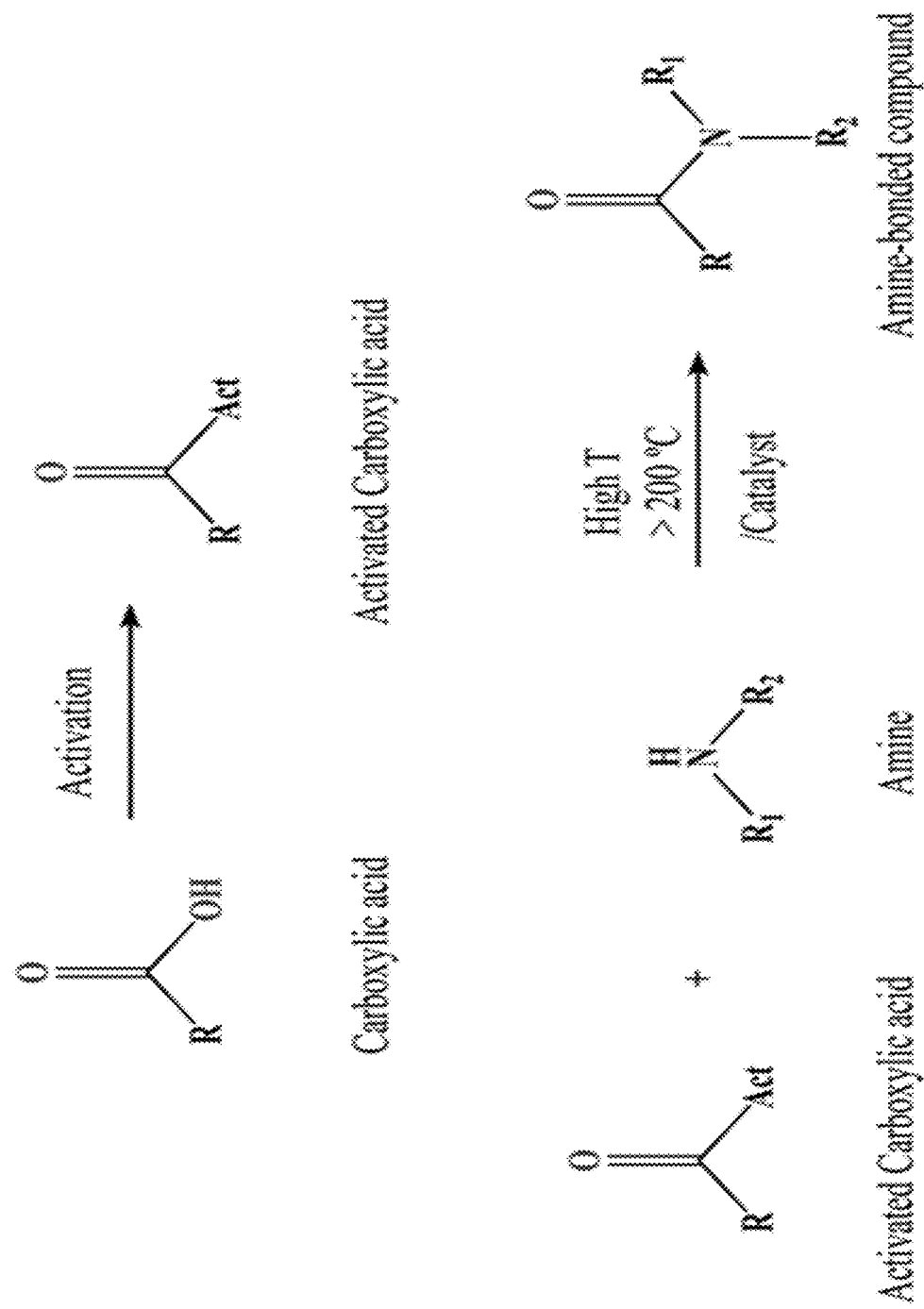
FIG. 20 illustrates the principle of the activation and formation of amide-bond compound.
Figure 21A:
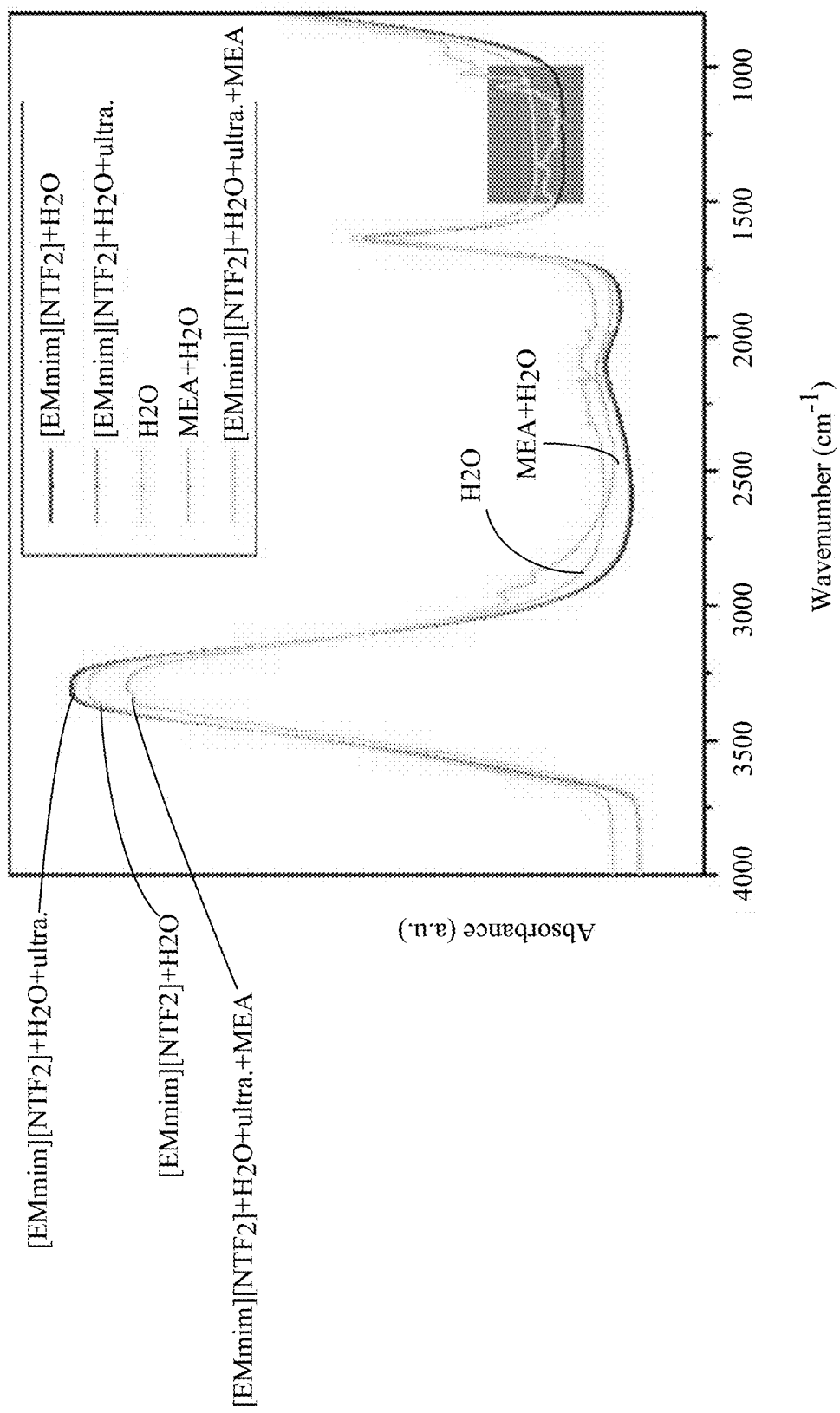
FIG. 21A illustrates FT-IR spectra of [EMmim$^+$][NTF$_2^-$]
Figure 21B:
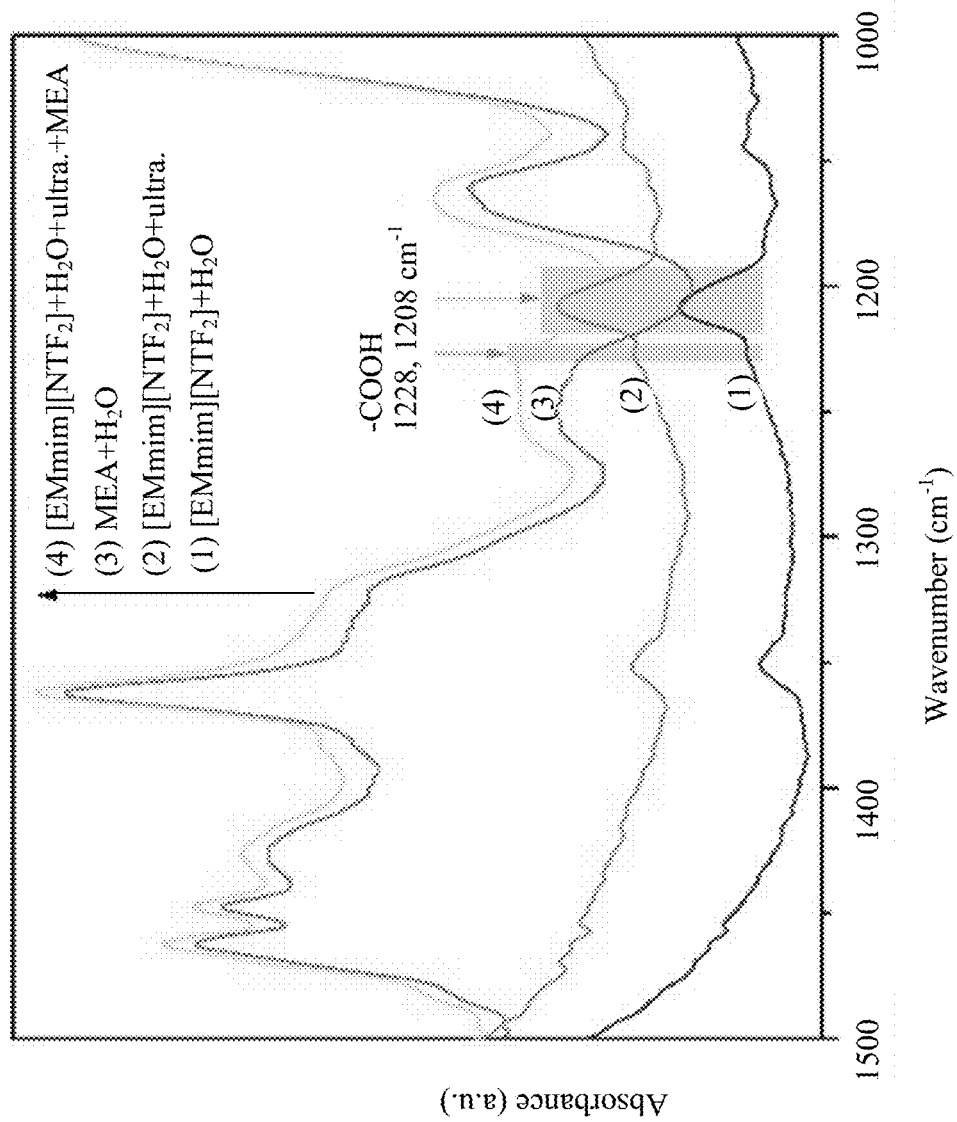
FIG. 21B illustrates another FT-IR spectra of [EMmim$^+$][NTF$_2^-$]
Figure 21C:
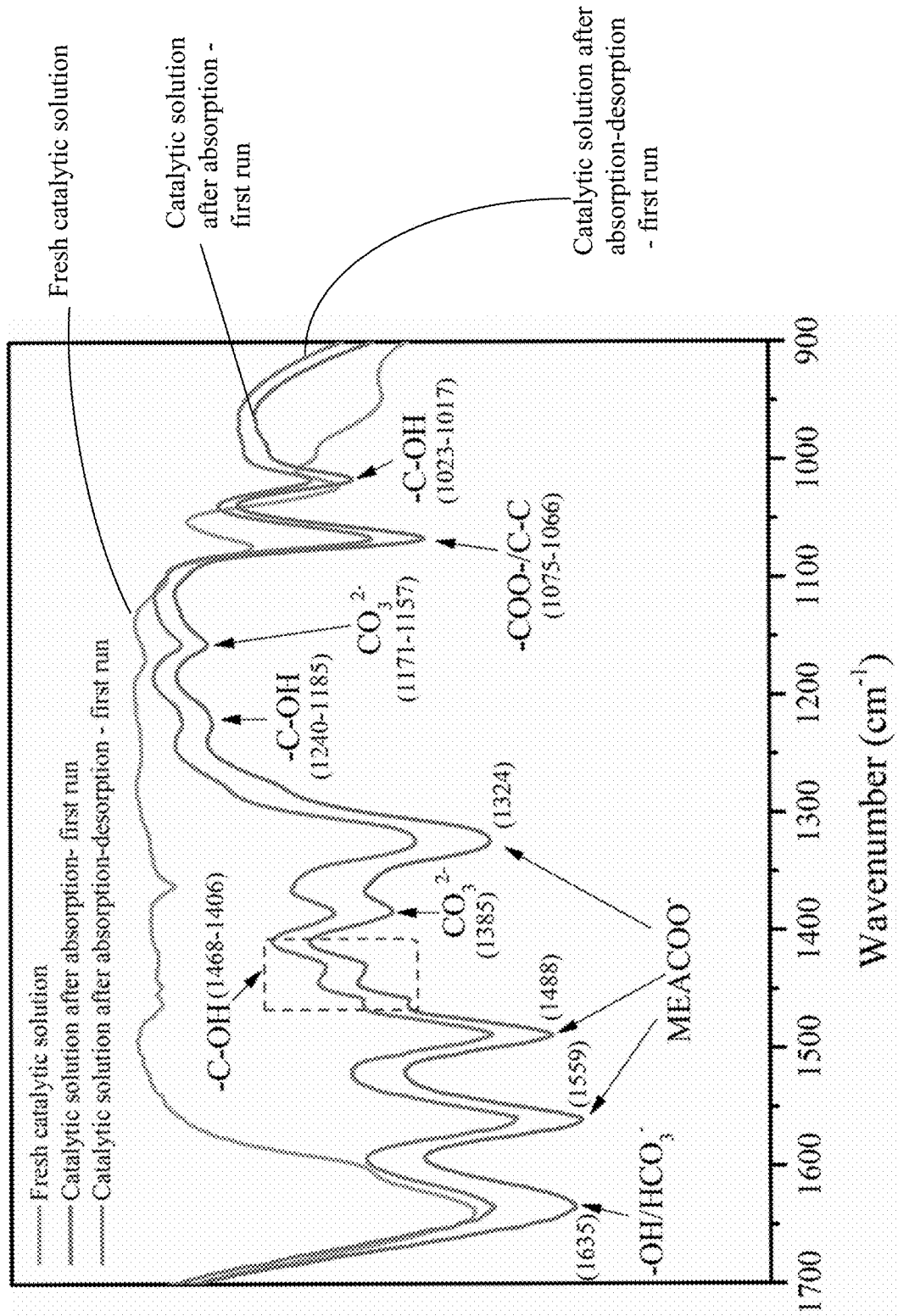
FIG. 21C illustrates another FT-IR spectra of [EMmim$^+$][NTF$_2^-$]

According to Valeur et al. in FIG. 20, strict conditions, not only desired catalysts but also high operation temperatures (>200° C.) must be required to complete the energetic demands for reversible $CO_2$ capture. For example, the reaction between the mim$^+$COOH and amine cannot take place unless at the high temperature condition or the presence of coupling reagents. Also, due to the alkyl ester is an inert substrate, the reaction between the alkyl ester and amine requires rather harsh reaction conditions, such as high temperature, high pressure or the use of strongly basic reagent. The listed reaction cannot occur in the present work, due to the lower $CO_2$ desorption temperature (no more than 85° C.) and the absence of the required catalyst for the reaction. However, much milder $CO_2$ absorption and desorption temperatures were actually adopted in this case, and thus [EMmim$^+$][NTF$_2^-$] should be stable which can be further confirmed by the FT-IR spectra of the mixture of US-[EMmim$^+$][NTF$_2^-$] and MEA or catalytic $CO_2$ capture system as shown in FIG. 10 and FIGS. 21A-21C, where, for example, the peaks of the —COOH in US-[EMmim$^+$][NTF$_2^-$] and the mixture of US-[EMmim$^+$][NTF$_2^-$] and MEA are identical, a sign of no interaction between two function groups, —COOH and —NH$_2$, or no formation of stable CONH$_2$. The observation indicates that the catalytic function of trace amount of US-[EMmim$^+$][NTF$_2^-$] should not be affected by even large quantity of MEA via the formation of —CONH$_2$. The peaks of the —COOH in US-[EMmim$^+$][NTF$_2^-$] and the mixture of US-[EMmim$^+$][NTF$_2^-$] and MEA are similar, a sign of no interaction between the two functional groups, —COOH and —NH$_2$, or no formation of —CONH$_2$ and thus the catalytic $CO_2$ capture system can be stable.

Figure 17G:
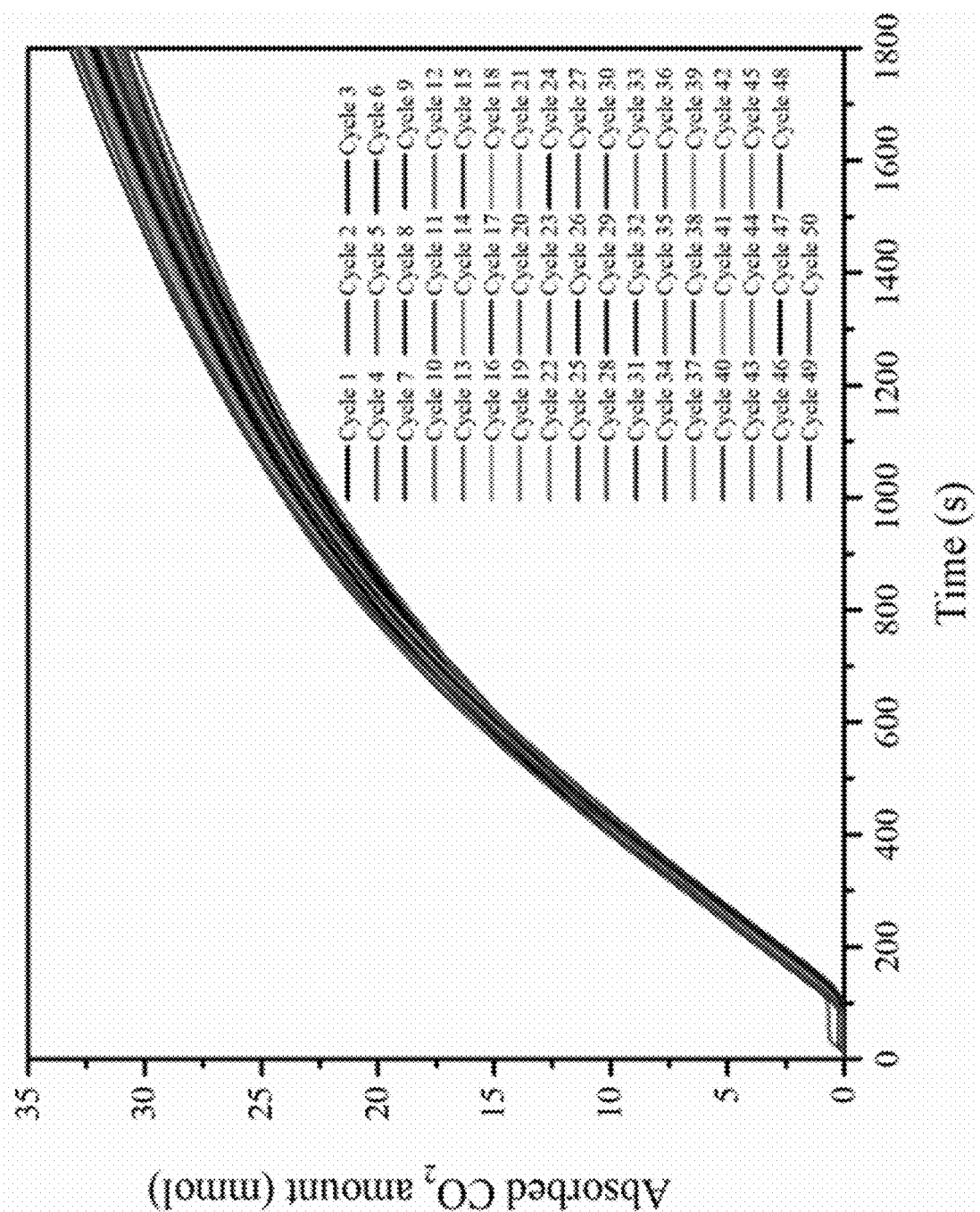
FIG. 17G is a plot illustrating an evaluation of stability of [EMmim][NTf$_2$] as a catalyst for MEA based $CO_2$ capture.
Figure 17H:
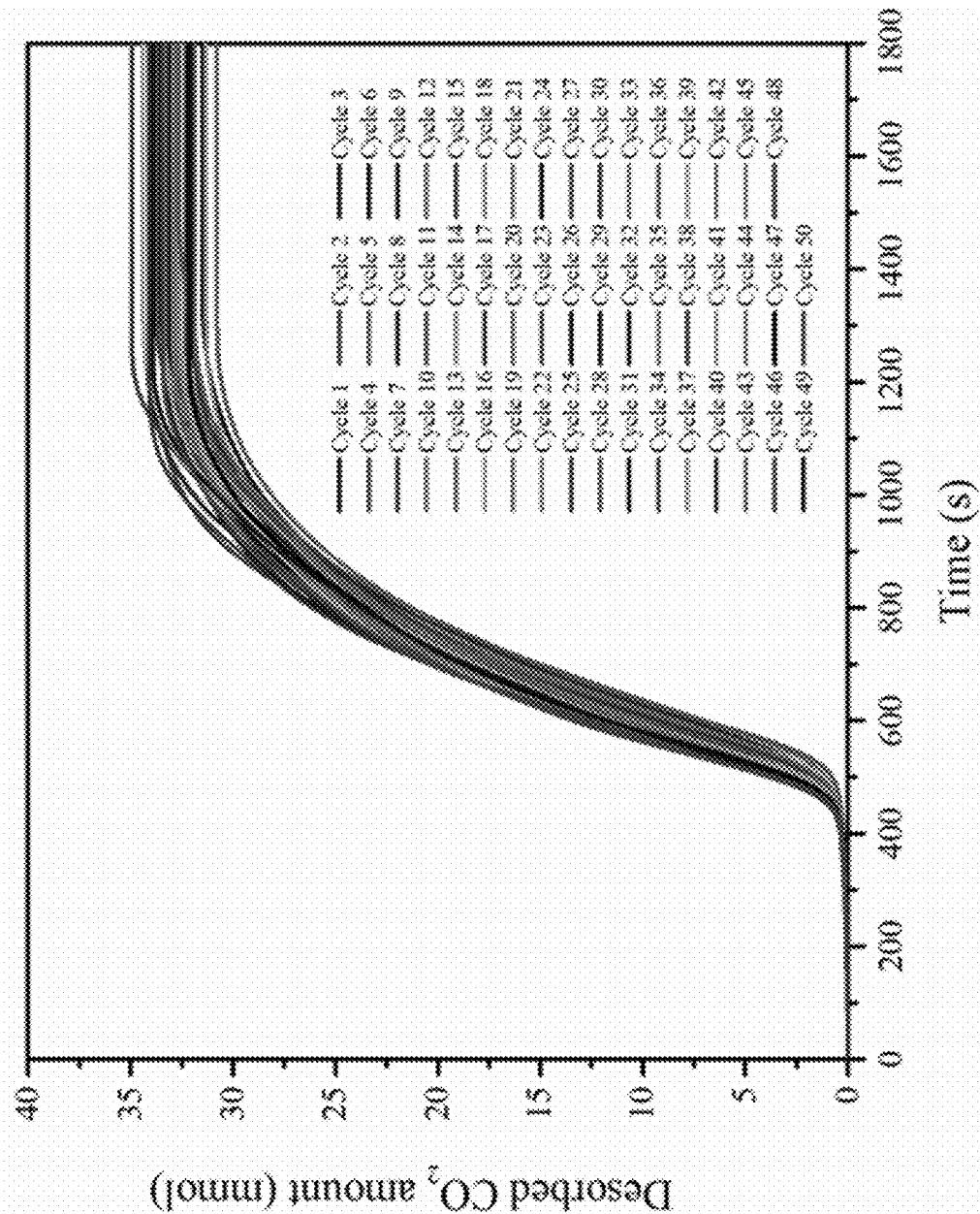
FIG. 17H is another plot illustrating an evaluation of stability of [EMmim][NTf$_2$] as a catalyst for MEA based $CO_2$ capture.
Figure 31:
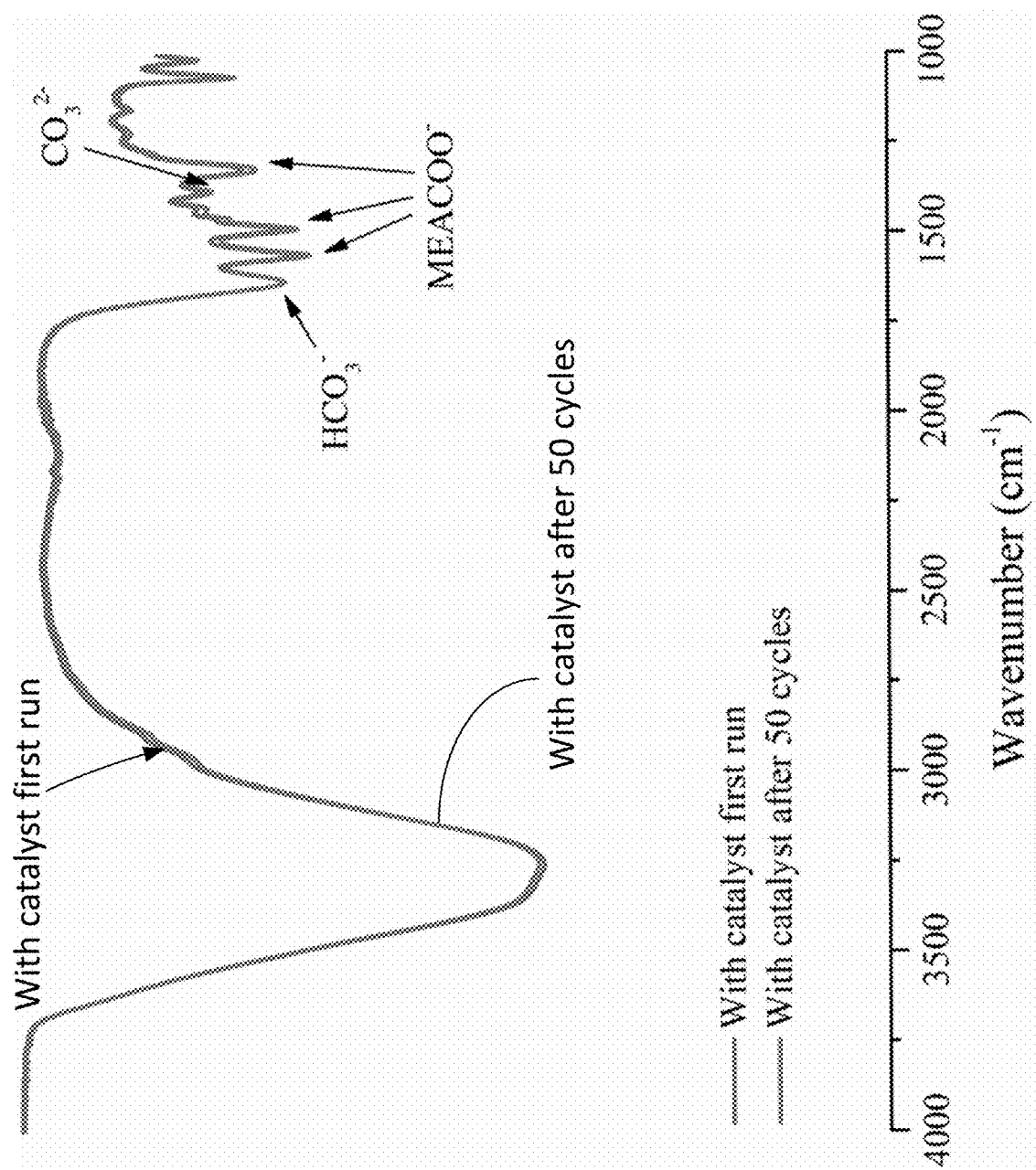
FIG. 31 is a plot illustrating a comparison of FT-IR spectra of 20 wt % MEA solution with [EMmim][$NTf_2$] catalyst after first run and 50 cyclic tests in accordance with an exemplary aspect of the present disclosure.

In another exemplary aspect of the present invention, stability characteristic of [EMmim][NTf$_2$] for $CO_2$ capture was studied with 50 cyclic tests, and the results are shown in FIGS. 2B, 17G and 17H. Where, specifically, in accordance with aspects of the present disclosure, FIG. 2B discloses the quantities of absorbed and desorbed $CO_2$ with the presence of [EMmim][NTf$_2$] catalyst during 50 cyclic tests. Where, specifically, in accordance with aspects of the present disclosure FIG. 17G discloses the $CO_2$ absorption profiles of 50 cyclic tests. And, where, specifically, in accordance with aspects of the present disclosure FIG. 17H discloses the $CO_2$ desorption profiles of 50 cyclic tests. There is no apparent change in both quantities of absorbed and desorbed $CO_2$. The average $CO_2$ capture working capacities within the 50 cyclic tests are 31.94 and 32.77 mmol for absorption and desorption amounts, respectively, as shown in FIG. 31. $HCO_3^-$, $CO_3^{2-}$ and $MEACOO^-$ are generated during $CO_2$ absorption process, which is the FT-IR spectra of the regenerated MEA solution confirming that no change in the structure of MEA molecules was observed after 50 cycles of the tests. Thus, both MEA and the [EMmim][NTf$_2$] are stable. Moreover, [EMmim][NTf$_2$] can thermally be stable at as high as 300° C. as shown in FIG. 19.

Figure 3A:
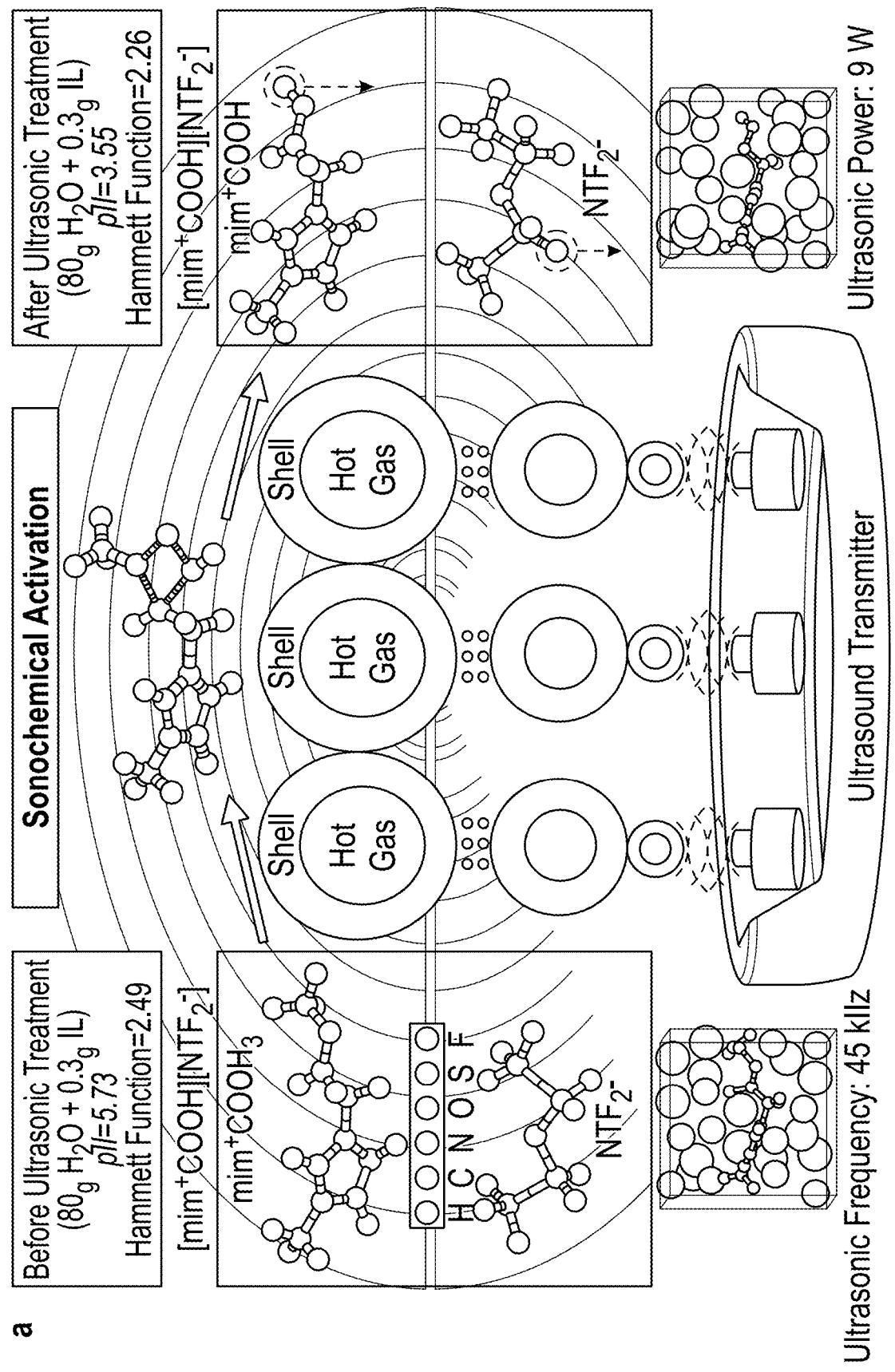
FIG. 3A is a schematic representation of the [EMmim+][NTF2−] catalyst ultrasound activation process for preparing US-[EMmim+][NTF$_2$-]+MEA solution $CO_2$ capture system.
Figure 3B:
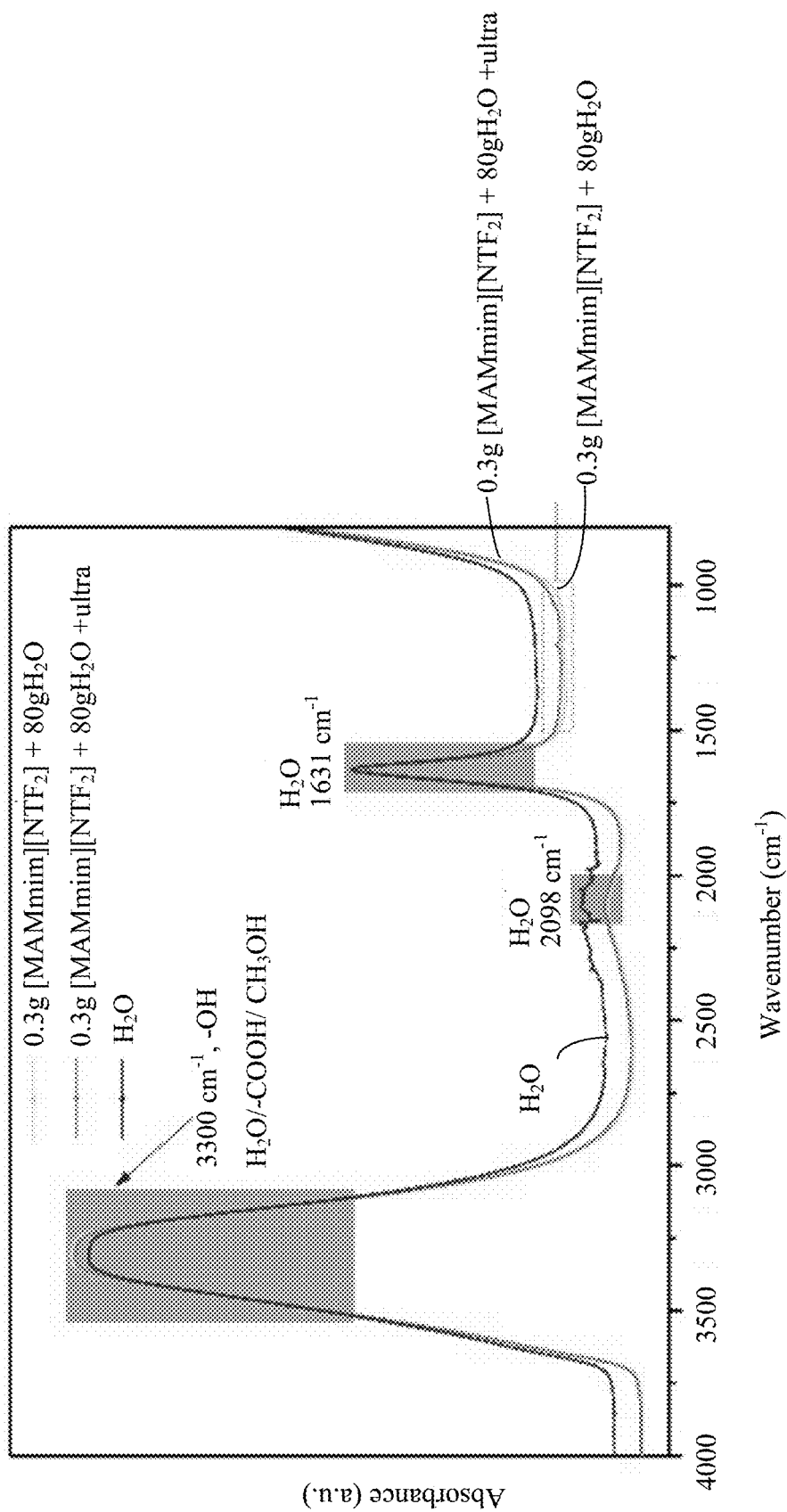
FIG. 3B is another schematic representation of the [EMmim+][NTF2−] catalyst ultrasound activation process for preparing US-[EMmim+][NTF$_2$-]+MEA solution $CO_2$ capture system.
Figure 3C:
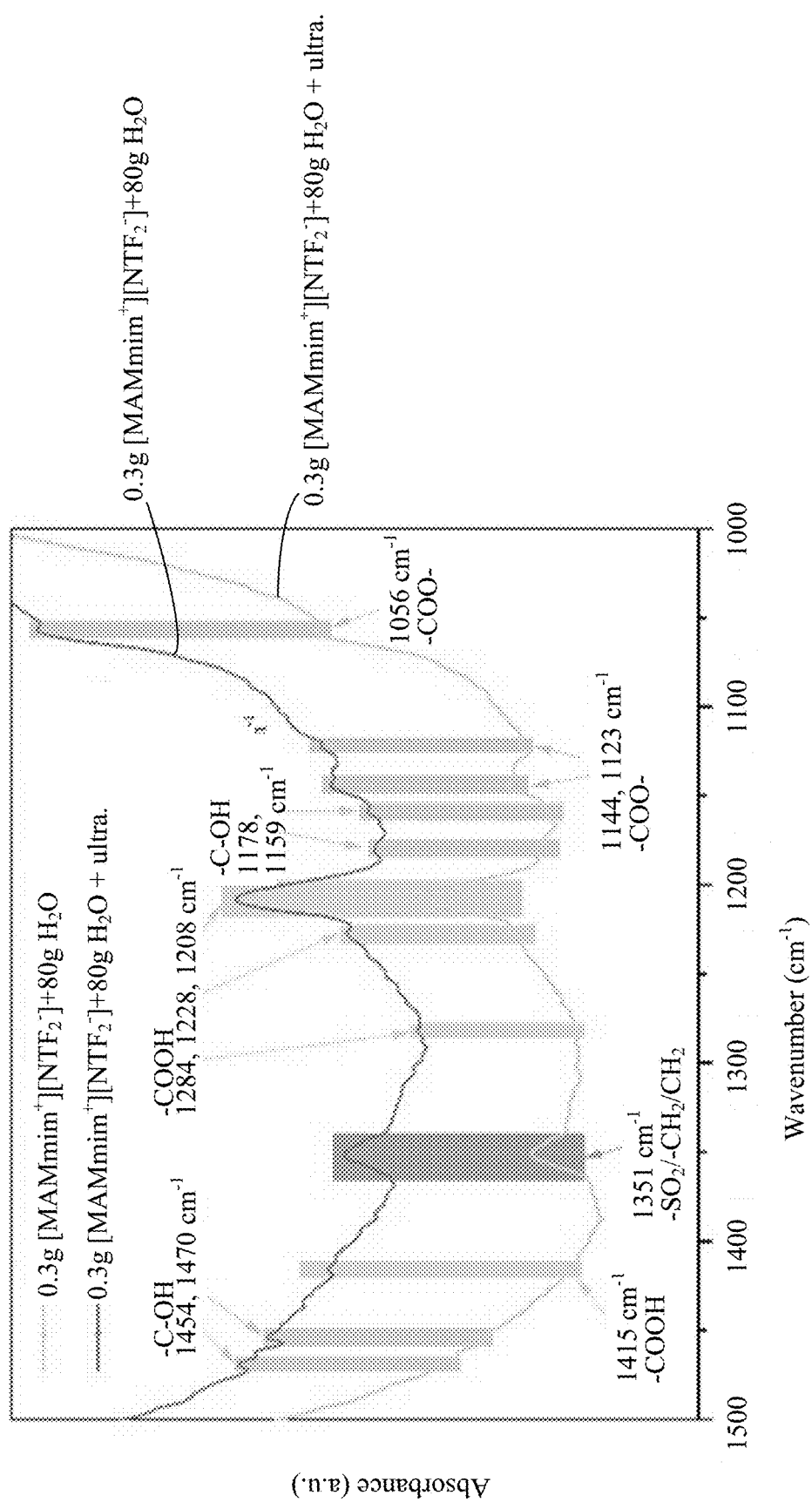
FIG. 3C is another schematic representation of the [EMmim+][NTF2−] catalyst ultrasound activation process for preparing US-[EMmim+][NTF$_2$-]+MEA solution $CO_2$ capture system.
Figure 22:
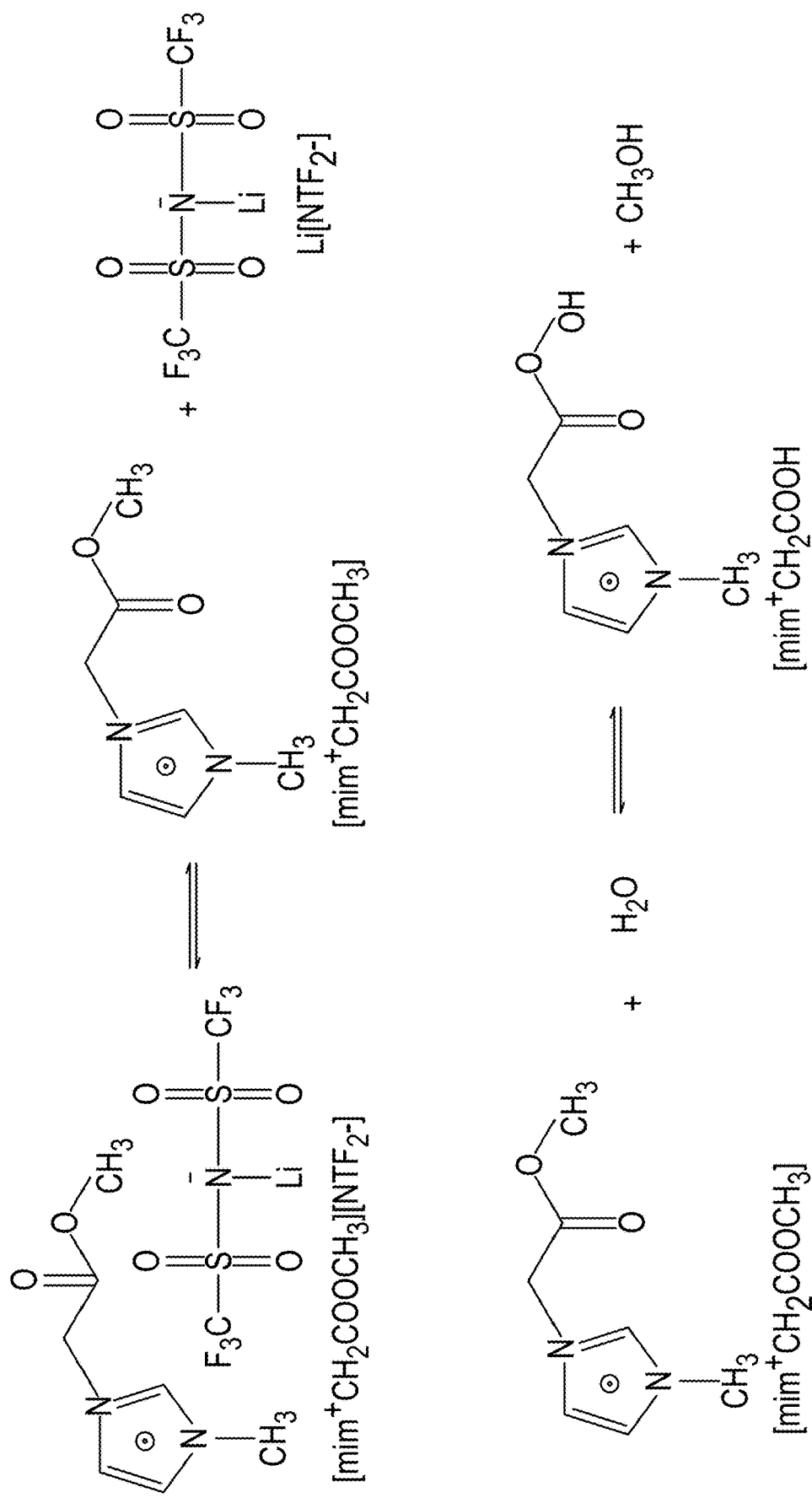
FIG. 22 illustrates the [EMmim$^+$][NTF$_2^-$] catalyst ultrasonic activation process in accordance with the present disclosure.

4. Exemplary Mechanism
4.1 Experimental
4.1.1 Activation of the IL Catalyst Via Ultrasound The proposed mechanism for activating-[EMmim$^+$][NTF$_2^-$] with ultrasound to obtain the US-[EMmim$^+$][NTF$_2^-$] has been shown in FIGS. 3A-3C, where, for example, as shown in FIG. 3A, the schematic representation of the [EMmim+][NTF2-] catalyst and the [EMmim+][NTF2-] catalyst ultrasound activation process. FIG. 3B shows the FT-IR spectra of [EMmim+][NTF2-] and US-[EMmim+][NTF$_2$-]. The conditions of ultrasonic activation: time: 20 min; ultrasonic power: 9 W; temperature: 30° C.; ultrasonic system: 80 g H$_2$O+0.3 g [EMmim+][NTF$_2$-] are shown in FIG. 3C. FIG. 22, shows for example, having the following ultrasonic conditions: time: 20 min, temperature: 30° C., ultrasonic power: 9 W; ultrasonic system: 80 g water 0.3 g IL catalyst. Note that after the ultrasonic activation, the part of ester group in the [EMmim$^+$][NTF$_2^-$] can be hydrolyzed into desired form of mim$^+$COOH. The molecular structure of the IL, [EMmim$^+$][NTF$_2^-$] has shown in FIG. 3A. [EMmim$^+$][NTF$_2^-$] possesses a degree of acidity, which can be verified via the measurement of the pH, 5.73, of the solution resulting from the addition of 0.3 g [EMmim$^+$][NTF$_2^-$] to 80 g H$_2$O (Table 1).

TABLE 1

| Sample | pH |
| --- | --- |
| 80 g H$_2$O | 6.48 |
| 80 g H$_2$O + 0.3 g [EMmim$^+$][NTF$_2^-$] | 5.73 |
| 80 g H$_2$O + 0.3 g [EMmim$^+$][NTF$_2^-$] + ultrasonic | 3.55 |
| 20 g MEA + (80 g H$_2$O + 0.3 g [EMmim$^+$][NTF$_2^-$] + ultrasonic) | 12.35 |
| 20 g MEA + 80 g H$_2$O | 12.36 |
| MEA without catalyst after abs.-des. process - first run | 9.65 |
| MEA with [EMmim$^+$][NTF$_2^-$] catalyst after abs.-des. process - first run | 9.75 |
| MEA with [EMmim$^+$][NTF$_2^-$] catalyst after abs.-des. process- 100 cycles | 9.44 |

Also, the acidity of the [EMmim$^+$][NTF$_2^-$] can be observed with its FT-IR spectrum presented in FIG. 3C, which mainly attributes to the slight hydrolysis of the ester group (—COOR) in IL to form the terminal carboxylic acid groups (—COOH). The acidity of US-[EMmim$^+$][NTF$_2^-$] can be considerably enhanced due to the generation of more —COOH moiety via ultrasound-activated hydrolysis of the —COOR in the [EMmim$^+$][NTF$_2^-$], as given in FIGS. 3A-3C. The activation of [EMmim$^+$][NTF$_2^-$] can be attributed to a controlled degree of hydrolysis from ester group (—COOR) to form corresponding carboxylic acid groups (—COOH), which can be based on the formation, growth, and implosive collapse of cavitation microbubbles occurring during the traveling of a high power ultrasound wave via aqueous [EMmim$^+$][NTF$_2^-$].

The FT-IR spectra of [EMmim$^+$][NTF$_2^-$] and US-[EMmim$^+$][NTF$_2^-$] are shown in FIGS. 3B and 3C. The bands around 1056, 1144 and 1123 cm$^{-1}$ are assigned to the signature of —COOR groups. Compared to the spectrum of [EMmim$^+$][NTF$_2^-$], the spectrum of US-[EMmim$^+$][NTF$_2^-$] presents several additional and intensive peaks at 1208, 1128, 1284 and 1415 cm$^{-1}$, which are attributed to the stretching vibration of —COOH. Also, the spectrum of US-[EMmim$^+$][NTF$_2^-$] shows the enhanced peak intensities for stretching vibration of the hydroxyl group (—OH) at 1159, 1178, 1454 and 1470 cm$^{-1}$. The pH of the US-[EMmim$^+$][NTF$_2^-$] can be decreased to 3.55 (Table 1), equivalent to an increase in concentration of H$^+$ by ~151 times, a large jump via a green activation process as proven with the obvious enhancement in the peak intensity of COOH in FIG. 3C.

TABLE 1

| Sample | pH |
| --- | --- |
| 80 g H$_2$O | 6.48 |
| 80 g H$_2$O + 0.3 g [EMmim$^+$][NTF$_2^-$] | 5.73 |
| 80 g H$_2$O + 0.3 g [EMmim$^+$][NTF$_2^-$] + ultrasonic | 3.55 |
| 20 g MEA + (80 g H$_2$O + 0.3 g [EMmim$^+$][NTF$_2^-$] + ultrasonic) | 12.35 |

TABLE 1-continued

| Sample | pH |
|---|---|
| 20 g MEA + 80 g H$_2$O | 12.36 |
| MEA without catalyst after abs.-des. process - first run | 9.65 |
| MEA with [EMmim$^+$][NTF$_2^-$] catalyst after abs.-des. process - first run | 9.75 |
| MEA with [EMmim$^+$][NTF$_2^-$] catalyst after abs.-des. process- 100 cycles | 9.44 |

Figure 23:
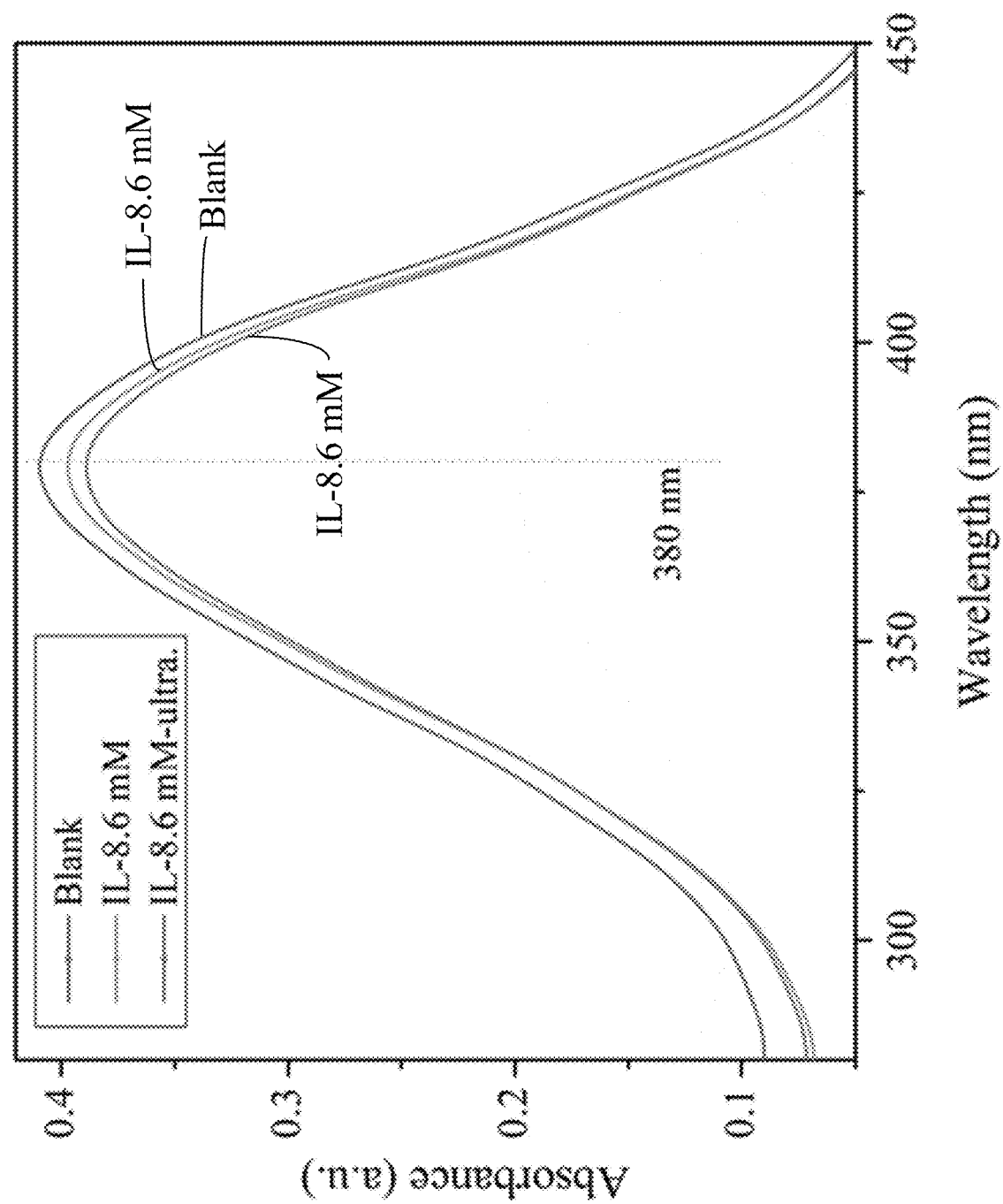
FIG. 23 illustrates the UV-Vis Absorption spectra of 4-nitroaniline for [EMmim$^+$][NTF$_2^-$] IL in water with different concentrations and pretreated conditions.

Also, as shown in FIG. 3C, the peak intensity of —COOR can be evidently decreased for the US-[EMmim$^+$][NTF$_2^-$]. The Brønsted acid sites of IL catalysts were further confirmed with the characteristic parameter of the Hammett functions, H$_0$, obtained by the UV-Vis spectroscopy. The H$_0$ values of the 8.6 mM [EMmim$^+$][NTF$_2^-$] and US-[EMmim$^+$][NTF$_2^-$] solutions are 2.49 and 2.26, respectively (FIG. 23, where, for example, the H$_0$ values of the 8.6 mM [EMmim$^+$][NTF$_2^-$] and US-[EMmim$^+$][NTF$_2^-$] solutions are 2.49 and 2.26, respectively, another indication of significant effect of ultrasound on the degree of the hydrolysis of ester group into desired mim$^+$COOH, and Table 2), another indication of the significant effect of ultrasound on the degree of hydrolysis of the —COOR group into desired mim$^+$COOH.

TABLE 2

| Samples | A$_{max}$ | [I] (%) | [IH$^+$](%) | H$_0$ |
|---|---|---|---|---|
| Blank | 0.411 | 100 | 0 | — |
| IL-8.6 mM | 0.398 | 96.91 | 3.09 | 2.49 |
| IL-8.6 mM-ultra. | 0.390 | 94.89 | 5.11 | 2.26 |

$^a$Indicator: 4-nitroaniline (Pka = 0.99), the concentration of 4-nitroaniline solution is 25 μm; H$_0$ = pKa + log([I]/[IH$^+$]).

4.1.2. Mechanistic Studies

Figure 4A:
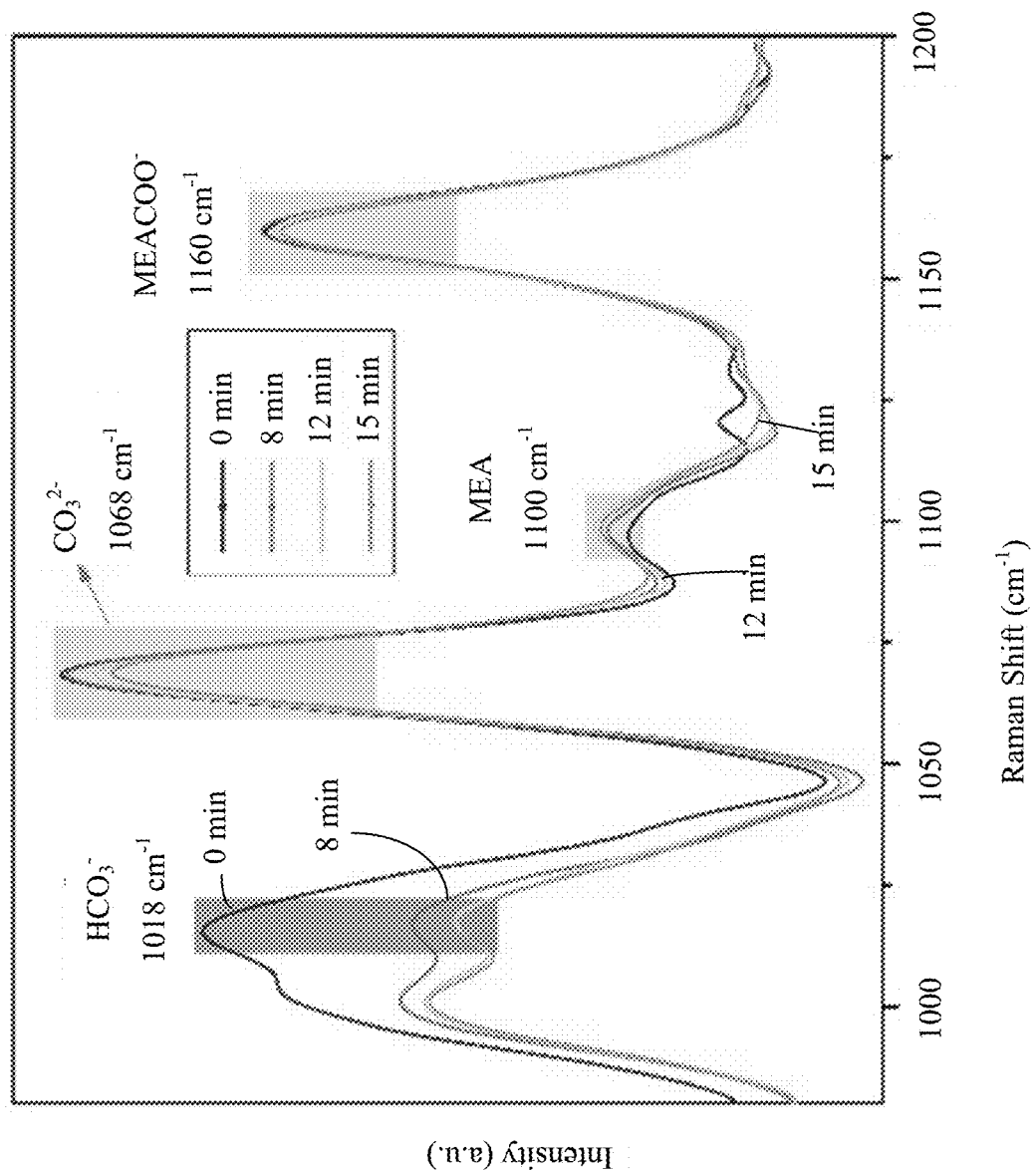
FIG. 4A illustrates an exemplary plot of the intensity-time profiles of Raman spectra of spent MEA solutions collected during $CO_2$ desorption without and with catalyst at different regeneration time in accordance with one exemplary test.
Figure 4B:
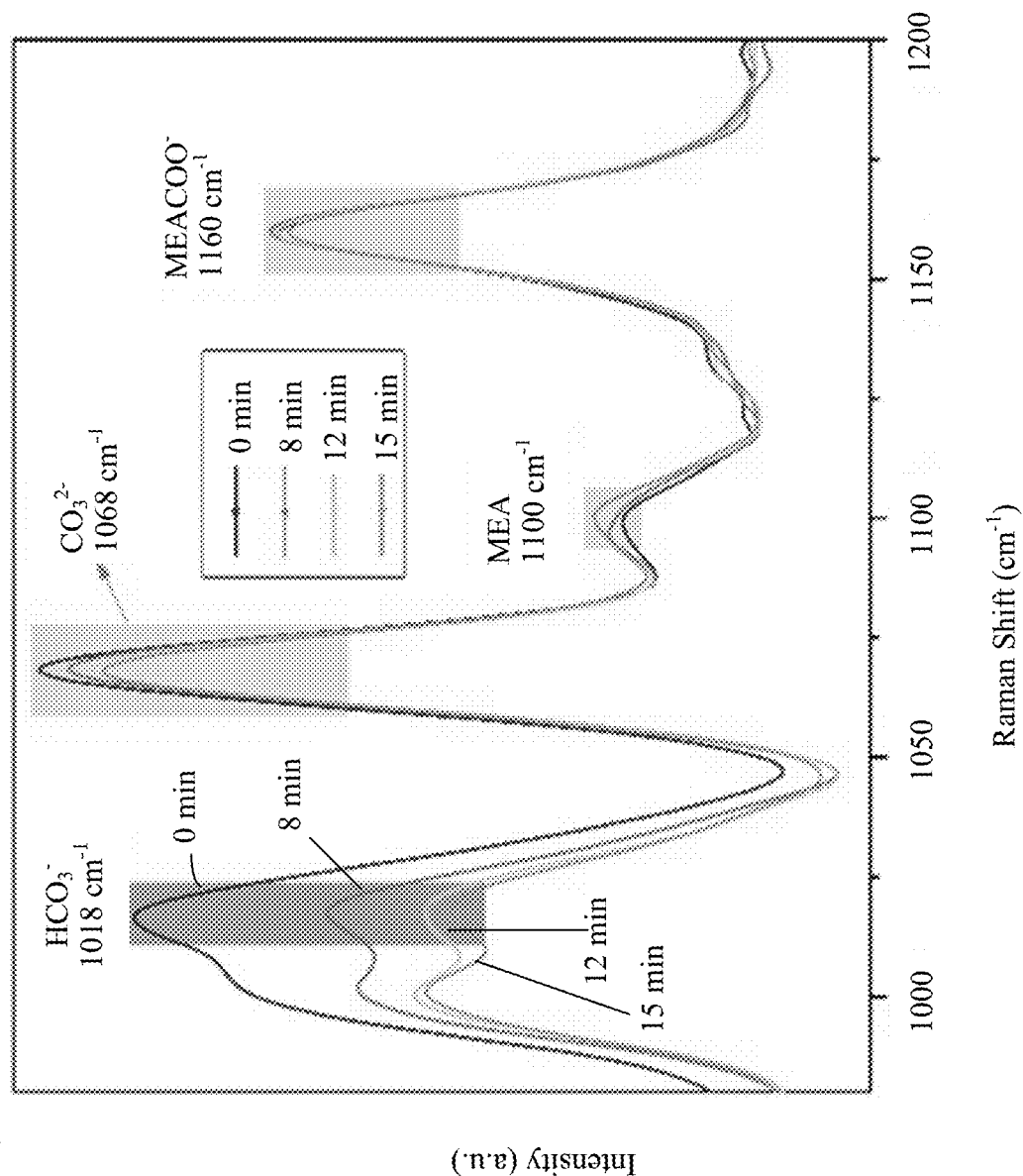
FIG. 4B illustrates another exemplary plot of the intensity-time profiles of Raman spectra of spent MEA solutions collected during $CO_2$ desorption without and with catalyst at different regeneration time in accordance with one exemplary test.
Figure 4C:
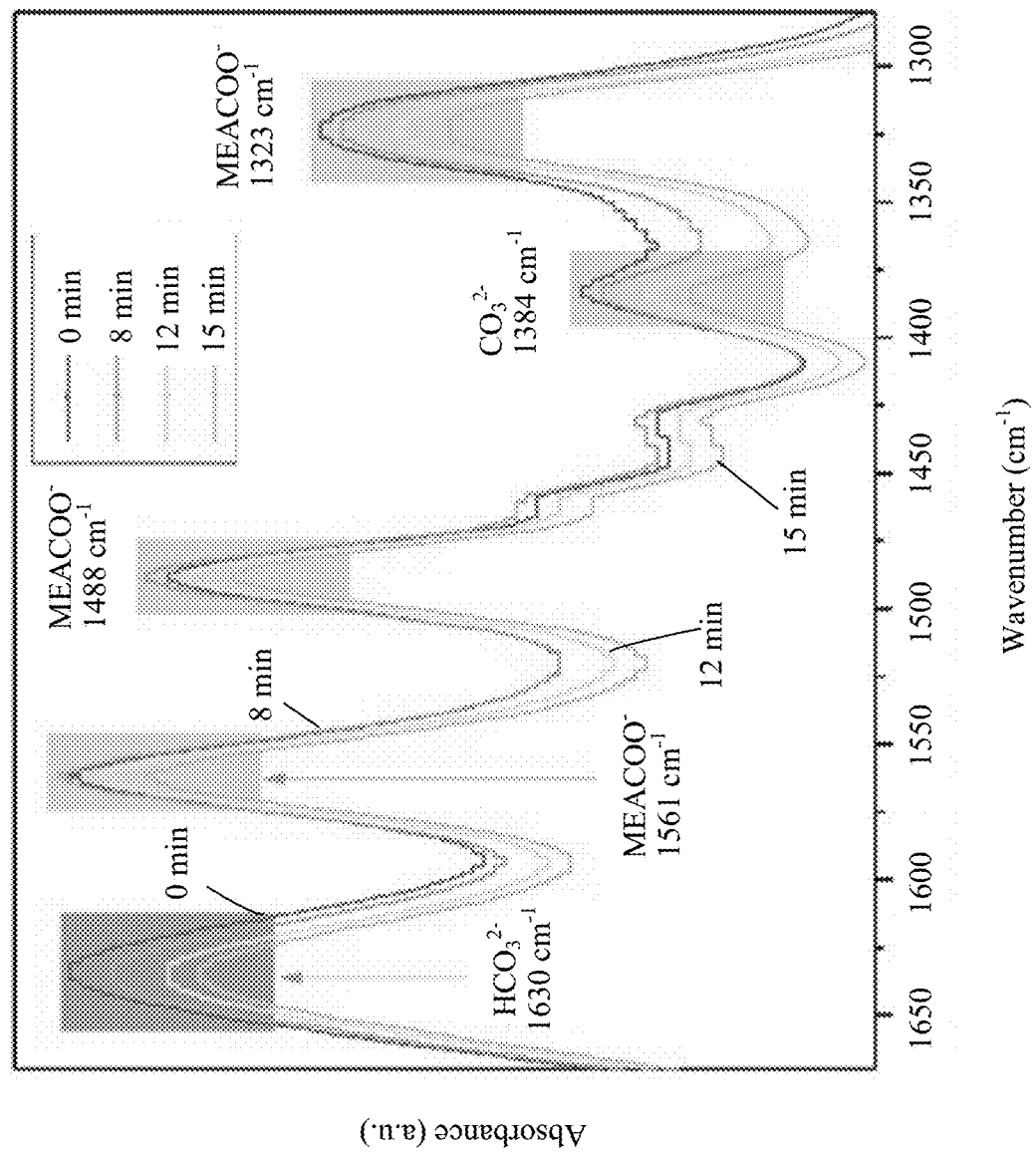
FIG. 4C illustrates an exemplary plot of the intensity-time profiles of FT-IR spectra of spent MEA solutions collected during $CO_2$ desorption without and with catalyst at different regeneration time in accordance with one exemplary test.
Figure 4D:
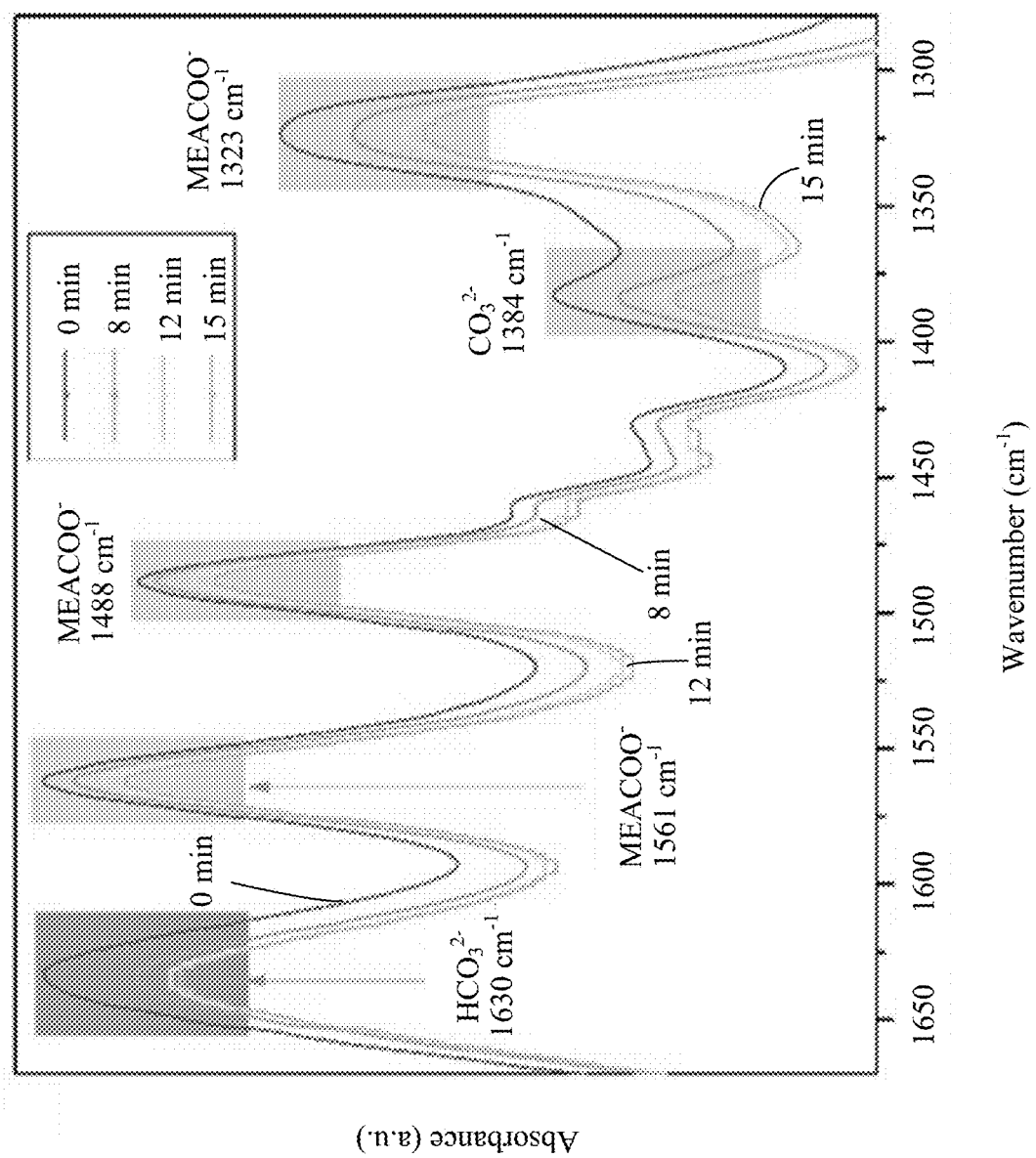
FIG. 4D illustrates another exemplary plot of the intensity-time profiles of FT-IR spectra of spent MEA solutions collected during $CO_2$ desorption without and with catalyst at different regeneration time in accordance with one exemplary test.
Figure 4E:
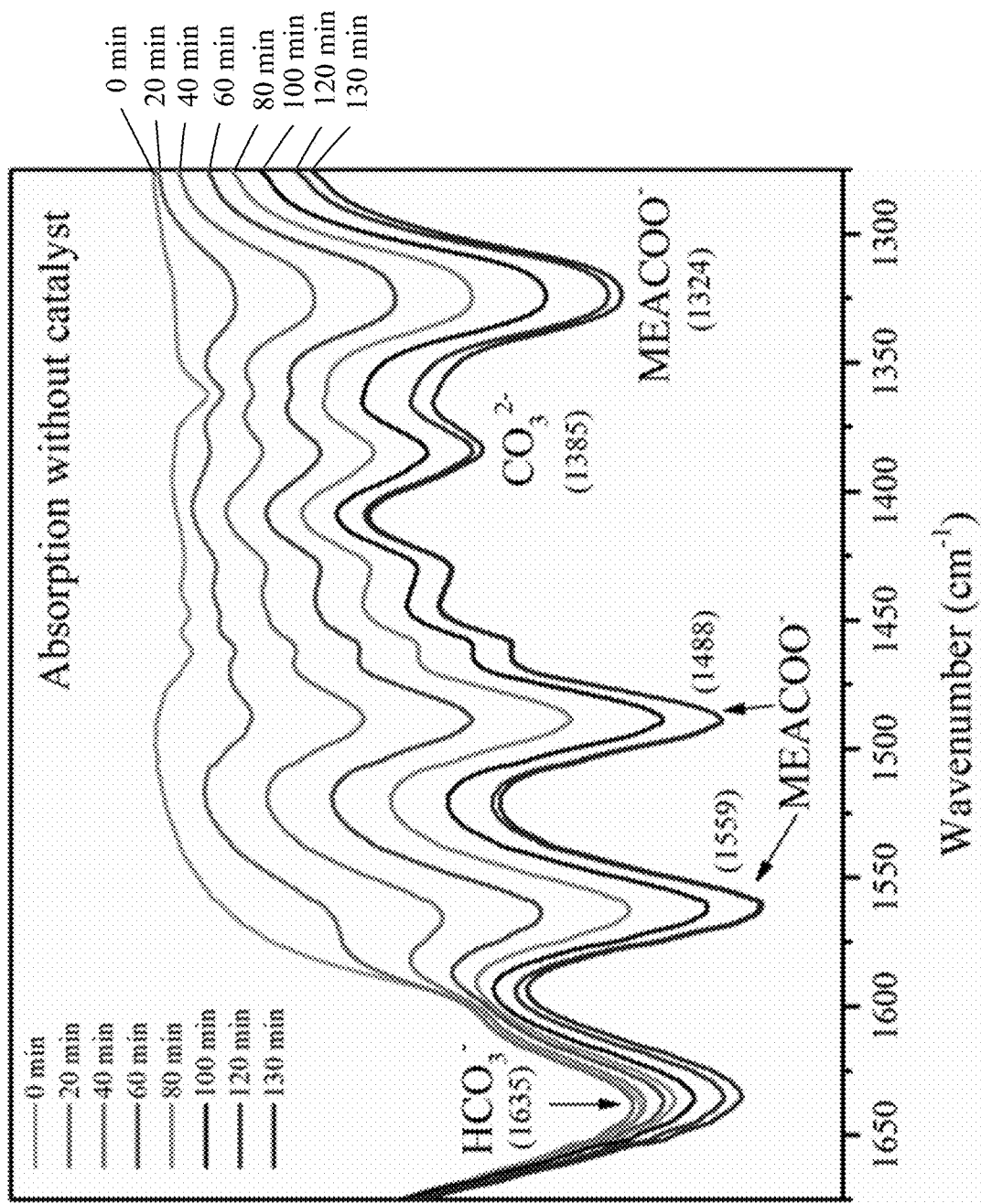
FIG. 4E illustrates another exemplary plot of FT-IR spectra of the catalytic and uncatalytic solutions during uncatalyzed $CO_2$ absorption and desorption at different times. Catalyzed $CO_2$ desorption in accordance with an exemplary aspect of the present disclosure.
Figure 4F:
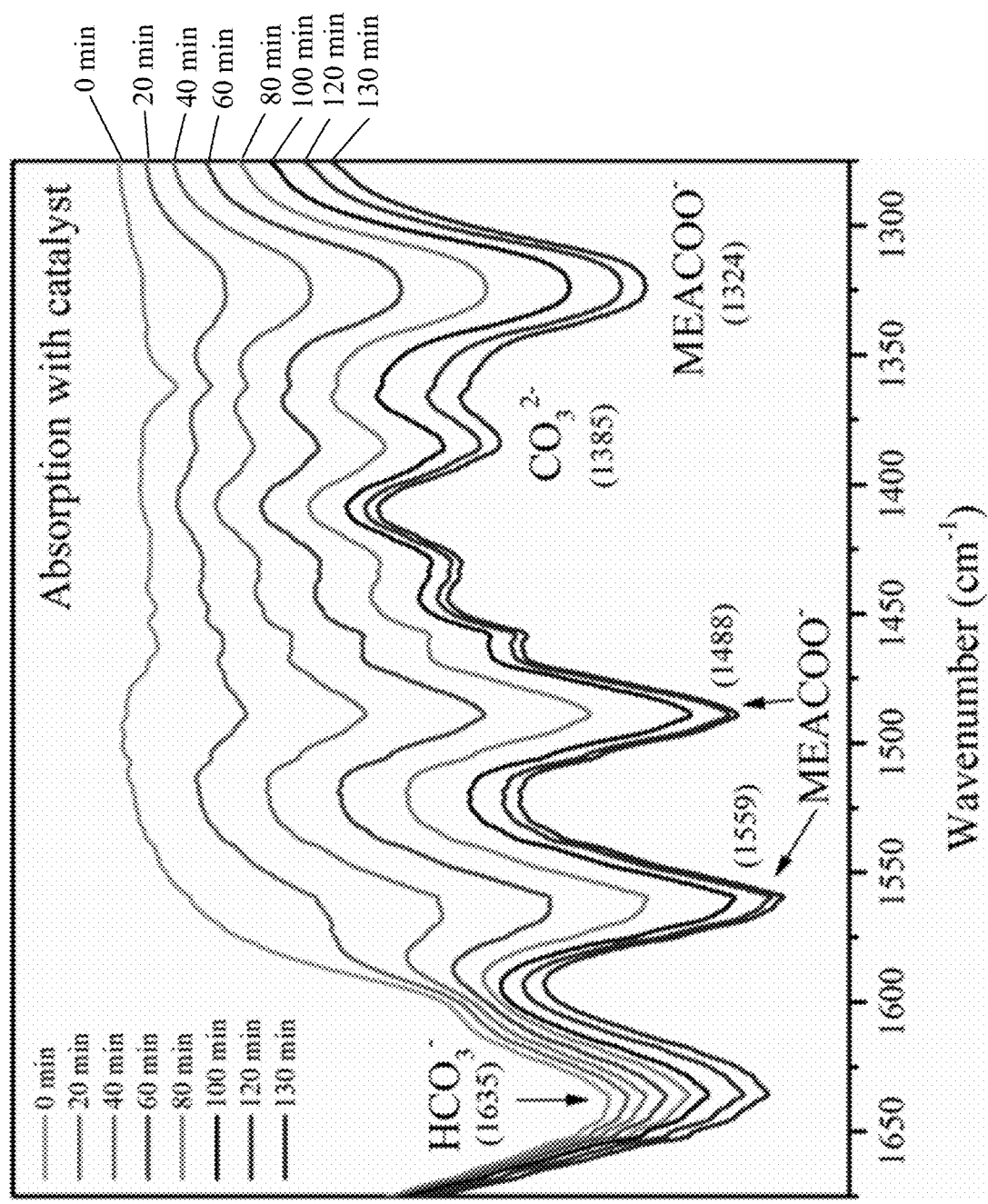
FIG. 4F illustrates another exemplary plot of FT-IR spectra of the catalytic and uncatalytic solutions during catalyzed $CO_2$ absorption and desorption at different times.

Although the catalytic effect of the 3,000 ppm US-[EMmim$^+$][NTF$_2^-$] can be clearly observed with the significant enhancement of CO$_2$ desorption rate at 85° C., the associated essential mechanism needs to be investigated for further development of next generation CO$_2$ capture catalysts. As a result, Raman and FT-IR spectroscopies were utilized for analyzing the solutions collected during CO$_2$ desorption with and without uses of US-[EMmim$^+$][NTF$_2^-$] at different desorption times. FIGS. 4A and 4B show the Raman spectra, while FIGS. 4C and 4D exhibit the FT-IR results. In the Raman spectrum of spent MEA solution, the peaks at 1018 (C—OH stretching), 1068 (C—O stretching) and 1160 cm$^{-1}$ (C—N stretching) are attributed to the bicarbonate (HCO$_3^-$), carbonate (CO$_3^{2-}$) and carbamate (MEACOO$^-$) ions, respectively. With the use of the catalyst, the MEA-H$_2$O—CO$_2$ system contains higher amounts of HCO$_3^-$ groups. The peak intensities of HCO$_3^-$, and CO$_3^{2-}$ in the spent MEA solution with the use of the US-[EMmim$^+$][NTF$_2^-$], especially the HCO$_3^-$ highlighted in FIGS. 4A and 4B, decrease more quickly than the catalyst-free spent MEA solution does. Also, similar observations on the catalytic effects were obtained with FT-IR spectra for the spent MEA solutions at different desorption times. In FIGS. 4C and 4D, the bands at 1323 (stretching of N—COO$^-$), 1488 (symmetric stretching of COO$^-$) and 1561 cm$^{-1}$ (asymmetric stretching of COO$^-$) are ascribed to the MEACOO$^-$, while the peaks at 1384 and 1630 cm$^{-1}$ are assigned to CO$_3^{2-}$ and HCO$_3^-$, respectively. The peak intensity of HCO$_3^-$ in the spent MEA solution without use of US-[EMmim$^+$][NTF$_2^-$] decreases slowly with the continuous CO$_2$ desorption, and the intensities of CO$_3^{2-}$ and MEACOO$^-$ peaks and thus the concentrations of CO$_3^{2-}$ and MEACOO$^-$ barely change during the first 8 min, in spite of the subsequent slightly noticeable variations. However, the changes in the peak intensities of HCO$_3^-$, CO$_3^{2-}$, and MEACOO$^-$, especially HCO$_3^-$ shown in FIG. 4D during the initial 8 min of the catalytic spent MEA solutions decrease considerably fast. Obviously, the observations of the changes of the concentrations of intermediates, with both Raman and FT-IR spectra confirm the significant catalytic effect of the US-[EMmim$^+$][NTF$_2^-$], where, for example, as shown in FIGS. 4A and C, CO$_2$ desorption without catalyst, for example as shown in FIGS. 4B and 4D, CO$_2$ desorption with 3,000 ppm US-[EMmim$^+$][NTF$_2^-$] equivalently containing 10.1 ppm of —COOH.

4.1.3 Experimental Study of the Reaction Mechanisms

Figure 6:
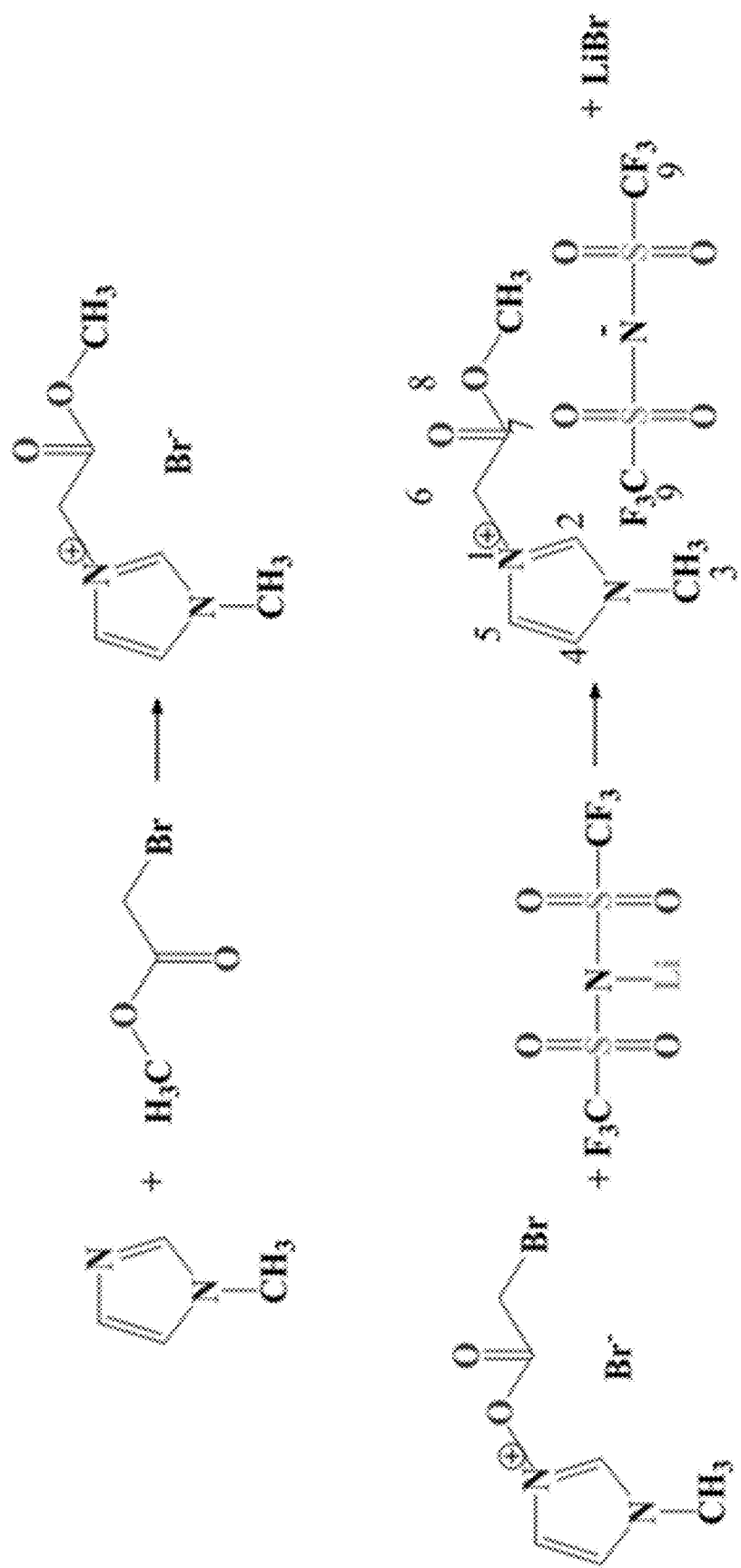
FIG. 6 provides a schematic diagram of the synthetic route of IL [EMmim$^+$][NTF$_2^-$]
Figure 7:
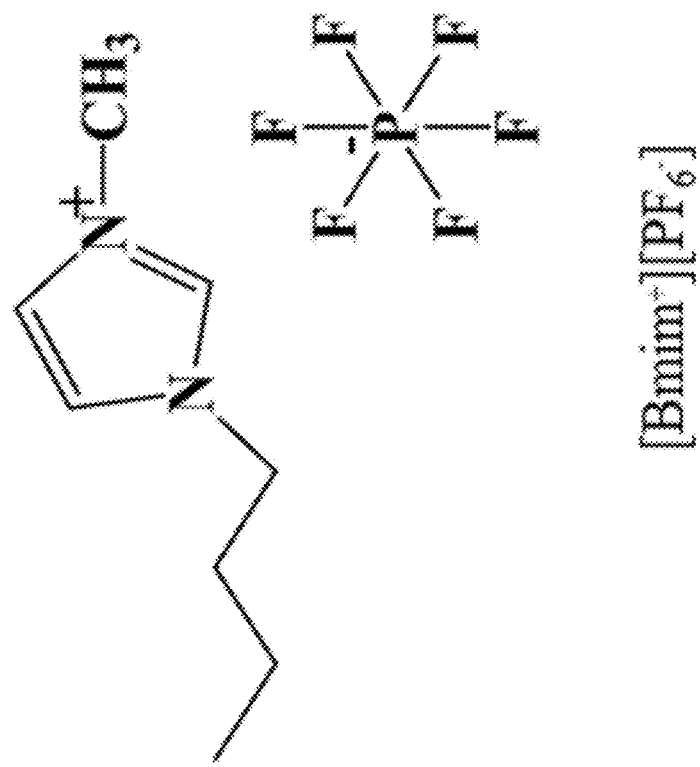
FIG. 7 illustrates a molecular structure of commercially available IL catalysts [Emim$^+$][HSO$_4^-$] and [Bmim$^+$][PF$_6^-$]
Figure 7:
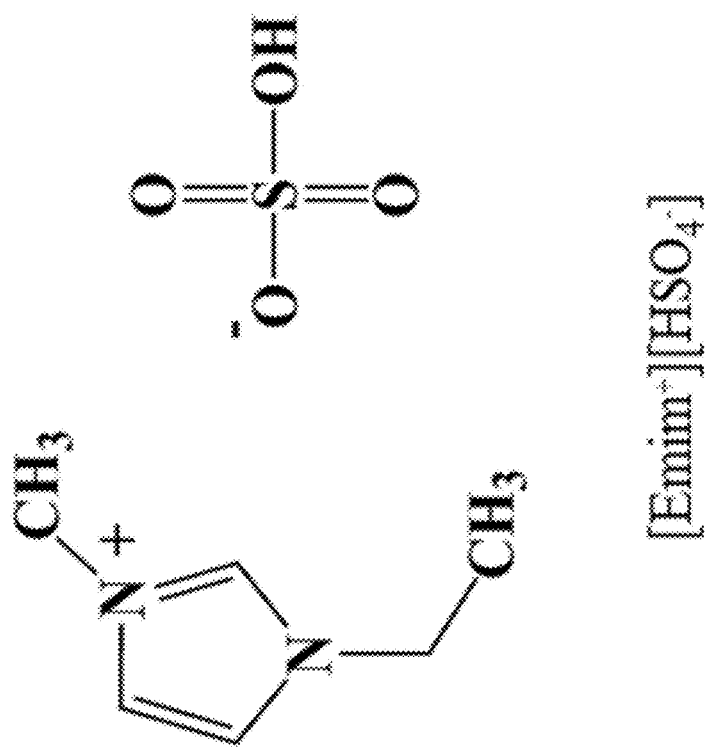
Figure 32A:
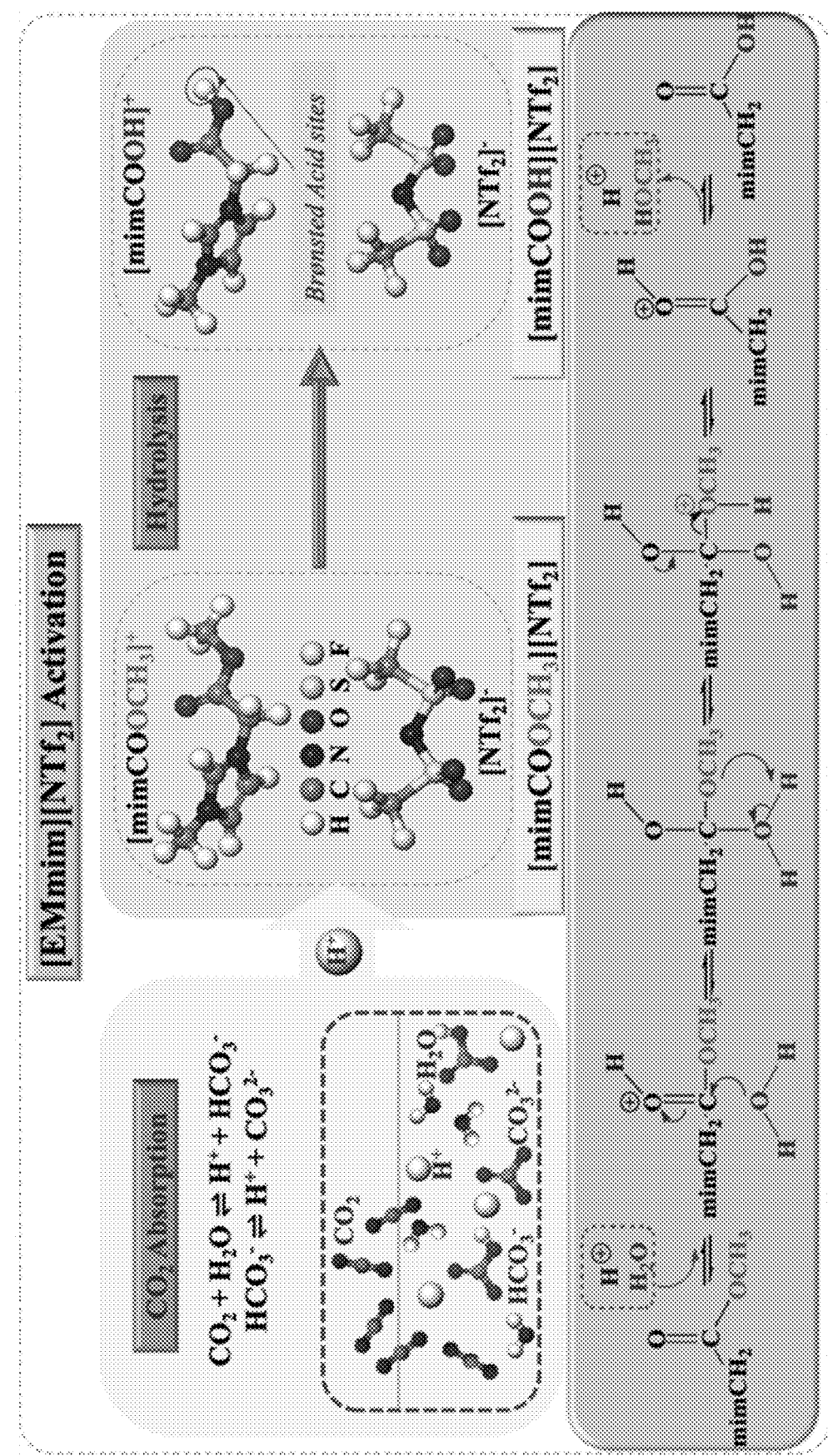
FIG. 32A is a pictorial and plot illustrations of the [EMmim][$NTf_2$] catalyst activation process via hydrolysis in $CO_2$ absorbing system.
Figure 33A:
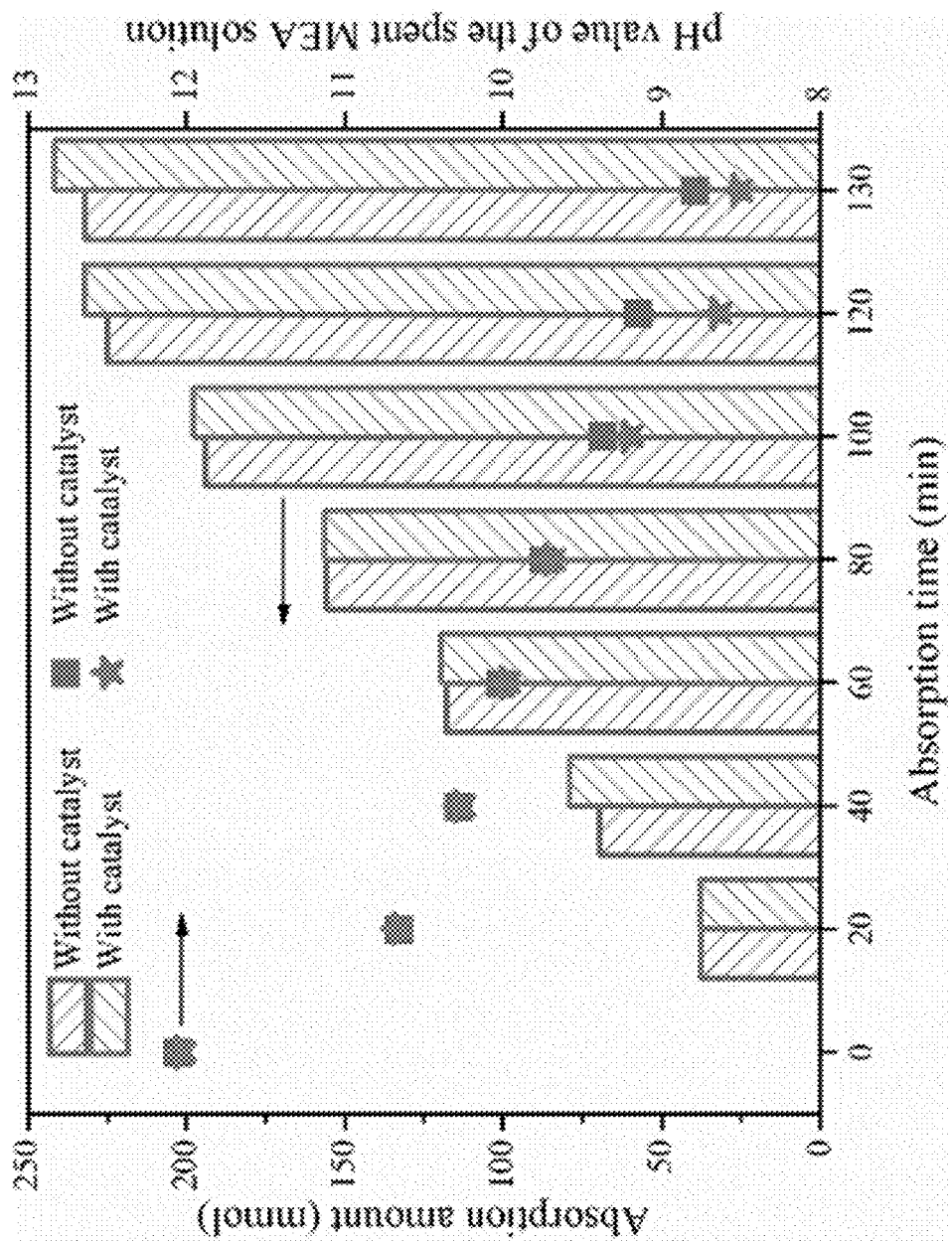
FIG. 33A is a plot illustrating changes of the quantities of $CO_2$ absorbed and desorbed, and pH values of the uncatalytic and catalytic solutions with absorption times in accordance with an exemplary aspect of the present disclosure.
Figure 33B:
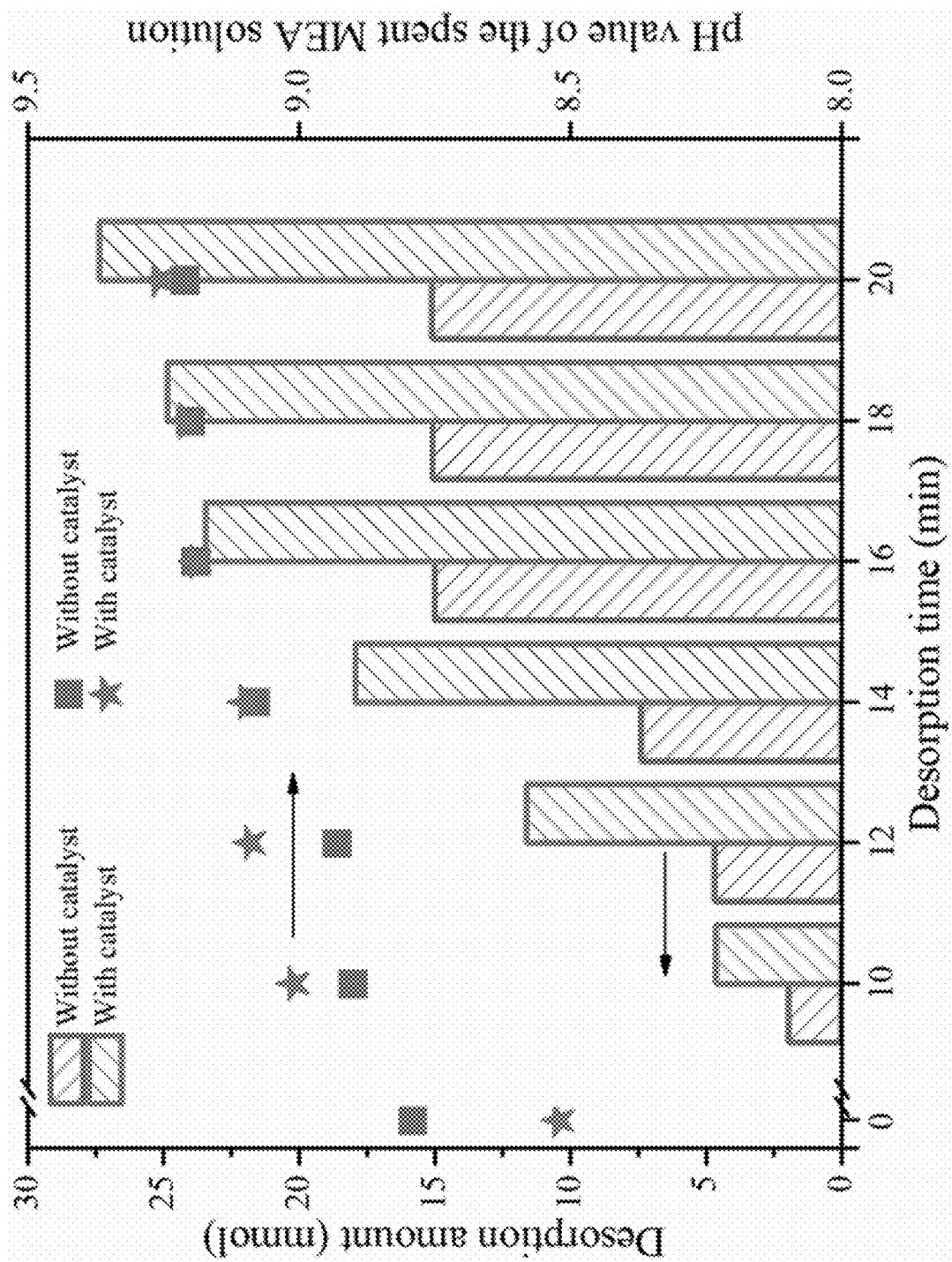
FIG. 33B is a plot illustrating changes of the quantities of $CO_2$ absorbed and desorbed, and pH values of the uncatalytic and catalytic solutions with desorption times in accordance with an exemplary aspect of the present disclosure.

The molecular structure of the IL, [EMmim][NTf$_2$] is shown in FIG. 6. After CO$_2$ absorption, the pH of the capture system decreased from 12.01 to 8.52, indicating the increase of H$^+$ concentration and promotion of the hydrolysis of the —COOCH$_3$ in [EMmim][NTf$_2$] into COOH, which is need for catalyzing CO$_2$ desorption. Thus, the activation of [EMmim][NTf$_2$] is accompanied with the enhancement of the acidity of [EMmim][NTf$_2$] after CO$_2$ absorption, as illustrated in FIG. 32A, which provides a schematic representation of the [EMmim][NTf$_2$] catalyst and the hydrolysis activation process. The FT-IR spectra of water, and the 2,000 ppm [EMmim][NTf$_2$] aqueous solution with or without CO$_2$ as shown in FIG. 32B(1)-(4) further confirms this mechanism. Anhydrous CH$_3$OH and CH$_3$COOCH$_3$ as well as CH$_3$COOH and 50% CH$_3$COOH solutions were used to identify the functional groups in the catalytic solutions with or without additions of CO$_2$. The bands around 1381-1339 cm$^{-1}$ in the catalytic solutions [as shown in FIG. 32B(1)] are assigned to the —CH$_3$ group in the IL catalyst (—COOCH$_3$), observed in anhydrous CH$_3$OH, CH$_3$COOCH$_3$ and CH$_3$COOH and 50% CH$_3$COOH solutions. With the increase in the introduced CO$_2$ in the solution, hydrolysis of —COOCH$_3$ is enhanced, leading to the increase the concentration of —CH$_3$ or CH$_3$OH in the catalytic solution as illustrated in FIG. 32A. Bands with wavenumbers between 1221-1190 cm$^{-1}$ [as shown in FIG. 32B(2)], detected in anhydrous CH$_3$OH as well, confirm the formation of CH$_3$OH with an enhanced hydrolysis process with CO$_2$. As concentration of —COOCH$_3$ decreases, the —C—O—C peak [1160-1128 cm$^{-1}$, shown in FIG. 32B(3)] in the catalytic solution with the addition of CO$_2$ was weaker than that of the solution without addition of CO$_2$ according to the reference peaks of anhydrous CH$_3$COOCH$_3$. Consequently, more —COO— or COOH formation or more —COOCH$_3$ hydrolysis, was detected within 1079-1050 cm$^{-1}$ [shown in FIG. 13B(4)], which are concluded from the observations of peaks of anhydrous CH$_3$COOCH$_3$ and CH$_3$COOH, and 50% CH$_3$COOH solution. Also, the acidity of the [EMmim][NTf$_2$] was verified via the measurement of the pH (6.19) of the solution resulting from the addition of 0.2 g [EMmim][NTf$_2$] to 80 g H$_2$O (Table 3). The FT-IR spectra of fresh catalytic solution, catalytic solutions after the 1$^{st}$ absorption and the 1$^{st}$ cyclic absorption-desorption runs are displayed in FIGS. 21A-21C. According to FIG. 21C, peak at 1023-1017 cm$^{-1}$ is assigned to —C—OH, belonging to MEA (—CH$_2$—OH) and HCO$_3^-$ (—COOH) after absorption. Peak at 1075-1066 cm$^{-1}$ is assigned to —COO—/C—C, belonging to MEA (—CH$_2$—CH$_2$—), and HCO$_3^-$(—COO—) resulting from absorption. Peaks at 1171-1157 cm$^{-1}$ and 1385 cm$^{-1}$ are assigned to CO$_3^{2-}$ resulting from absorption. Peaks at 1240-1185 cm$^{-1}$ and 1468-1406 cm$^{-1}$ are assigned to —C—OH, belonging to $HCO_3^-$ (—C—OH) resulting from absorption. Peaks at 1559, 1488, 1324 $cm^{-1}$ are assigned to —COO— in MEA-COO-resulting from absorption. Peak at 1635 $cm^{-1}$ is assigned to $HCO_3^-$ or —OH, which is also a signature peak of water. The differences in the changes of the quantities of $CO_2$ absorbed and desorbed, and pH values of the uncatalytic and catalytic solutions with absorption and desorption times as shown in FIG. 33A-33B result from the use of the catalyst. For example, the pH value (8.65) of the catalytic solution at 120 min is lower than that (8.79) of the uncatalytic solution at 130 min, when both solutions absorb the same amount of $CO_2$, another direct evidence of hydrolysis of —$COOCH_3$ in the IL into —COOH, a key function group in catalyzing the subsequent $CO_2$ desorption.

TABLE 3

| Sample | pH |
| --- | --- |
| 80 g $H_2O$ | 6.37 |
| 80 g $H_2O$ + 0.2 g [EMmim][$NTf_2$] | 6.19 |
| 20 g MEA + (80 g $H_2O$ + 0.2 g [EMmim][$NTf_2$]) | 12.01 |
| 20 g MEA + 80 g $H_2O$ | 12.04 |
| MEA without catalyst after the $1^{st}$ abs. | 8.79 |
| MEA with [EMmim][$NTf_2$] catalyst after the $1^{st}$ abs. | 8.52 |
| MEA without catalyst after the $1^{st}$ cyclic abs.-des. | 9.47 |
| MEA with [EMmim][$NTf_2$] catalyst after the $1^{st}$ cyclic abs.-des. | 9.46 |
| MEA with [EMmim][$NTf_2$] catalyst after 50 cycles of abs.-des. | 9.34 |

Figure 4G:
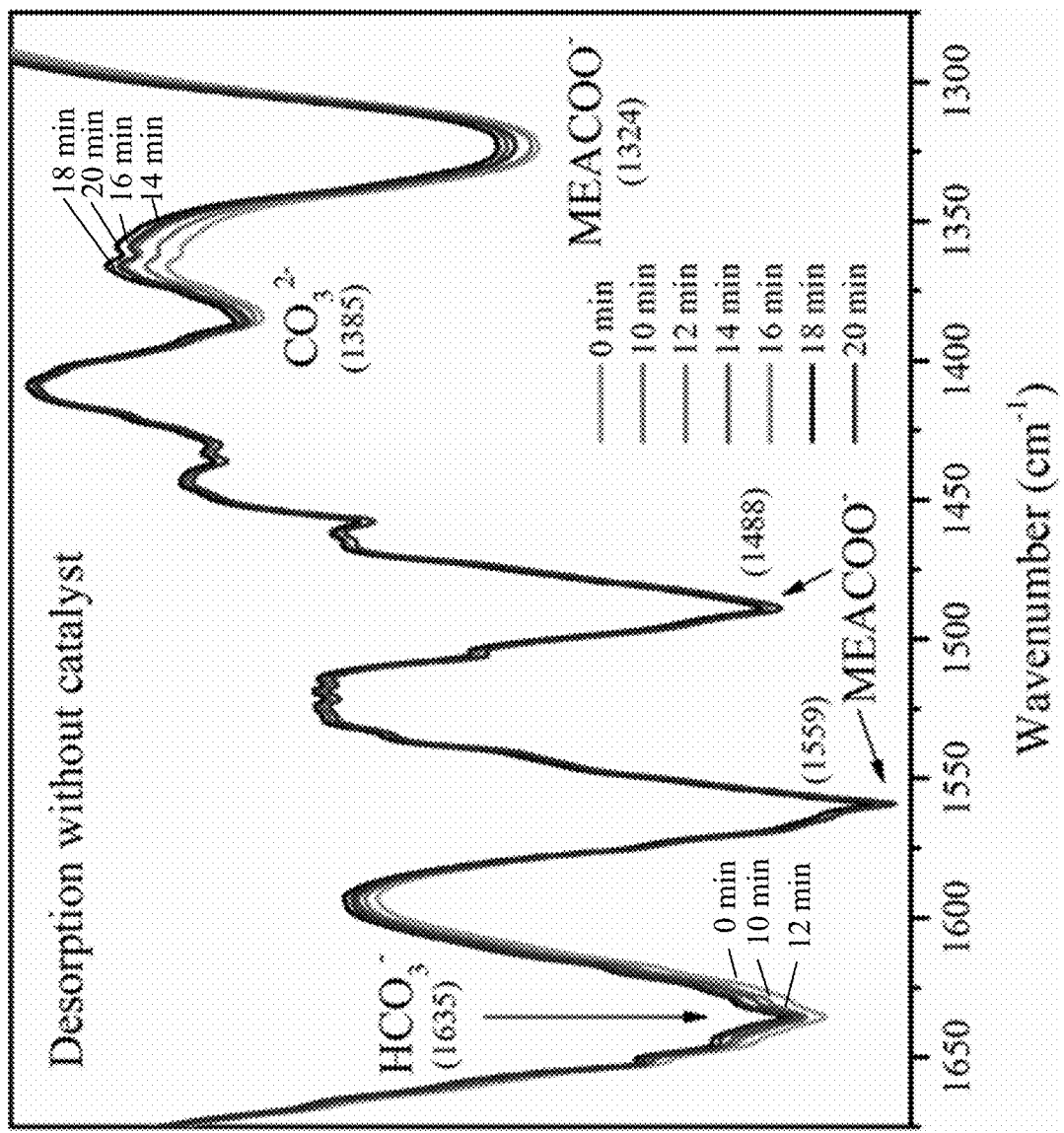
FIG. 4G illustrates another exemplary plot of FT-IR spectra of the catalytic and uncatalytic solutions during uncatalyzed $CO_2$ desorption and desorption at different times.
Figure 4H:
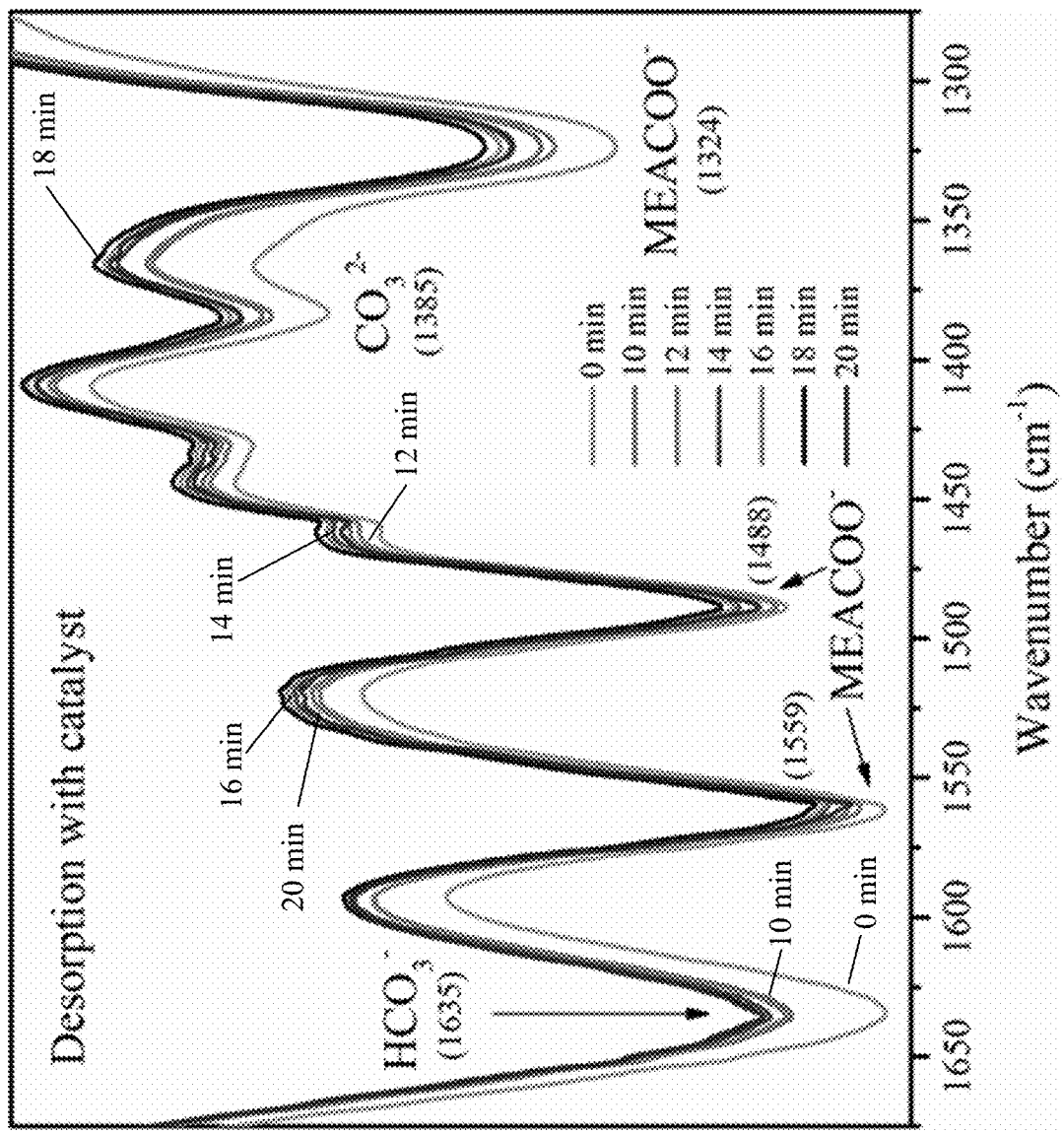
FIG. 4H illustrates another exemplary plot of FT-IR spectra of the catalytic and uncatalytic solutions during catalyzed $CO_2$ desorption and desorption at different times.

The catalytic effect of [EMmim][$NTf_2$] at different absorption and desorption times is observed through FT-IR spectra, as shown in FIGS. 4E-4H. The bands at 1324 $cm^{-1}$ (stretching of N—$COO^-$), 1488 $cm^{-1}$ (symmetric stretching of $COO^-$) and 1559 $cm^{-1}$ (asymmetric stretching of $COO^-$) are ascribed to the $MEACOO^{-8}$, while peaks at 1385 $cm^{-1}$ and 1635 $cm^{-1}$ are assigned to $CO_3^{2-}$ and $HCO_3^-$, respectively. Intensities of peaks of $HCO_3^-$ in the catalytic MEA solution during $CO_2$ absorption (see FIG. 4F) increase faster than those of the uncatalytic ones, shown in FIG. 4E. Moreover, peak intensities of $MEACOO^-$ and $CO_3^{2-}$ for the catalytic MEA solutions at the end of $CO_2$ absorption (7800 s or 130 min) are stronger than those of the uncatalytic one. Differences are more obvious for the desorption tests, as shown in FIG. 4G and FIG. 4H. Peak intensities of $HCO_3^-$ in the uncatalytic MEA solutions decrease slowly with the continuous $CO_2$ desorption, and the intensities of $CO_3^{2-}$ and $MEACOO^-$ peaks and thus the concentrations of $CO_3^{2-}$ and $MEACOO^-$ barely change, in spite of the subsequent slightly noticeable variations. However, peak intensities of $HCO_3^-$, $CO_3^{2-}$ and $MEACOO^-$ of the catalytic MEA solutions decrease considerably fast with time during $CO_2$ desorption, especially in the initial 10 min. The experimental observations of the changes in concentrations of intermediates with FT-IR spectra confirm the significant catalytic effect of the [EMmim][$NTf_2$].

4.2. Unanalyzed and Catalyzed $CO_2$ Sorption Pathways, Desorption Pathways, and Essential Differences The density functional theory (DFT) calculations in this research have been performed by means of the Dmol3 program in the Materials Studio package. In order to evaluate the accuracy of the methods set for computing the catalytic effect of [$EMmim^+$][$NTF_2^-$], DFT based calculations for the reactions during $CO_2$ capture without use of the catalyst were conducted and compared to those reported in the disclosure. The reaction processes with and without use of catalysts are shown vertically and horizontally in FIG. 5A, respectively, while the corresponding energy changes for each step are provided in FIG. 5B. Also, the calculation results can help to identify the high energy barrier step in $CO_2$ desorption process, which give hints on the effectiveness of the [$EMmim^+$][$NTF_2^-$] catalyst.

When catalyst [$EMmim^+$][$NTF_2^-$] cannot be used, there are two possible $CO_2$ capture pathways, P1-$WO_{cat}$-MEA-$CO_2$ (pathway without use of both the catalyst and or in the presence of $H_2O$) and P2-$WO_{cat}$-MEA-$CO_2$—$H_2O$ (pathway without use of the catalyst but with the presence of $H_2O$), based on the zwitterion (ZW) mechanism and bicarbonate ($HCO_3^-$) formation, respectively. The step reactions in P1-$WO_{cat}$-MEA-$CO_2$ (without the presence of water) which is the reactions of —$NH_2$ function groups in any amines, such as MEA, including solid —$NH_2$ containing sorbent with $CO_2$ or liquid amine groups, include:

$$CO_2 + MEA \leftrightarrow MEA^+COO^- (ZW) \qquad (P1-R_1)$$

Figure 5A:
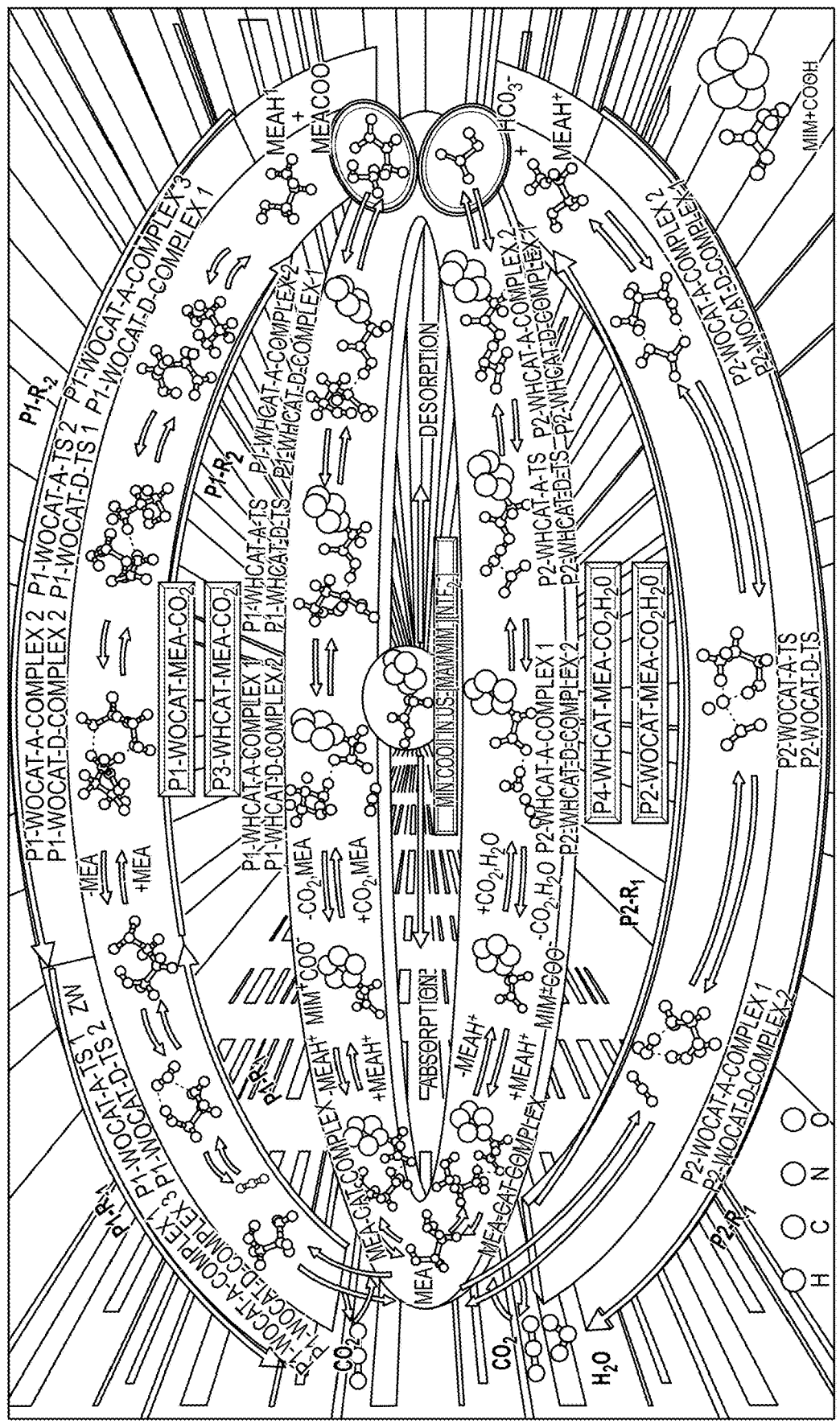
FIG. 5A illustrates exemplary DFT based non-catalytic and catalytic $CO_2$ capture reaction pathways.
Figure 5B:
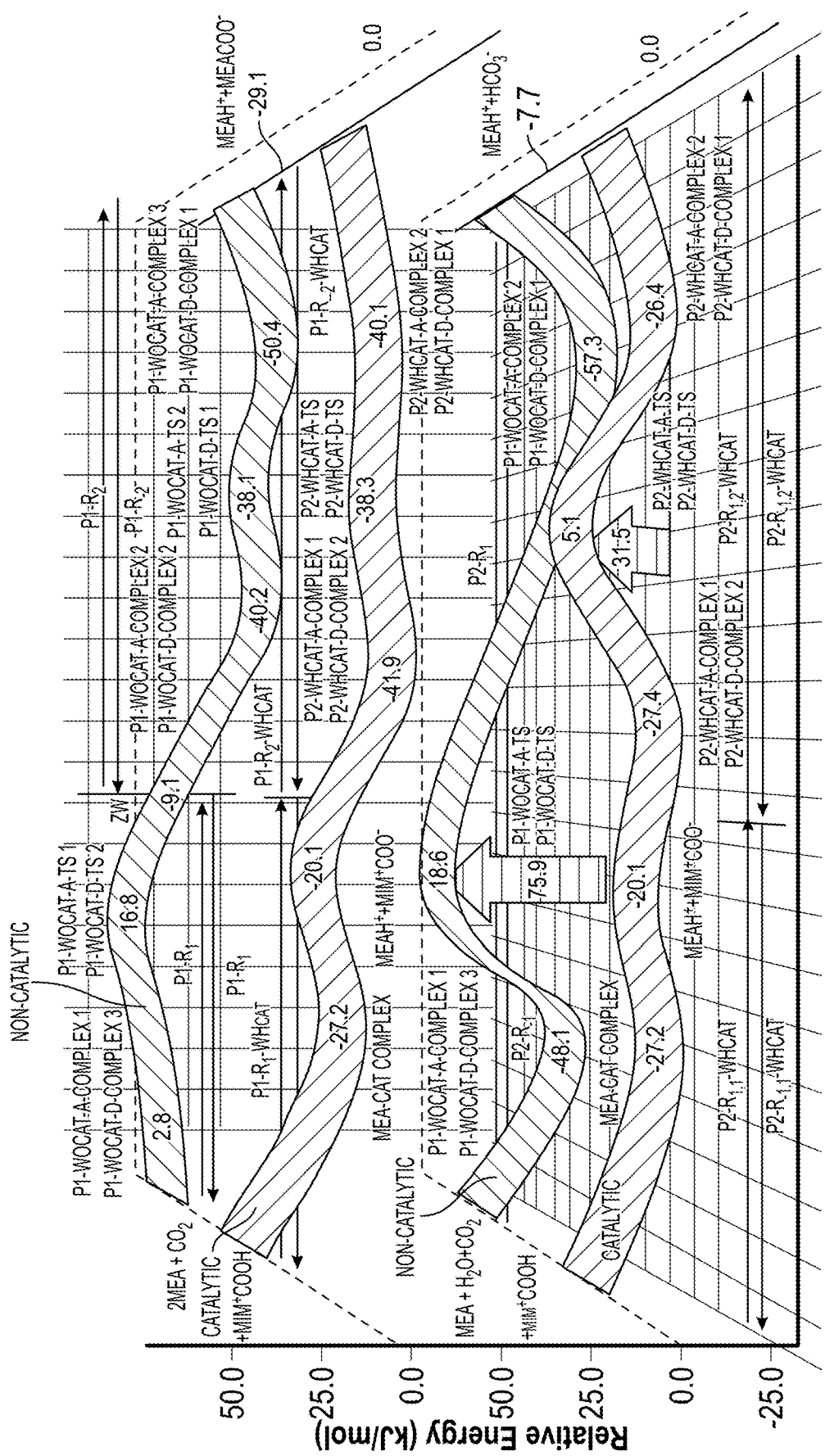
FIG. 5B illustrates exemplary DFT based non-catalytic and catalytic $CO_2$ capture energy profiles.
Figure 24:
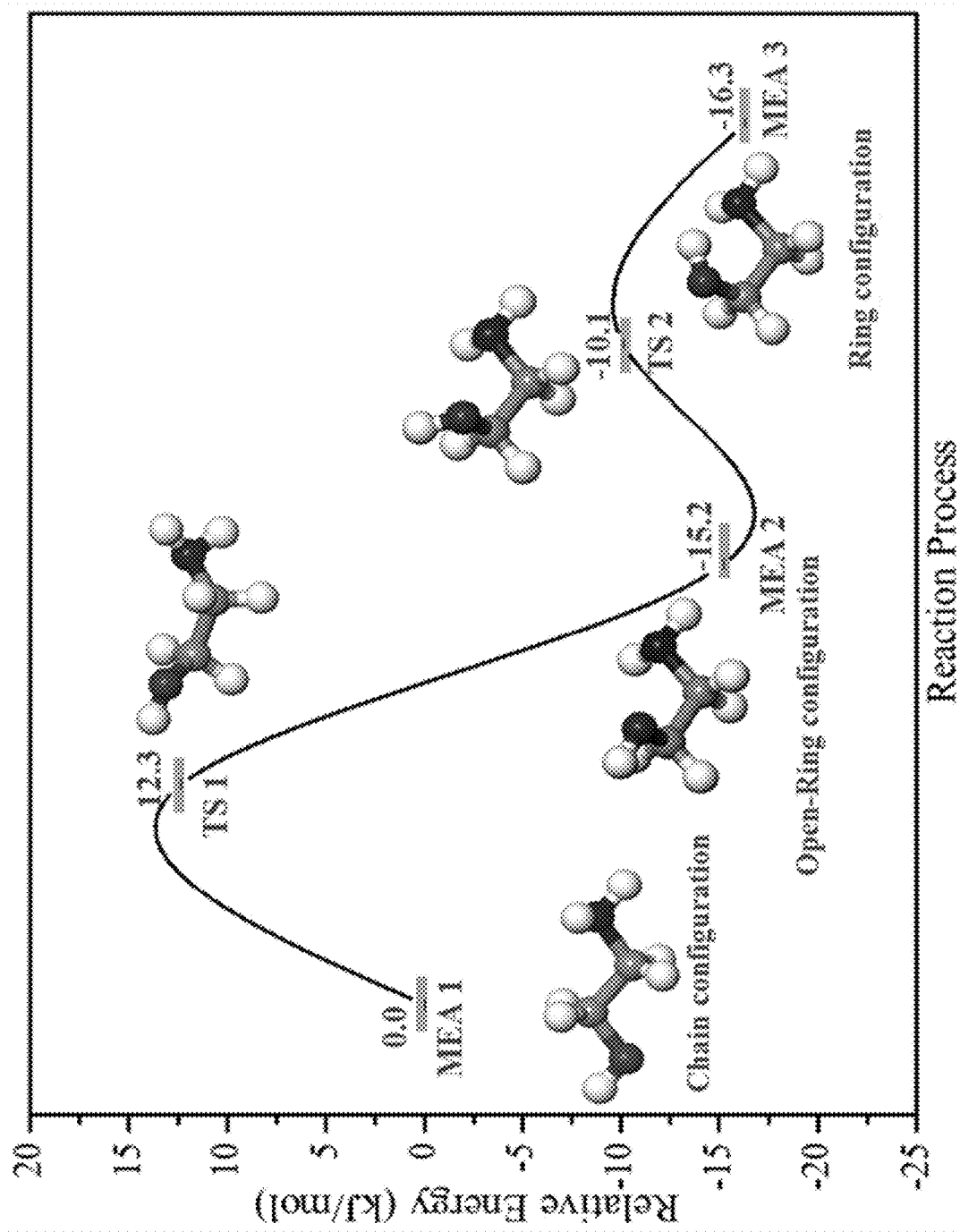
FIG. 24 provides graphs illustrating the optimized geometries associated with transformation between different MEA configurations.
Figure 25A:
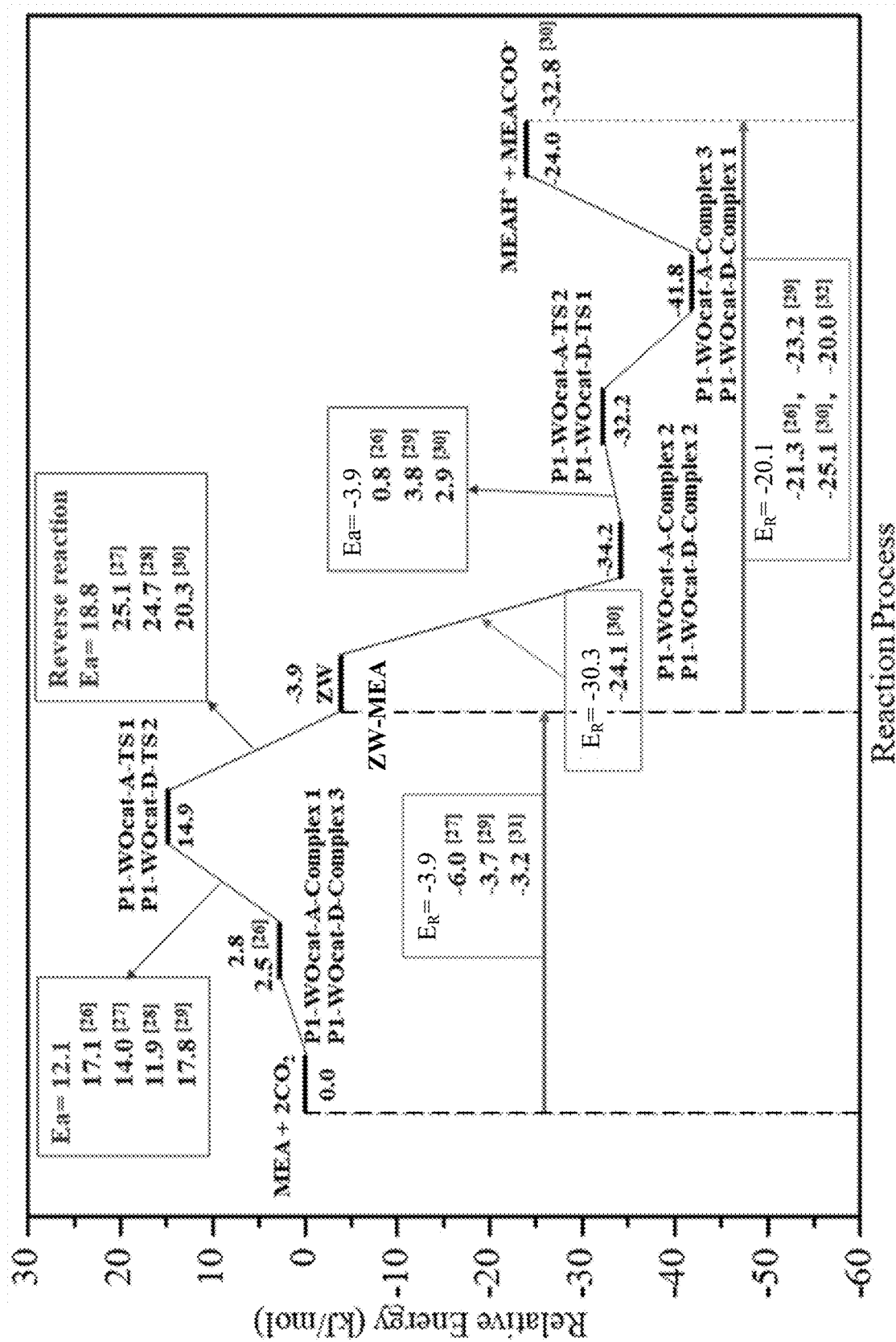
FIG. 25A provides a graph illustrating the relative energy comparison between our calculation and disclosure's results in $CO_2$ absorption process in MEA solution followed by ZW mechanism.
Figure 25B:
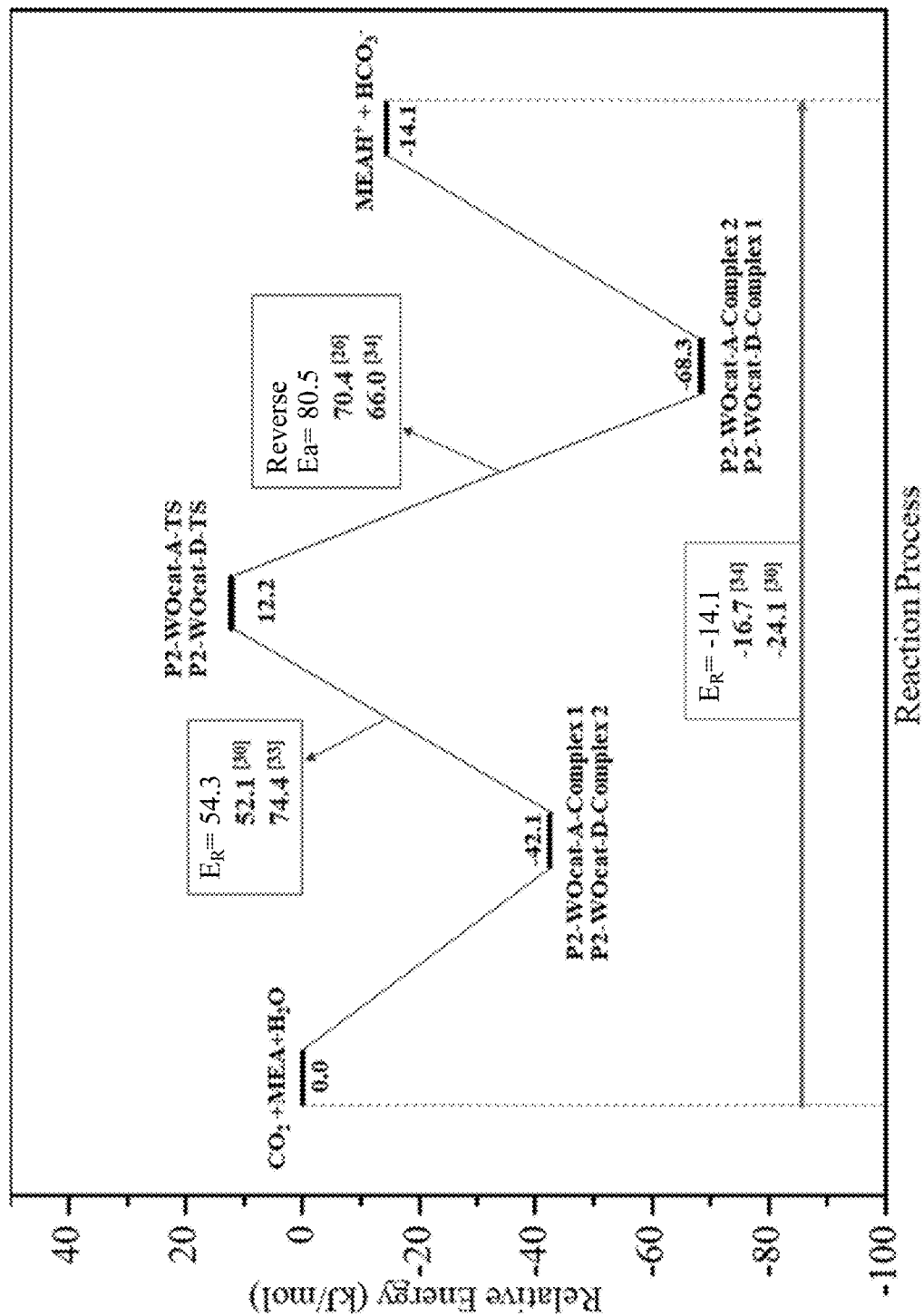
FIG. 25B provides a graph illustrating the relative energy comparison between our calculation and disclosure's results in $CO_2$ absorption process in MEA solution followed by bicarbonate mechanism.

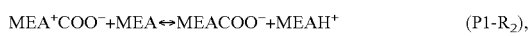
$$MEA^+COO^- + MEA \leftrightarrow MEACOO^- + MEAH^+ \qquad (P1-R_2),$$

which are shown in FIG. 5A. If water is present, the reaction only forms $MEAH^+$ along with $HCO_3^-$ (Carbonic acid). The P1-$WO_{cat}$-MEA-$CO_2$ reaction mechanism allows solid based $CO_2$ capture. MEA is a —$NH_2$ based amine or one of the —$NH_2$ carrying amine compounds or containing an amine compound. The ring configuration of MEA as shown in FIG. 24 can be the most stable structure, where, for example, the stability order of MEA can be: Ring configuration>Open-Ring configuration>Chain configuration. However, the activation energies for transformation between each other can be moderate, indicating they could exist at the same time. Ring configuration, the most stable structure can be chosen for our calculations. As shown in FIG. 5B, the absorption process in P1-$WO_{cat}$-MEA-$CO_2$, including P1-$R_1$ and P1-$R_2$ can be exothermic because it can release between 24.0 kJ/mol and 29.1 kJ/mol, which can be not only consistent with the experimental observation that the solvent temperature can be found increase slightly during the $CO_2$ absorption process, but also agreed with the measured value. Furthermore, the calculated reaction energies ($E_r$) and activation energies ($E_a$) in the forward (for $CO_2$ absorption) and reverse (for $CO_2$ desorption) of P1-$WO_{cat}$-MEA-$CO_2$, P1-$R_1$ and P1-$R_2$, as well as P1-$R_{-1}$ and $P_1$-$R_{-2}$, respectively, are very close to those in the same literature, shown in FIGS. 25A and 25B. Thus, the computational methods are agreeable to these values. Special attention should be paid to P1-$R_{-1}$ because it can be identified as the rate determining step of $CO_2$ desorption for P1-$WO_{cat}$-MEA-$CO_2$ due to its high reaction energy (31.1 kJ/mol). Due to the lack of the presence of water, $HCO_3^-$ is not formed in the first step of the reaction. P1-$R_1$ and P1$R_2$ are the reactions of —$NH_2$ function groups in any amines including solid —NH2 contain sorbent with $CO_2$.

For P2-$WO_{cat}$-MEA-$CO_2$—$H_2O$ where $HCO_3^-$ can be involved due to the presence of water. The commonly bicarbonate generation reactions are:

$$CO_2 + MEA + H_2O \leftrightarrow HCO_3^- + MEAH^+ \qquad (P_2-R_1)$$

$$CO_2 + H_2O \leftrightarrow HCO_3^- + H^+ \qquad (P2-R_{2-1})$$

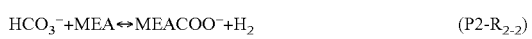
$$HCO_3^- + MEA \leftrightarrow MEACOO^- + H_2 \qquad (P2-R_{2-2})$$

$$MEACOO^- + H_3O^+ \leftrightarrow HCO_3^- + MEAH^+ \qquad (P2-R_{2-3})$$

$$CO_2 + MEA \leftrightarrow MEA^+COO^- \qquad (P2-R_{3-1})$$

$$MEA^+COO^- + H_2O \rightarrow HCO_3^- + MEAH^+. \qquad (P2-R_{3-2})$$

Figure 26A:
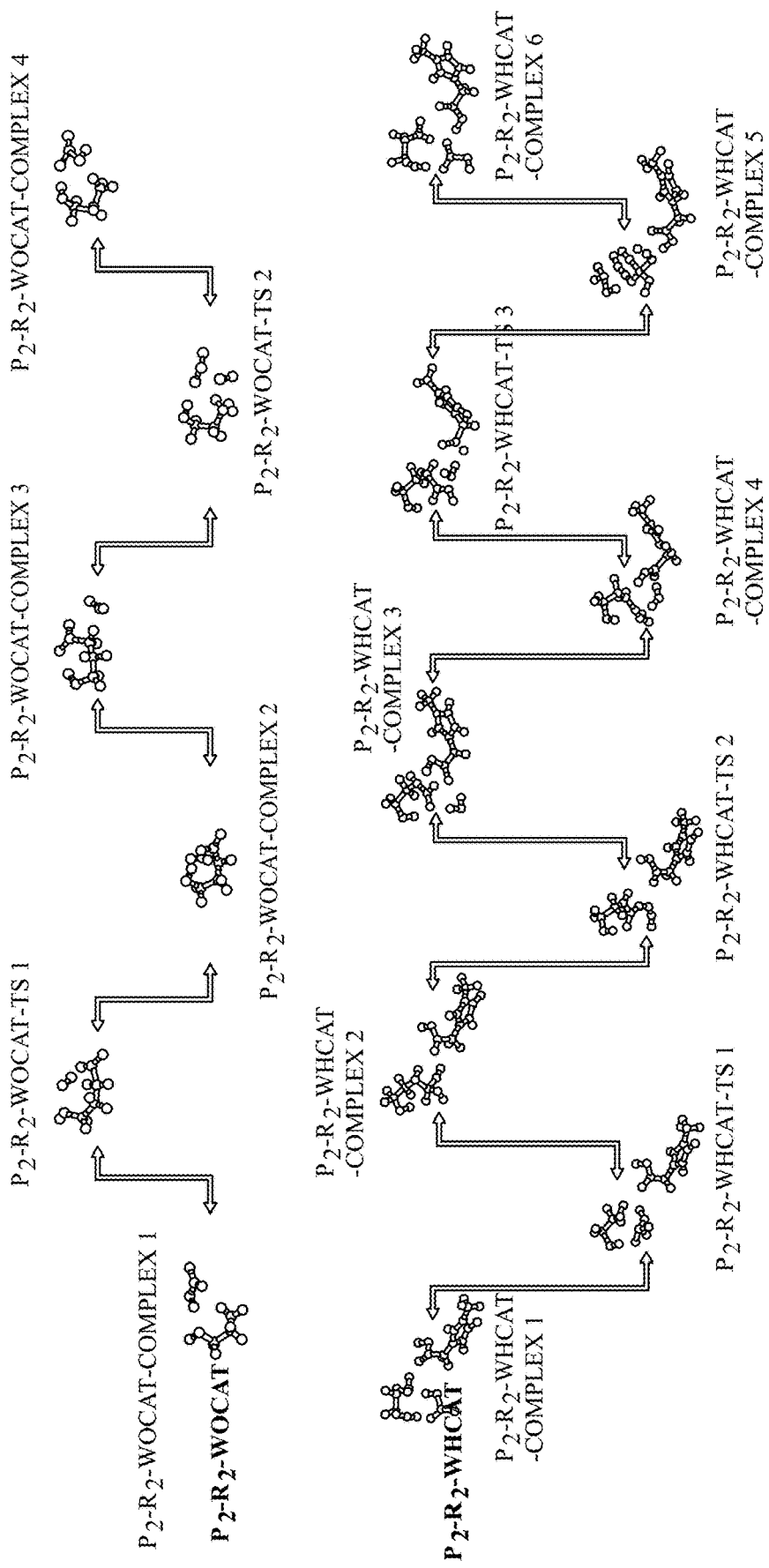
FIGS. 26A-C provide pictorial representations of the relative energy comparison among P2-R1 to P2-R3 with and without $mim^+COOH$.
Figure 26B:
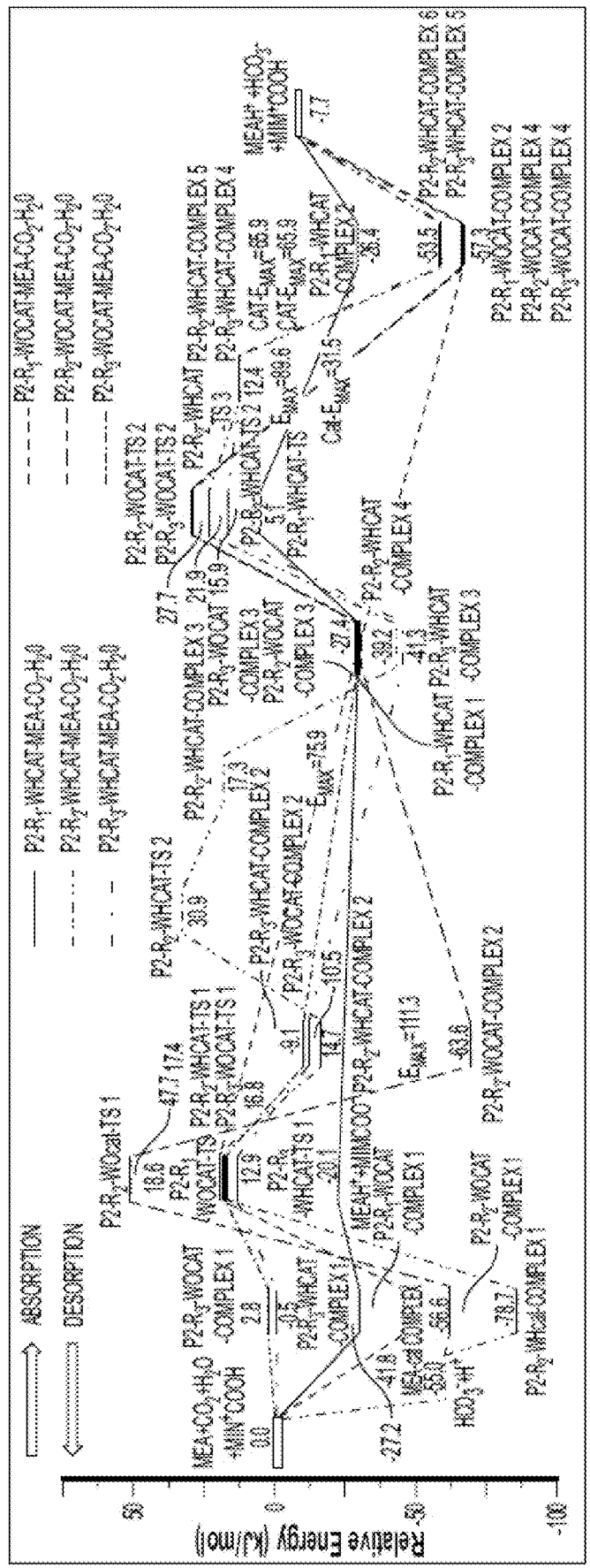
Figure 26C:
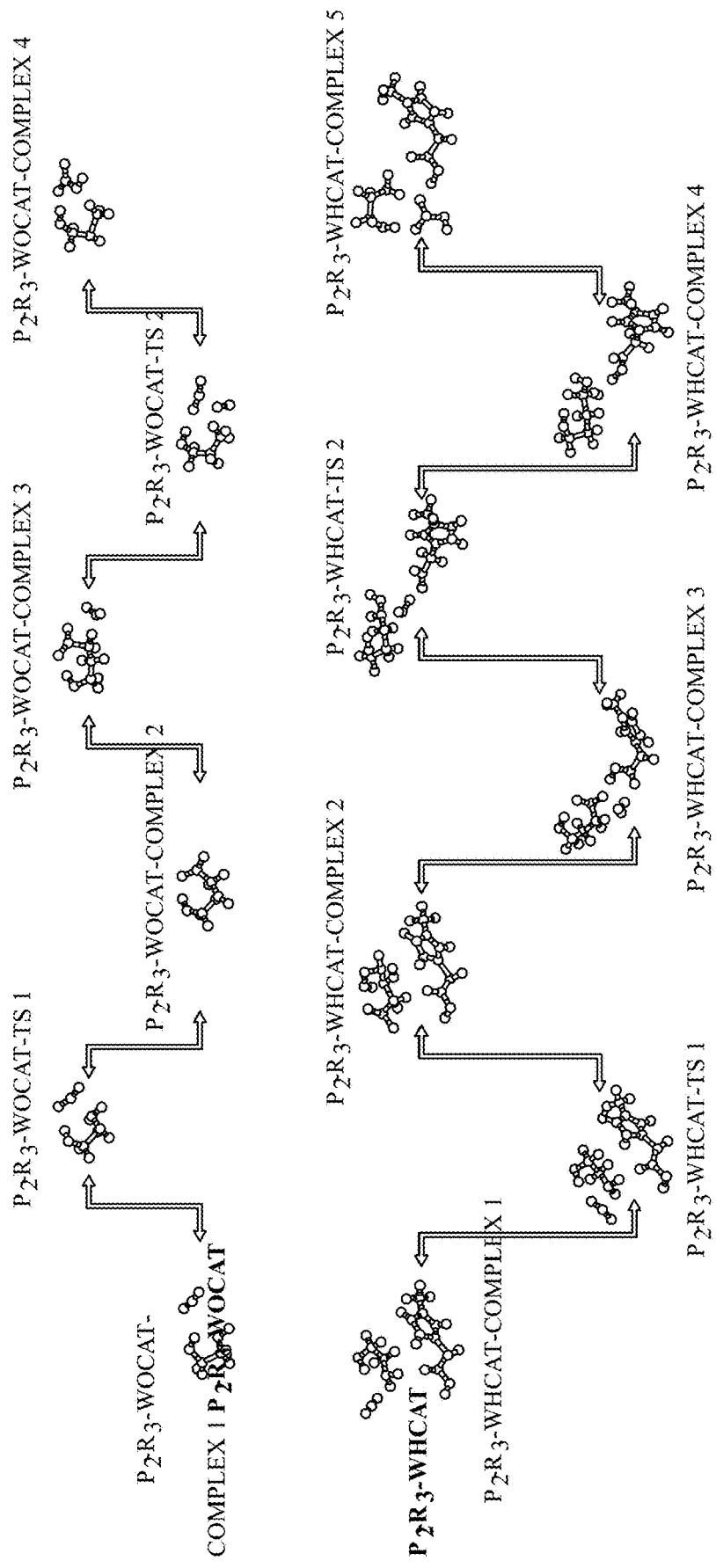
Figure 27A:
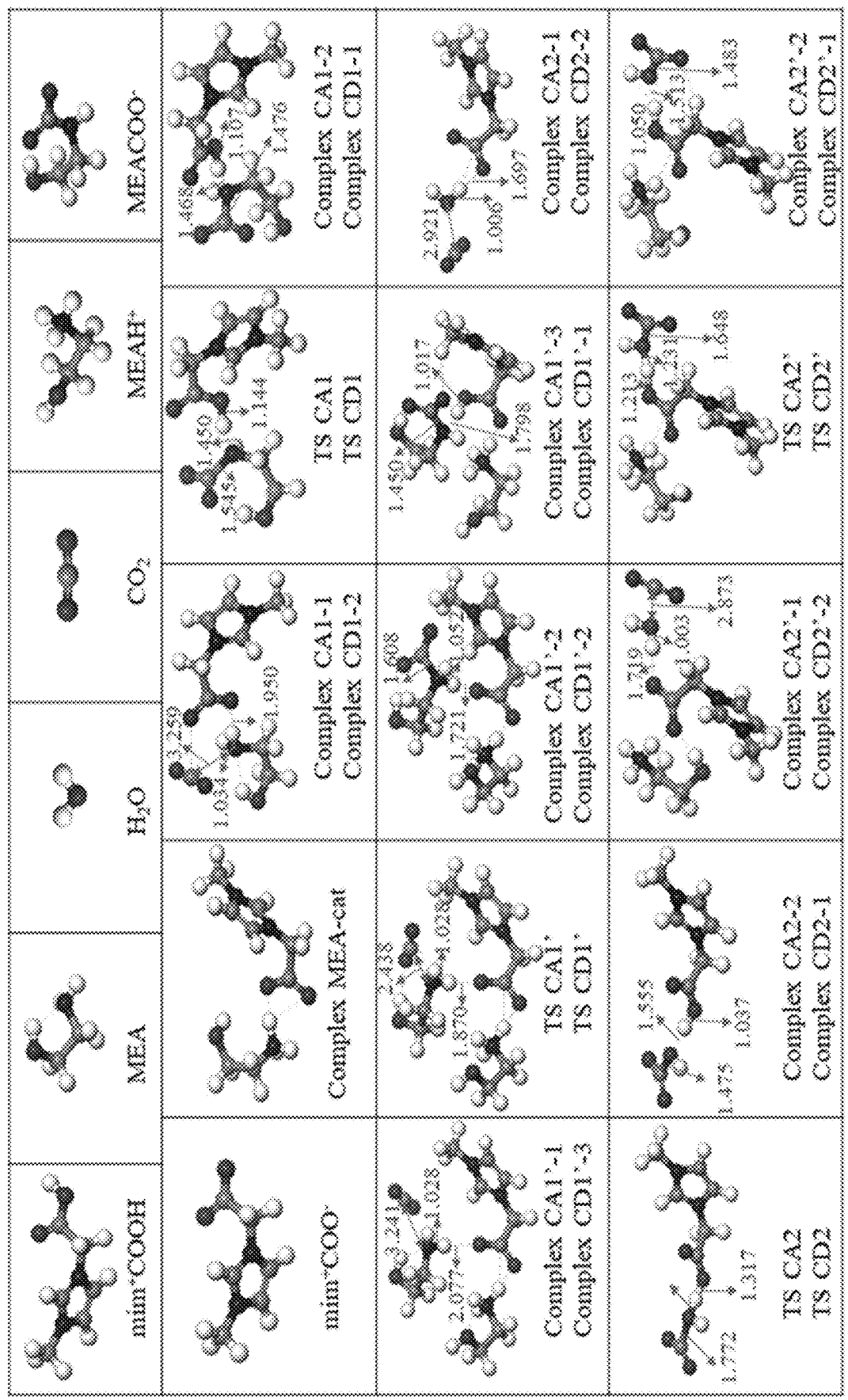
FIG. 27A provides graphs illustrating the Catalysis ability comparison of MEA-cat Complex with $mimCOO^-$.
Figure 27B:
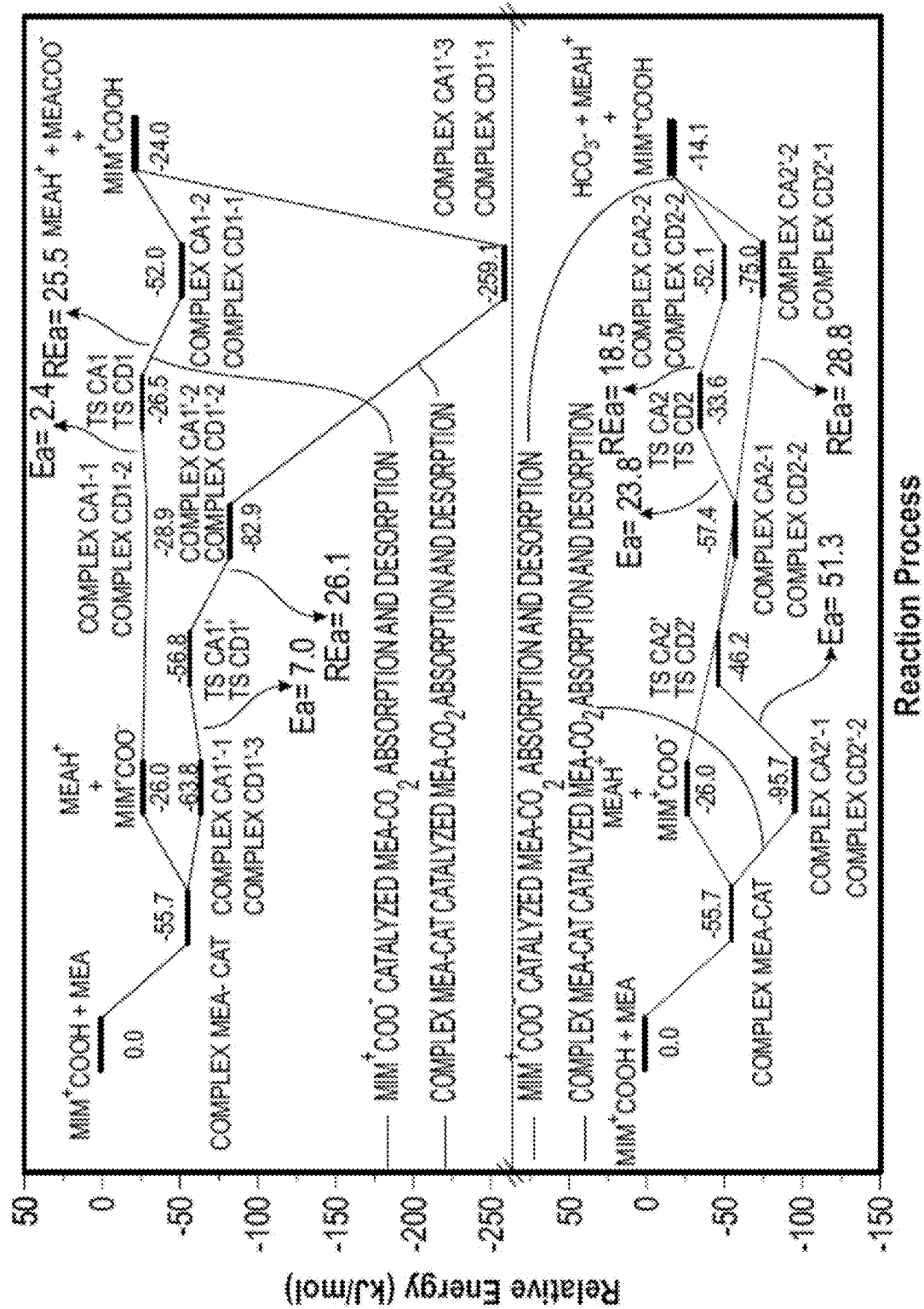
FIG. 27B provides graphs illustrating the reaction energy profile for the possible catalyzed pathways for MEA-$CO_2$ and $H_2O$-MEA-$CO_2$.
Figure 27C:
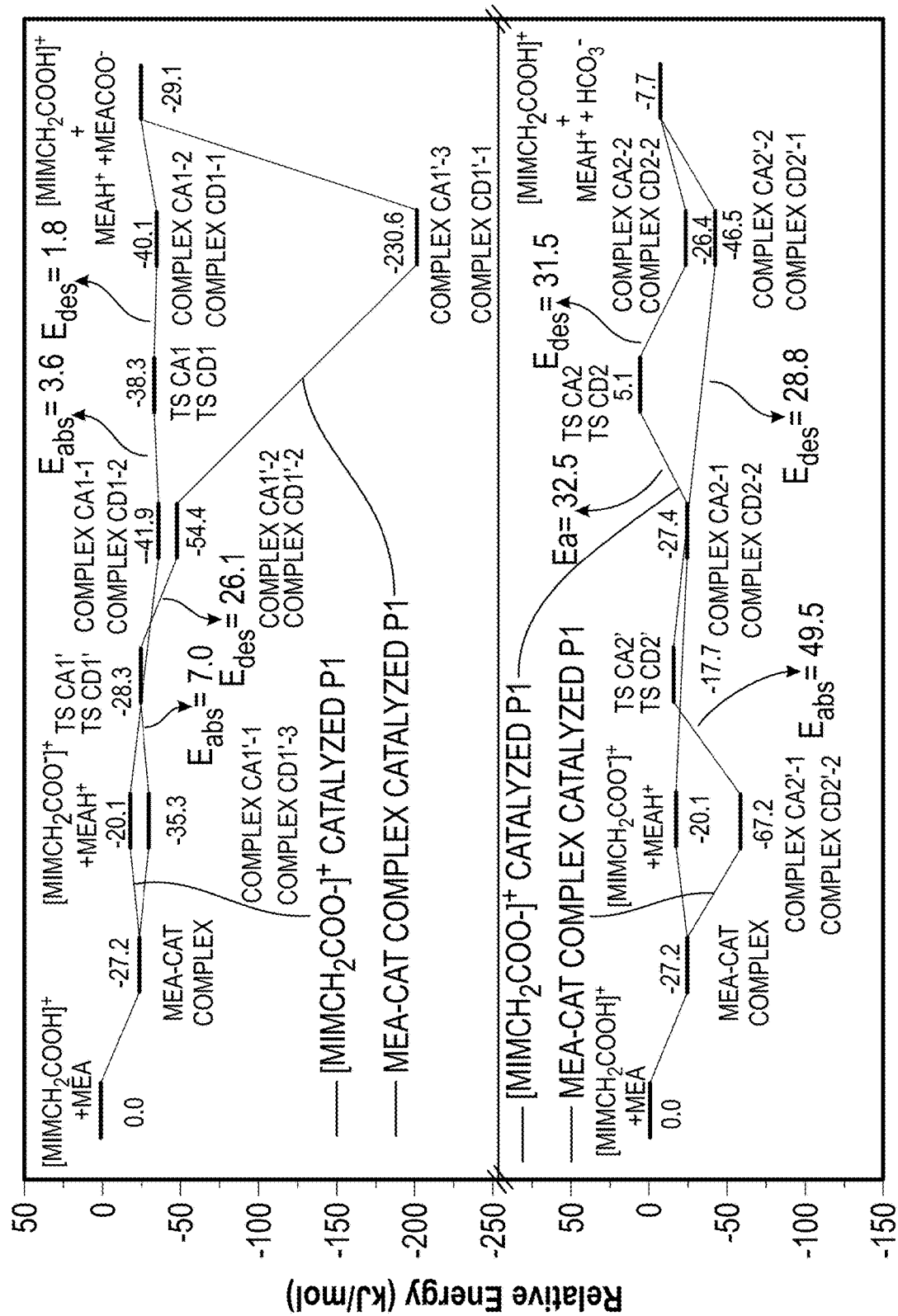
FIG. 27C is a pictorial representation of catalysis ability comparisons between MEA-cat Complex and $[mimCH_2COO^-]^+$ in accordance with an exemplary aspect of the present disclosure.
Figure 27D:
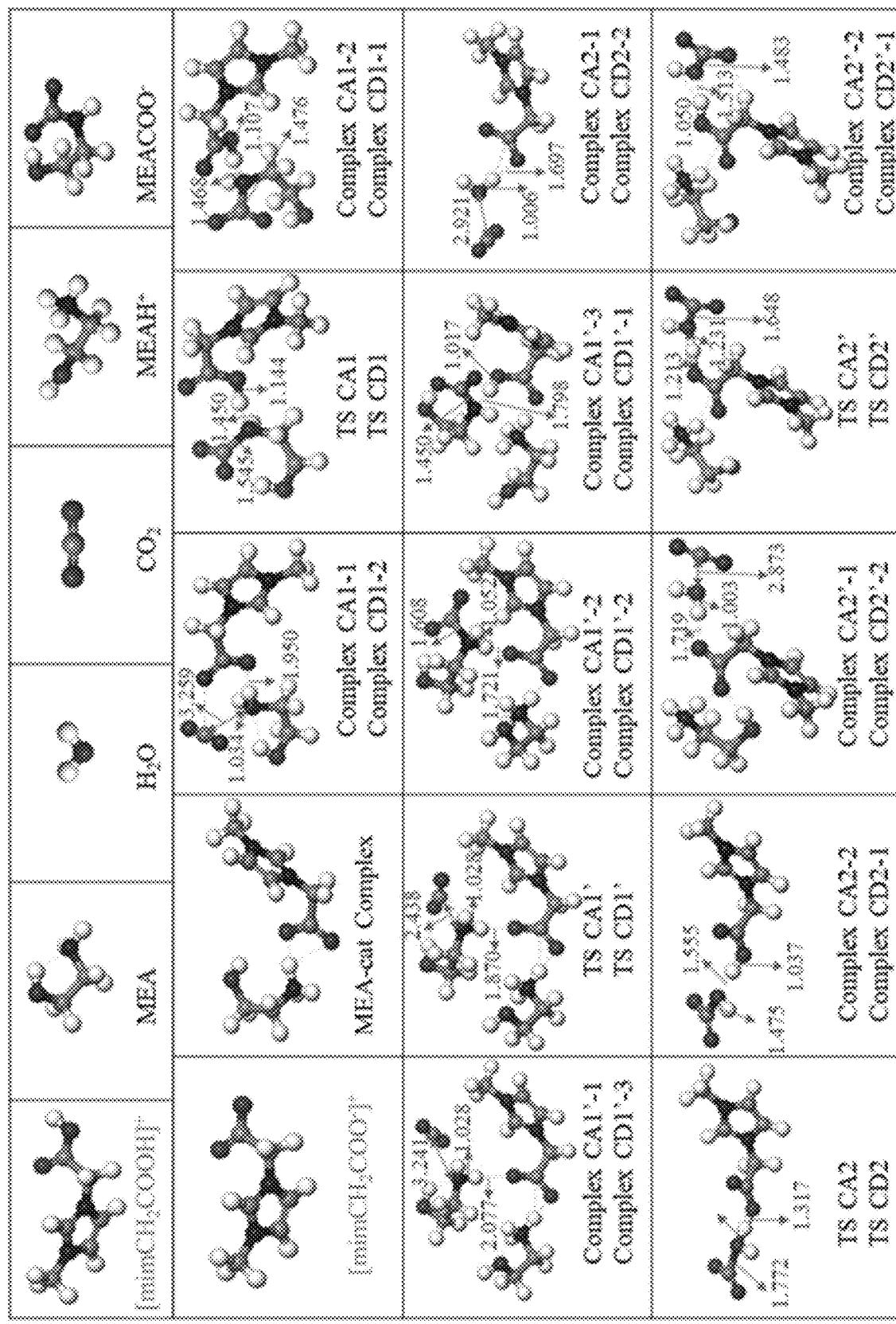
FIG. 27D is another pictorial representation of catalysis ability comparisons between MEA-cat Complex and $[mimCH_2COO^-]^+$ in accordance with an exemplary aspect of the present disclosure.

The reaction energy values of P2-$R_1$ to P2-$R_3$ were calculated and compared in FIG. 26. [$mimCH_2COOH$]$^+$ as a Brønsted acid is the core of the catalytic $CO_2$ capture technology, thus, [mimCH$_2$COOH]$^+$ instead of [EMmim][NTf$_2$] is used for modeling the catalyst, For example, the highest step reaction energy changes during catalytic CO$_2$ desorption, P2-R$_1$-WO$_{cat}$-MEA-CO$_2$-H$_2$O is the most sensitive step. In addition, CO$_2$ absorption in P2-R$_1$-WO$_{cat}$-MEA-CO$_2$-H$_2$O has the lowest maximum reaction energy, indicating that CO$_2$ absorption with P2-R$_1$-WO$_{cat}$-MEA-CO$_2$-H$_2$O is the easiest one among the three pathways. Thus, can be P2-WO$_{cat}$-MEA-CO$_2$-H$_2$O (P2-R$_1$) can be the preferred pathway because of its lowest energy barrier among all the steps of P2-R$_1$ to P2-R$_3$. That energy barrier can be 66.7 kJ/mol, which can be close to the value (74.4 kJ/mol) obtained by others. Also, P2-WO$_{cat}$-MEA-CO$_2$-H$_2$O can be a very possible reaction pathway in the presence of water according to the data in FIGS. 4A-4H. Thus, FIGS. 5A and 5B only show P2-WO$_{cat}$-MEA-CO$_2$-H$_2$O and its step reactions as well as the associated energy data. The ionic catalyst can accelerate CO$_2$ capture with and without the presence of water or the liquid and solid —NH$_2$ containing sorbents.

Then, the assured computational methods were applied to explain how the catalyst –[EMmim$^+$][NTF$_2$$^-$] can overcome the challenge of chemisorption-based CO$_2$ capture via significant acceleration of CO$_2$ desorption with catalysis in P1-WH$_{cat}$-MEA-CO$_2$ (pathway with use of the organocatalyst but without the presence of H$_2$O) and P2-WH$_{cat}$-MEA-CO$_2$-H$_2$O (pathway with use of both the catalyst, such as an organocatalyst, and H$_2$O). A liquid catalyst can accelerate CO$_2$ capture with and without the presence of water or a liquid and solid —NH$_2$ containing sorbent. The calculated results in FIGS. 5A and 5B clearly show that mim$^+$COOH in EMmim$^+$][NTF$_2$$^-$] prefers to react with MEA to form the complex of MEAH$^+$ and mim$^+$COO$^-$, denoted as MEA-cat Complex in FIGS. 5A and 5B without any energy barrier. As shown in FIGS. 27A-27D, after the decomposition of the MEA-cat Complex, where the acidic [mimCH$_2$COO$^-$]$^+$ reacts with the basic MEA, into MEAH$^+$ and mim$^+$COO$^-$. The latter intermediate (mim$^+$COO$^-$) or [mimCH$_2$COO$^-$]$^+$ can be found to be more effective than the MEA-cat Complex in accelerating MEACOO$^-$ formation in P1-WH$_{cat}$-MEA-CO$_2$. After a comparison, the individual [mimCH$_2$COO$^-$]$^+$ or (mim$^+$COO$^-$) is preferred to be the catalyst of the process. Where, specifically, in accordance with aspects of the present disclosure FIG. 27D discloses the optimized geometries associated with the possible catalyzed pathways for MEA-CO$_2$ and H$_2$O-MEA-CO$_2$. And, where, specifically, in accordance with aspects of the present disclosure FIG. 27C discloses the reaction energy profiles for the possible catalyzed pathways for MEA-CO$_2$ and H$_2$-MEA-CO$_2$. E$_{abs}$ marked with yellow stands for the energy barriers for absorption process and E$_{des}$ marked with yellow represents that for desorption process. Therefore, after the decomposition of the MEA-cat Complex into MEAH$^+$ and [mimCH$_2$COOH]$^+$, the latter intermediate ([mimCH$_2$COO$^-$]$^+$) is found to be more effective than the MEA-cat Complex in accelerating the formation of MEA-COO$^-$ in P1-WH$_{cat}$-MEA-CO$_2$. As a result, in the presence of [mimCH$_2$COOH]$^+$, P1-WH$_{cat}$-MEA-CO$_2$ can avoid the rate determining step of P1-WO$_{cat}$-MEA-CO$_2$, P1-R$_1$, which is the key point to lowering the overall CO$_2$ capture energy consumption. Instead, reactions in the catalyzed desorption pathway are in way of:

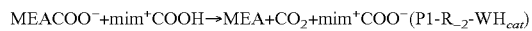

MEACOO$^-$+mim$^+$COOH→MEA+CO$_2$+mim$^+$COO$^-$ (P1-R$_{-2}$-WH$_{cat}$)

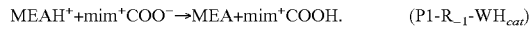

MEAH$^+$+mim$^+$COO$^-$→MEA+mim$^+$COOH.　　(P1-R$_{-1}$-WH$_{cat}$)

Or

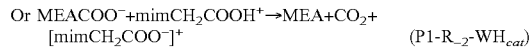

Or MEACOO$^-$+mimCH$_2$COOH$^+$→MEA+CO$_2$+ [mimCH$_2$COO$^-$]$^+$　　(P1-R$_{-2}$-WH$_{cat}$)

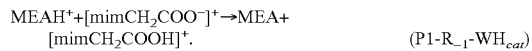

MEAH$^+$+[mimCH$_2$COO$^-$]$^+$→MEA+ [mimCH$_2$COOH]$^+$.　　(P1-R$_{-1}$-WH$_{cat}$)

P1-R$_1$-WH$_{cat}$ and P1-R$_1$-WH$_{cat}$ provide the catalytic function of the ionic liquid for CO$_2$ capture without the presence of H$_2$O. Notice that the highest energy changes of the step reactions of P1-WH$_{cat}$-MEA-CO$_2$ in FIG. 5B, 11.0 kJ/mol for CO$_2$ absorption and 27.2 kJ/mol for CO$_2$ desorption, respectively, are lower than the corresponding values in P1-WO$_{cat}$-MEA-CO$_2$, 21.3 kJ/mol and 31.1 kJ/mol. Thus, [EMmim$^+$][NTF$_2$$^-$] can clearly facilitate the route of P1-WO$_{cat}$-MEA-CO$_2$ based CO$_2$ capture, with the P1-WH$_{cat}$-MEA-CO$_2$ more preferable.

Also, the energy profiles for CO$_2$ absorption-desorption in P2-R$_1$ to P2-R$_3$, with and without the presences of [EMmim$^+$][NTF$_2$$^-$], were calculated. The highest step reaction energy changes during catalytic CO$_2$ desorption, P2-R$_1$-WH$_{cat}$-MEA-CO$_2$-H$_2$O, P2-R$_2$-WH$_{cat}$-MEA-CO$_2$-H$_2$O and P2-R$_3$-WH$_{cat}$-MEA-CO$_2$-H$_2$O, are 31.5 kJ/mol, 65.9 kJ/mol and 65.9 kJ/mol, respectively, which are substantially lower than the corresponding values of non-catalytic P2-R$_1$-WO$_{cat}$-MEA-CO$_2$-H$_2$O, P2-R$_2$-WO$_{cat}$-MEA-CO$_2$-H$_2$O, and P2-R$_3$-WO$_{cat}$-MEA-CO$_2$-H$_2$O, which are 75.9 kJ/mol, 111.3 kJ/mol and 89.6 kJ/mol as shown in FIGS. 27A-27D. Although CO$_2$ desorption in all the three pathways can be accelerated with [EMmim$^+$][NTF$_2$$^-$], P2-R$_1$-WO$_{cat}$-MEA-CO$_2$-H$_2$O appears to be the most easiest one for the non-catalytic steps. Also, the CO$_2$ absorption in P2-R$_1$-WO$_{cat}$-MEA-CO$_2$-H$_2$O has the lowest maximum reaction energy, 32.5 kJ/mol, while those values for P2-R$_2$-WO$_{cat}$-MEA-CO$_2$-H$_2$O and P2-R$_3$-WO$_{cat}$-MEA-CO$_2$-H$_2$O are 104.3 kJ/mol and 55.1 kJ/mol, respectively. This result indicates that CO$_2$ absorption with P2-R$_1$-WO$_{cat}$-MEA-CO$_2$-H$_2$O can be the easiest one among the three pathways. Therefore, the P2-R$_1$-WH$_{cat}$-MEA-CO$_2$-H$_2$O based CO$_2$ capture pathway using catalyst can be also likely to be the most significant step. Accordingly, it can be further studied as detailed below.

Figure 28A:
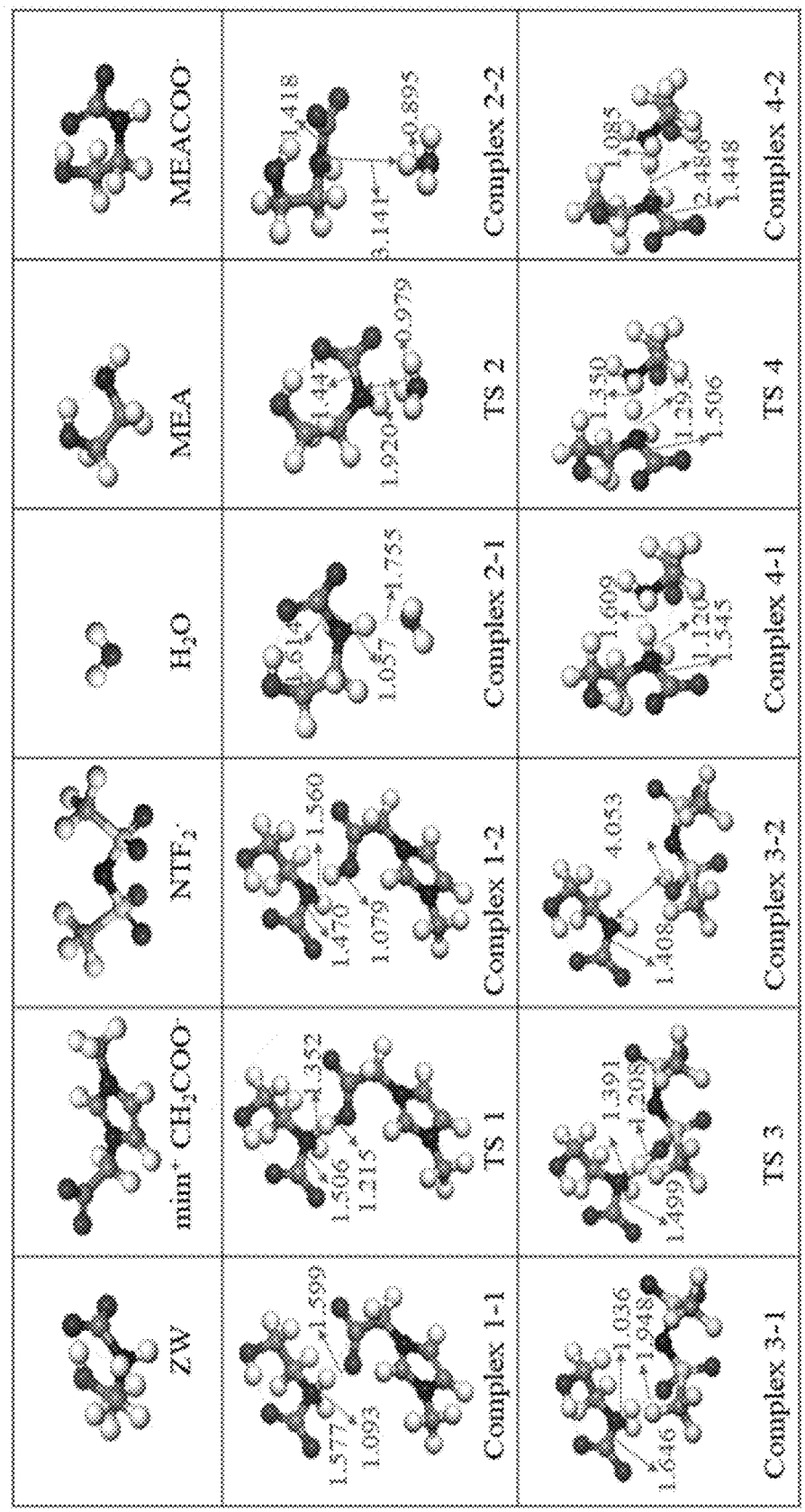
FIG. 28A provides a pictorial representation of the Brønsted basicity comparison of $mim^+COO^-$, $NTF_2^-$, $H_2O$ and MEA, where the pictorial representation is the optimized geometries associated with the proton transfer reaction of ZW with $mim^+COO^-$, $NTF_2^-$, $H_2O$ and MEA, and plot (b) is the reaction energy profile for proton transfer reaction of ZW with $mim^+COO^-$, $NTF_2^-$, $H_2O$ and MEA.
Figure 28B:
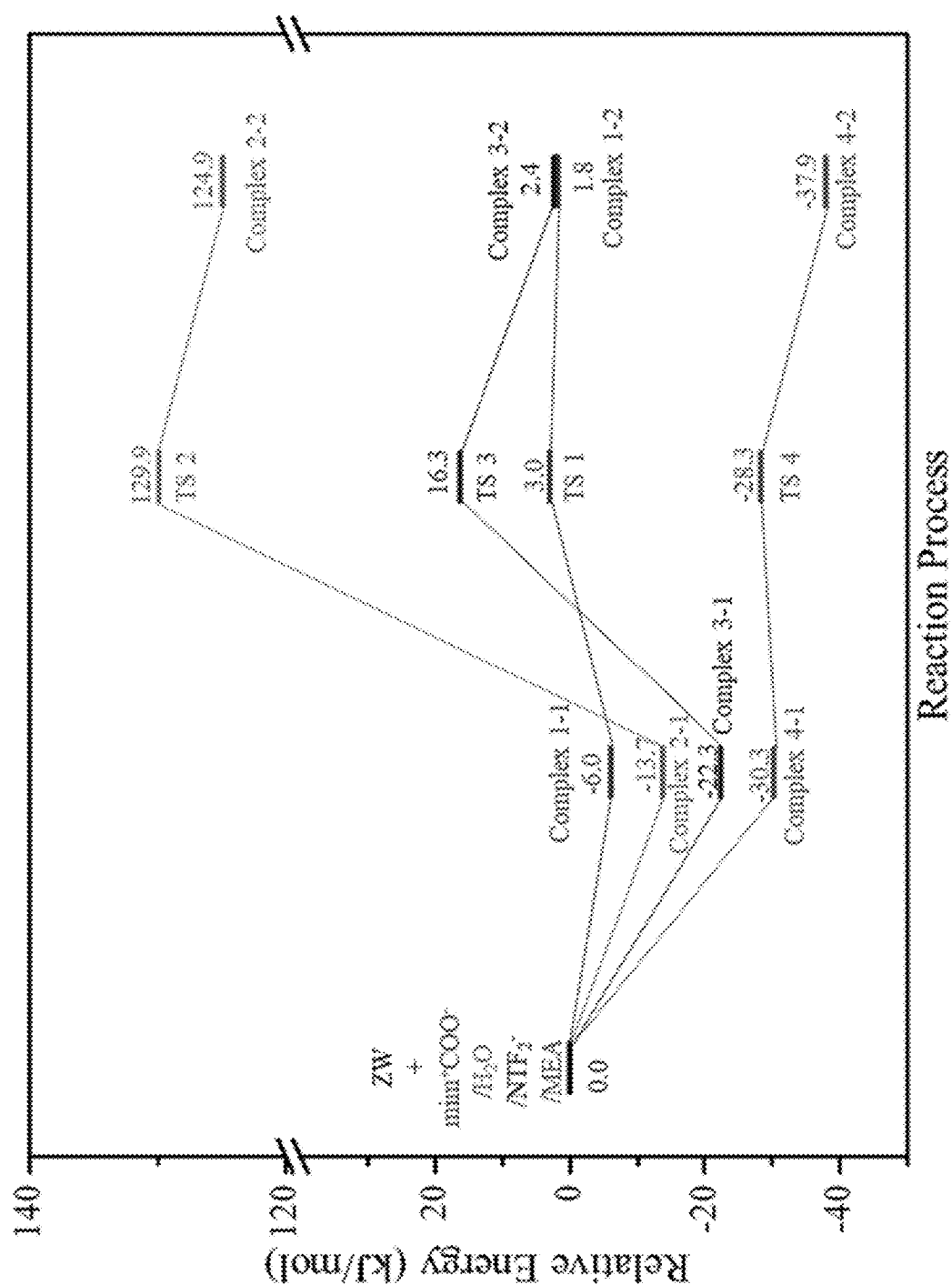
FIG. 28B provides a graph illustrating the Brønsted basicity comparison of $mim^+COO^-$, $NTF_2^-$, $H_2O$ and MEA, where the plot is the reaction energy profile for proton transfer reaction of ZW with $mim^+COO^-$, $NTF_2^-$, $H_2O$ and MEA.
Figure 29A:
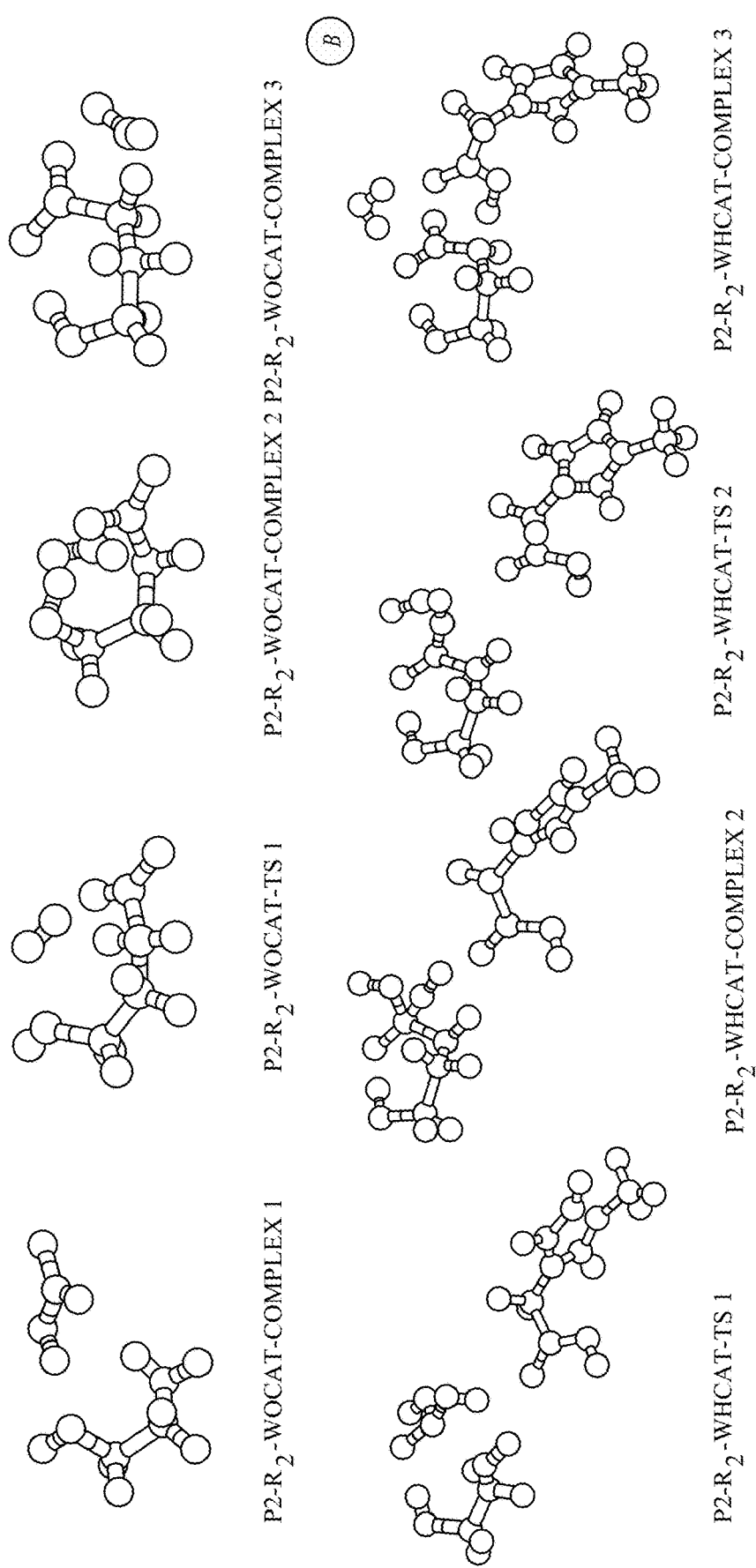
FIGS. 29A-H provide graphs illustrating all the configurations, including reactants, intermediate, such as complexes, transition states and products listed in the Figures.
Figure 29B:
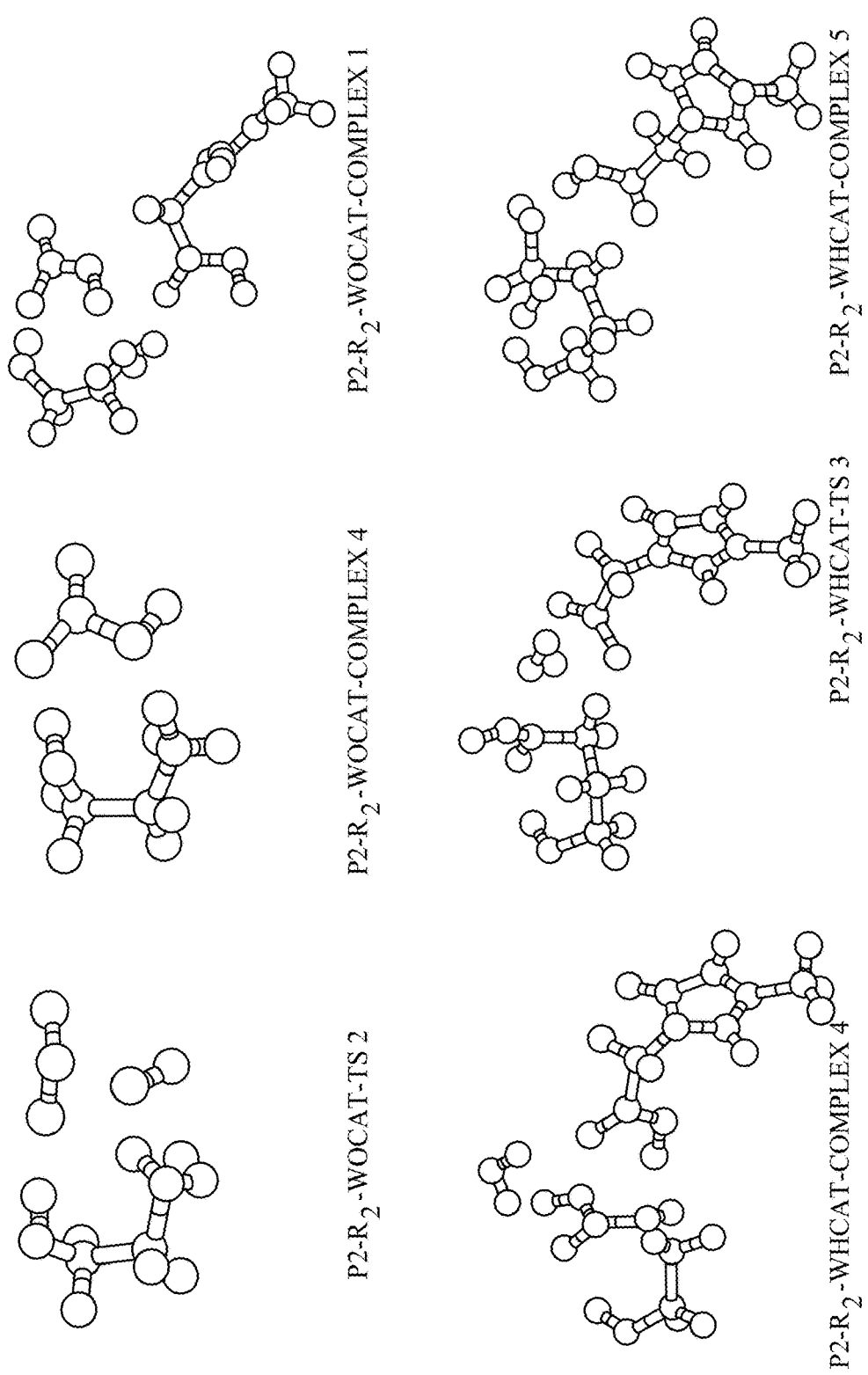
Figure 29C:
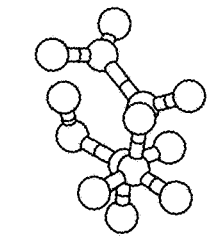
Figure 29C:
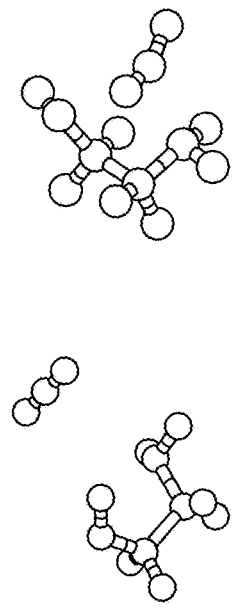
Figure 29C:
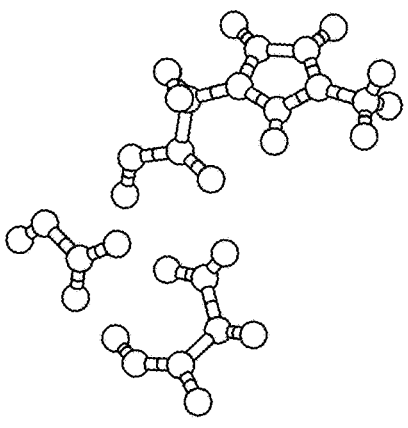
Figure 29C:
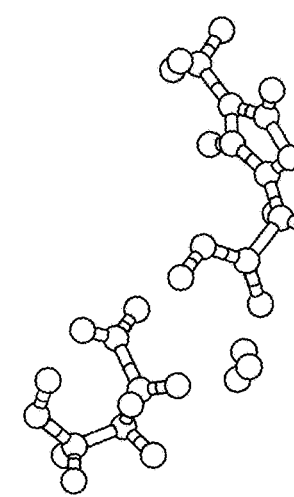
Figure 29C:
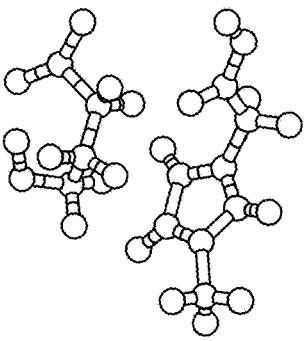
Figure 29C:
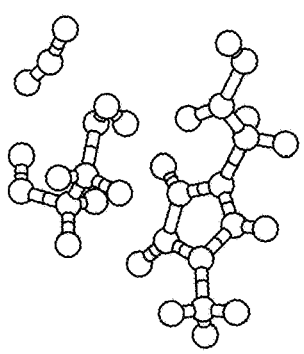
Figure 29C:
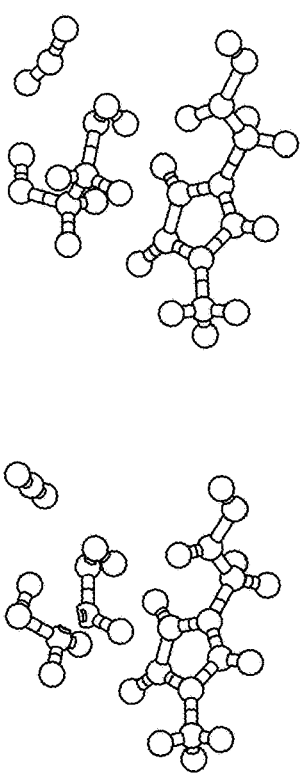
Figure 29D:
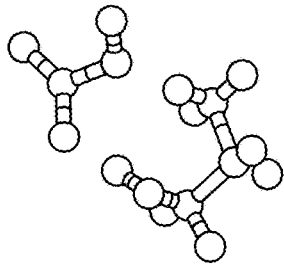
Figure 29D:
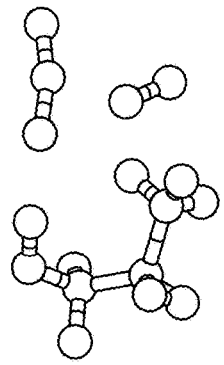
Figure 29D:
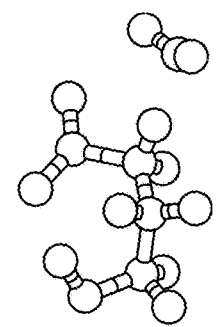
Figure 29D:
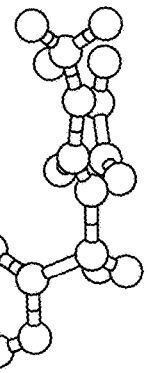
Figure 29D:
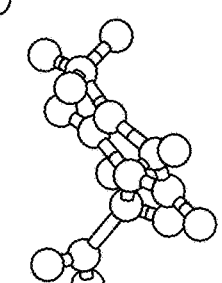
Figure 29D:
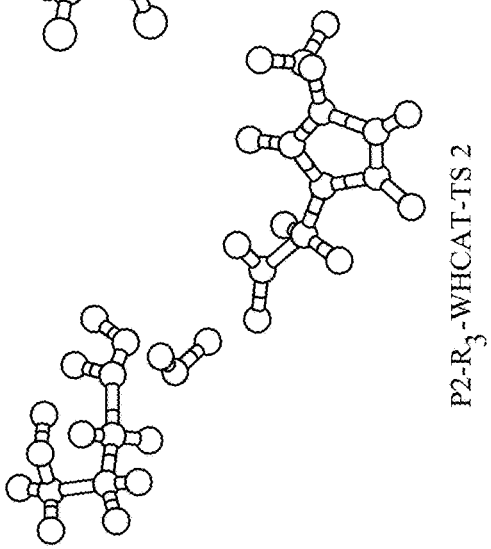
Figure 29E:
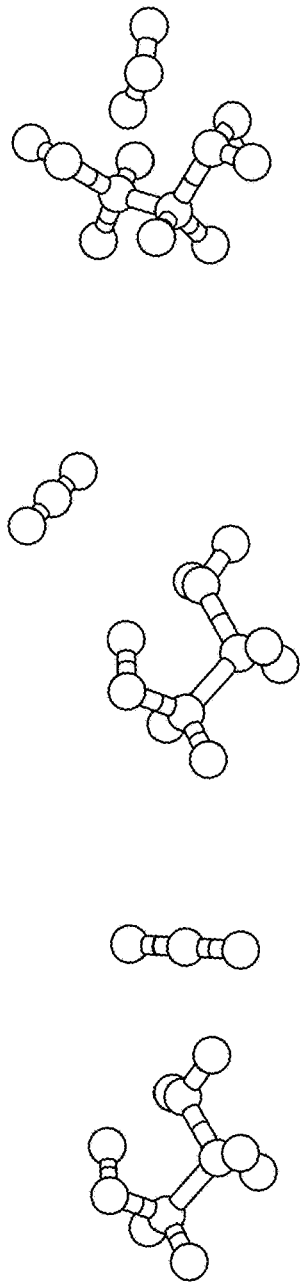
Figure 29E:
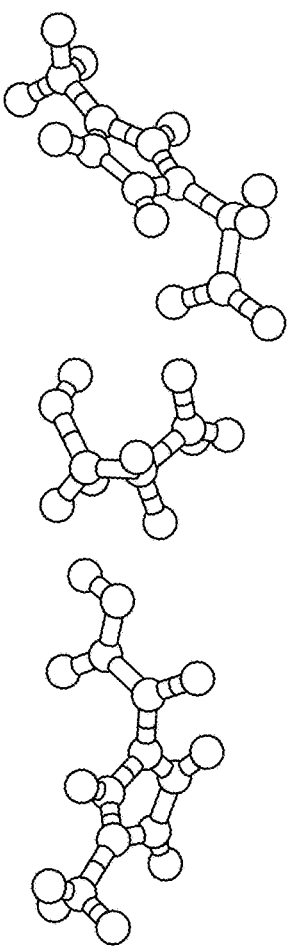
Figure 29E:
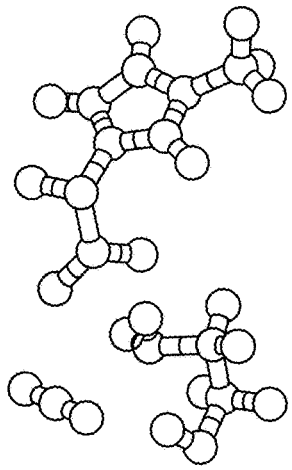
Figure 29E:
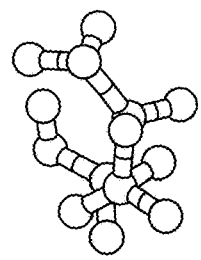
Figure 29F:
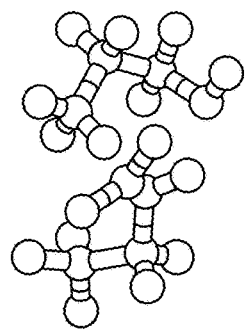
Figure 29F:
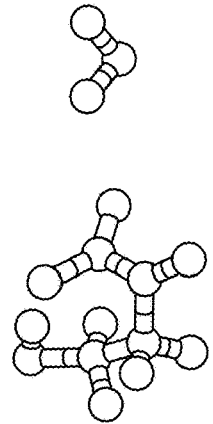
Figure 29F:
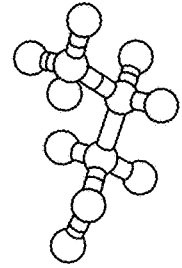
Figure 29F:
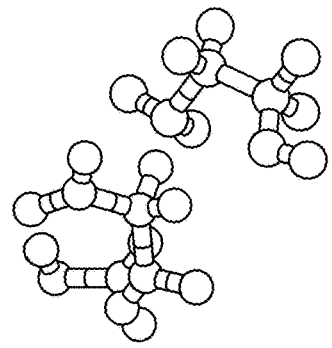
Figure 29F:
Figure 29F:
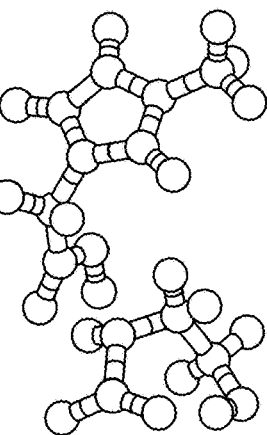
Figure 29F:
Figure 29F:
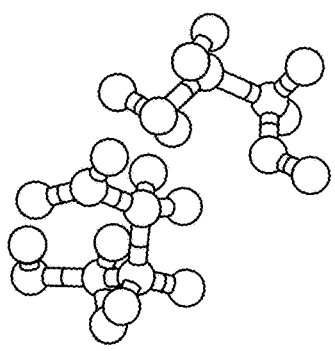
Figure 29F:
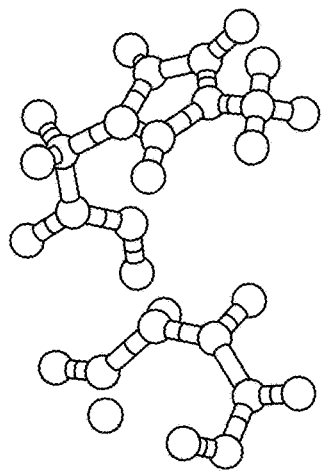
Figure 29F:
Figure 29G:
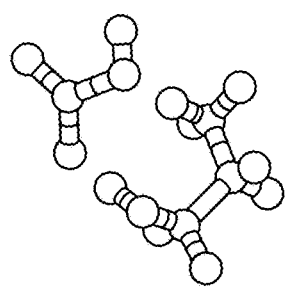
Figure 29G:
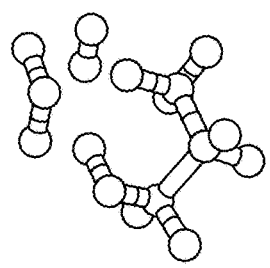
Figure 29G:
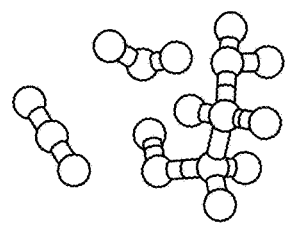
Figure 29H:
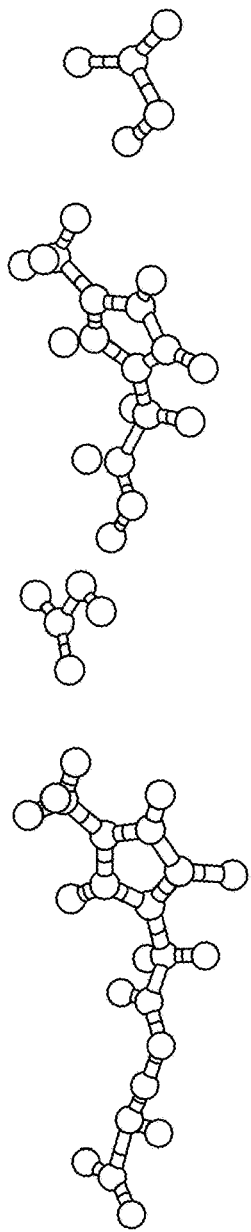
Figure 29H:
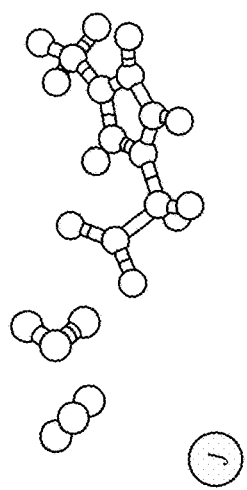
Figure 30:
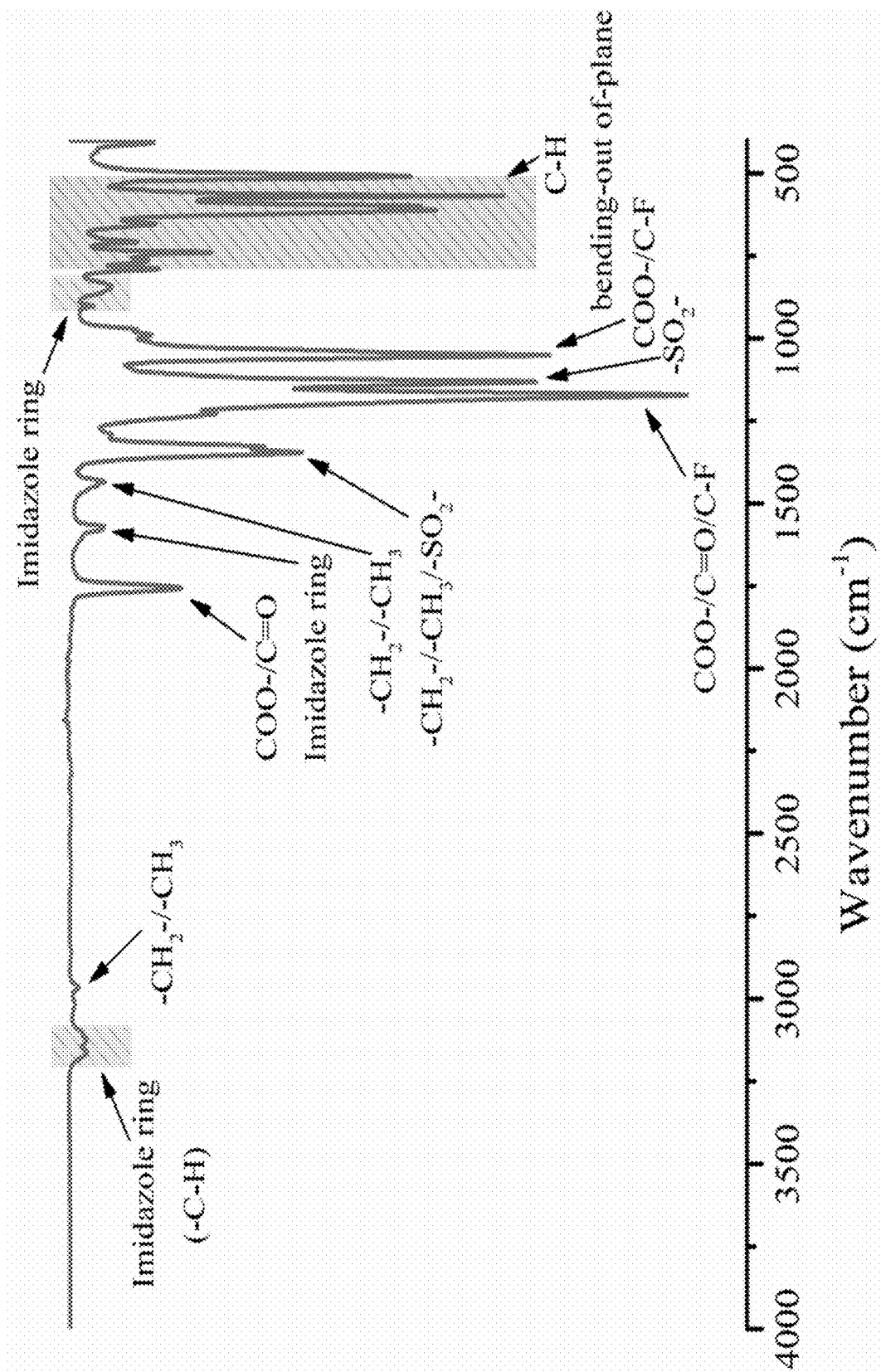
FIG. 30 is a pictorial representation of FT-IR spectrum of [EMmim][$NTf_2$], collecting with a Thermo Nicolet Magna-IR 760 spectrometer with a resolution of 4 cm$^{-1}$ by scanning 32 times from 4000 to 400 cm$^{-1}$.

For P2-R$_1$-WH$_{cat}$-MEA-CO$_2$-H$_2$O with the presence of mim$^+$COOH or [mimCH$_2$COO$^-$]$^+$, the CO$_2$ desorption can be very different from that in the uncatalyzed P2-R$_1$-WO$_{cat}$-MEA-CO$_2$-H$_2$O. The optimized geometries associated with the proton transfer reactions of ZW with [mimCH$_2$COOH]$^+$ or mim$^+$COOH, [NTF$_2$$^-$], H$_2$O and MEA are shown by way of example in FIG. 28A. In FIG. 28B, the reaction energy profiles for proton transfer reactions of ZW with [mimCH$_2$COOH]$^+$, [NTF$_2$$^-$], H$_2$O and MEA are shown. When taking protons from ZW, the order of ability in withdrawing protons is: MEA>[mimCH$_2$COO$^-$]$^+$ or mim$^+$COO$^-$>[NTf$_2$]$^-$ >H$_2$O. The activation energies for the proton transfer process could be considered as the index of basicity.

As shown in FIG. 27A-27D, mim$^+$COO$^-$ and [mimCH$_2$COO$^-$]$^+$ can be more effective than MEA-cat Complex in accelerating both HCO$_3$$^-$ formation for CO$_2$ absorption and HCO$_3$$^-$ decomposition into CO$_2$ in P2-R$_1$-WH$_{cat}$-MEA-CO$_2$-H$_2$O, the latter especially from a reaction energy perspective. As shown in FIG. 5B, the highest step reaction energy changes of P2-R$_1$-WH$_{cat}$-MEA-CO$_2$-H$_2$O are 32.5 kJ/mol and 31.5 kJ/mol for CO$_2$ absorption and CO$_2$ desorption, respectively, which are lower than those corresponding values in P2-R$_1$-WO$_{cat}$-MEA-CO$_2$-H$_2$O, 66.7 kJ/mol and 75.9 kJ/mol. This result indicates that the CO$_2$ desorption (the proton transfer process from MEAH$^+$ to $HCO_3^-$ in P2-WO$_{cat}$-MEA-CO$_2$-H$_2$O, or in the presence of water) in FIG. 5A can be a difficult step, which can be significantly facilitated by using [EMmim$^+$][NTF$_2^-$]. Clearly, MEA can be stronger than [mimCH$_2$COOH]$^+$ or mim$^+$COO$^-$ in withdrawing protons (FIG. 28A and FIG. 28B), thus the conjugated acid MEAH$^+$ can be weaker than [mimCH$_2$COOH]$^+$ or mim$^+$COO$^-$ in proton donation. It ise consistent with the computed results because the change of MEAH$^+$ to HCO$_3^-$ requires as high as 80.5 kJ/mol as marked in P2-R$_1$-WO$_{cat}$-MEA-CO$_2$-H$_2$O in FIG. 5B. However, with the presence of [EMmim$^+$][NTF$_2^-$], CO$_2$ desorption starts by the combination of HCO$_3^-$ (another major species in spent MEA solution) with [mimCH$_2$COOH]$^+$ or mim$^+$COOH. The step only needs 31.5 kJ/mol and forms CO$_2$ and H$_2$O as highlighted in FIG. 5B, which can be much easier than the formation of CO$_2$ and OH$^-$, as well as [mimCH$_2$COOH]$^+$ or mim$^+$COO$^-$, due to its higher activation energy (102 kJ/mol) when catalysts are not used. Then, the resultant [mimCH$_2$COOH]$^+$ or mim$^+$COO$^-$ and MEAH$^+$ can easily react and form mim$^+$COOH and MEA. The regenerated [mimCH$_2$COOH]$^+$H can continuously catalyze CO$_2$ desorption during CO$_2$ desorption, thus [EMmim$^+$][NTF$_2^-$] can be a very effective catalyst for CO$_2$ desorption the key step in reducing the overall energy consumption of CO$_2$ capture. Also, the regenerated MEA can be used for CO$_2$ absorption in the subsequent cyclic CO$_2$ capture.

The reactions in the desorption pathway with the use of [EMmim$^+$][NTF$_2^-$] are given below (P2-R$_{-1,1}$-WH$_{cat}$ occurs without the presence of water):

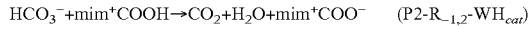

HCO$_3^-$+mim$^+$COOH→CO$_2$+H$_2$O+mim$^+$COO$^-$  (P2-R$_{-1,2}$-WH$_{cat}$)

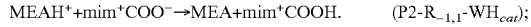

MEAH$^+$+mim$^+$COO$^-$→MEA+mim$^+$COOH.  (P2-R$_{-1,1}$-WH$_{cat}$);

or

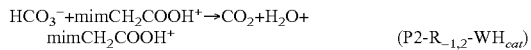

HCO$_3^-$+mimCH$_2$COOH$^+$→CO$_2$+H$_2$O+
mimCH$_2$COOH$^+$  (P2-R$_{-1,2}$-WH$_{cat}$)

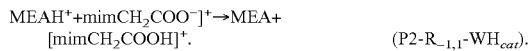

MEAH$^+$+mimCH$_2$COO$^-$]$^+$→MEA+
[mimCH$_2$COOH]$^+$.  (P2-R$_{-1,1}$-WH$_{cat}$).

Obviously, [mimCH$_2$COOH]$^+$ or mim$^+$COOH as a Brønsted acid or the core of the novel catalytic CO$_2$ capture process and the chemisorption based capture CO$_2$ technologies including liquid and solid based CO$_2$ capture technologies, can be necessary for initiating and driving P$_2$-R$_{-1}$-WH$_{cat}$, which further confirms the significant function of ultrasonic [EMmim$^+$][NTF$_2^-$] activation or formation of-[EMmim$^+$][NTF$_2^-$]. The electrophilic characteristic of mim$^+$ in mim$^+$COOH or [mimCH$_2$COOH]$^+$ can enhance the acidity of the COOH in [mimCH$_2$COOH]$^+$ or mim$^+$COOH via inductive effect, which can be desired for P2-R$_{-1,2}$-WH$_{cat}$ or formation of CO$_2$ and H$_2$O as well as mim$^+$COO$^-$ or [mimCH$_2$COOH]$^+$. The stable intermediate [mimCH$_2$COO$^-$]$^+$ or (mim$^+$COO$^-$) resulting from the inherent resonance effect existing in —COO$^-$ can be a conjugate base of [mimCH$_2$COOH]$^+$ or mim$^+$COOH, which can quickly react with Brønsted acid, MEAH$^+$ in P2-R$_{-1,1}$-WH$_{cat}$ for realization of MEA regeneration. Furthermore, the essential part of P2-R$_{-1,2}$-WH$_{cat}$ can be to convert HCO$_3^-$ into CO$_2$ and H$_2$O, which can be the common rate limiting step. Thus, [MAMmim$^+$][NTF$_2^-$] with the desired Brønsted acidity can be shown to be an highly effective organocatalyst for chemisorption based capture CO$_2$ technologies.

Consequently, the much quicker CO$_2$ desorption kinetics at low temperature enabled with the use of the catalyst can significantly advance the development of a new generation of CO$_2$ capture technology, from the perspectives of decreasing the parasitic penalty of these systems, capital investment, and environmental protection. The catalyst can make CO$_2$ capture much less demanding for high quality energy, and thus widely available low-temperature heat (e.g., those from solar collectors or waste heat) can be effectively used for CO$_2$ capture, which will not only lead to a significant decrease in parasitic energy penalty, capital and operating costs, but also be beneficial to the elimination of the secondary environmental pollutant resulting from MEA degradation during high-temperature CO$_2$ desorption of conventional CO$_2$ capture technologies. Therefore, [EMmim$^+$][NTF$_2^-$] can be a green transcendent catalyst for CO$_2$ capture technology.

5.0 Methods 5.1. Synthesis and Pre-Treatment of IL

The [EMmim$^+$][NTF$_2^-$] catalyst can be synthesized in accordance with the present disclosure, and the detailed synthesis information are presented as shown in FIG. 6.

(1) Synthesis of [CH$_2$COOCH$_3$mim$^+$]Br, [CH$_2$COOCH$_3$mim$^+$]Br can be synthesized by the reaction of 1-methylimidazole with methyl bromoacetate. In a typical experiment, methyl bromoacetate (0.155 mol) can be added dropwise to a solution of 1-methylimidazole (0.15 mol) in acetonitrile (150 ml) under nitrogen atmosphere. The mixture can be continuously stirred at room temperature until it can be thoroughly mixed, and then can be heated for 12 h at 55° C. The resulting solution can be evaporated under reduced pressure and can be repeatedly can be washed with ethyl acetate to remove excess methyl bromoacetate. After that, the above solution can be rotary evaporated under reduced pressure to obtain [CH$_2$COOCH$_3$mim$^+$]Br also referred to as [EMmim][Br]. The resultant material can be dried under vacuum for at least 24 h before use (31.6 g, yield 89.6%).

(2) Synthesis of [CH$_2$COOCH$_3$mim$^+$][NTF$_2^-$], [CH$_2$COOCH$_3$mim$^+$][NTF$_2^-$] can be prepared from metathesis reaction of [CH$_2$COOCH$_3$mim$^+$]Br with Li[NTF$_2^-$]. In a typical procedure, [CH$_2$COOCH$_3$mim$^+$]Br ([EMmim][Br]) (0.06 mol) can be mixed with equimolar amount of Li[NTF$_2^-$] in water (20 ml), and the mixture can be vigorously stirred for 4 h at room temperature. Then, the bottom phase can be repeatedly washed with water or deionized water to remove excess salt. After that, the resulting solution can be rotary evaporated under reduced pressure to obtain [CH$_2$COOCH$_3$mim$^+$][NTF$_2^-$] ([EMmim$^+$][NTF$_2^-$]). The IL can be dried under vacuum for at least 24 h before use (23.1 g, yield 88.3%).

The structure of the synthesized IL can be confirmed by $^1$H NMR, $^{13}$C NMR, FT-IR and ESI-MS spectrum (as shown in FIGS. 8-11B).

Figure 8:
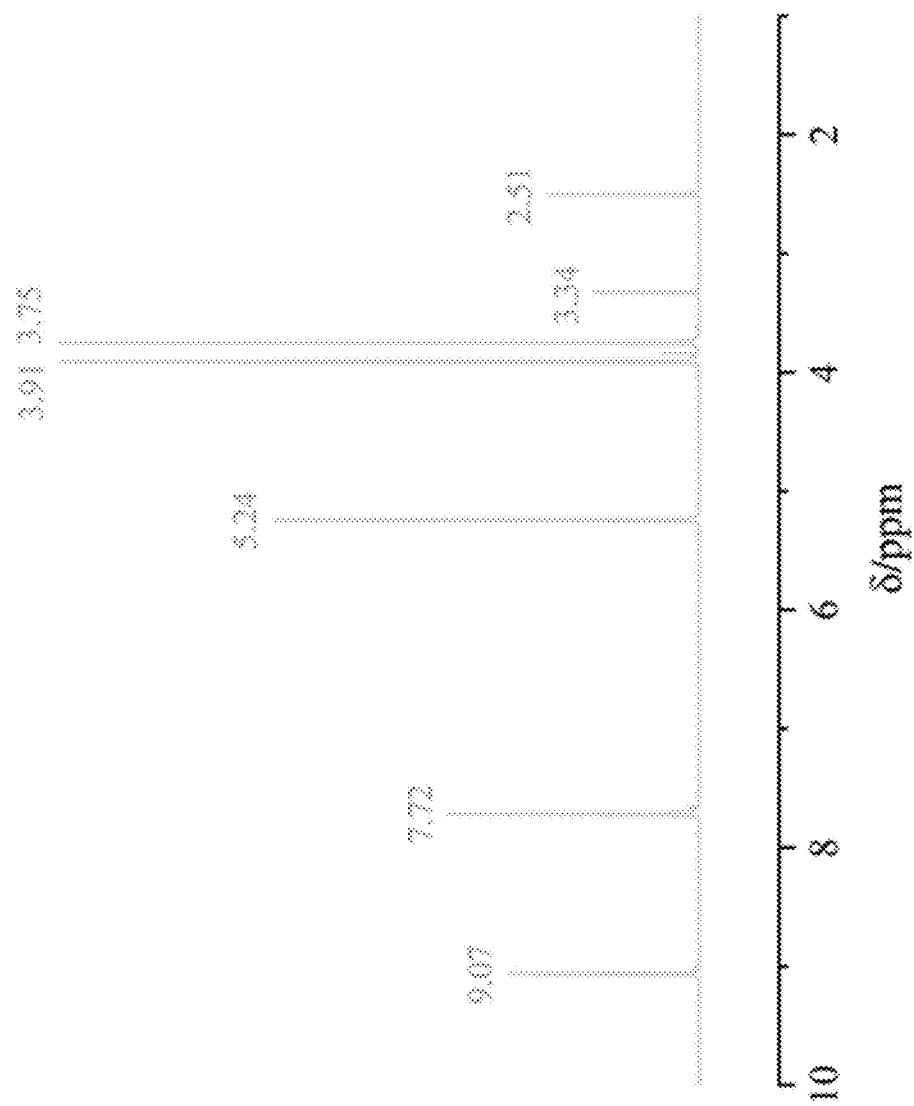
FIG. 8 illustrates $^1$H NMR spectrum of [EMmim$^+$][NTF$_2^-$]
Figure 9:
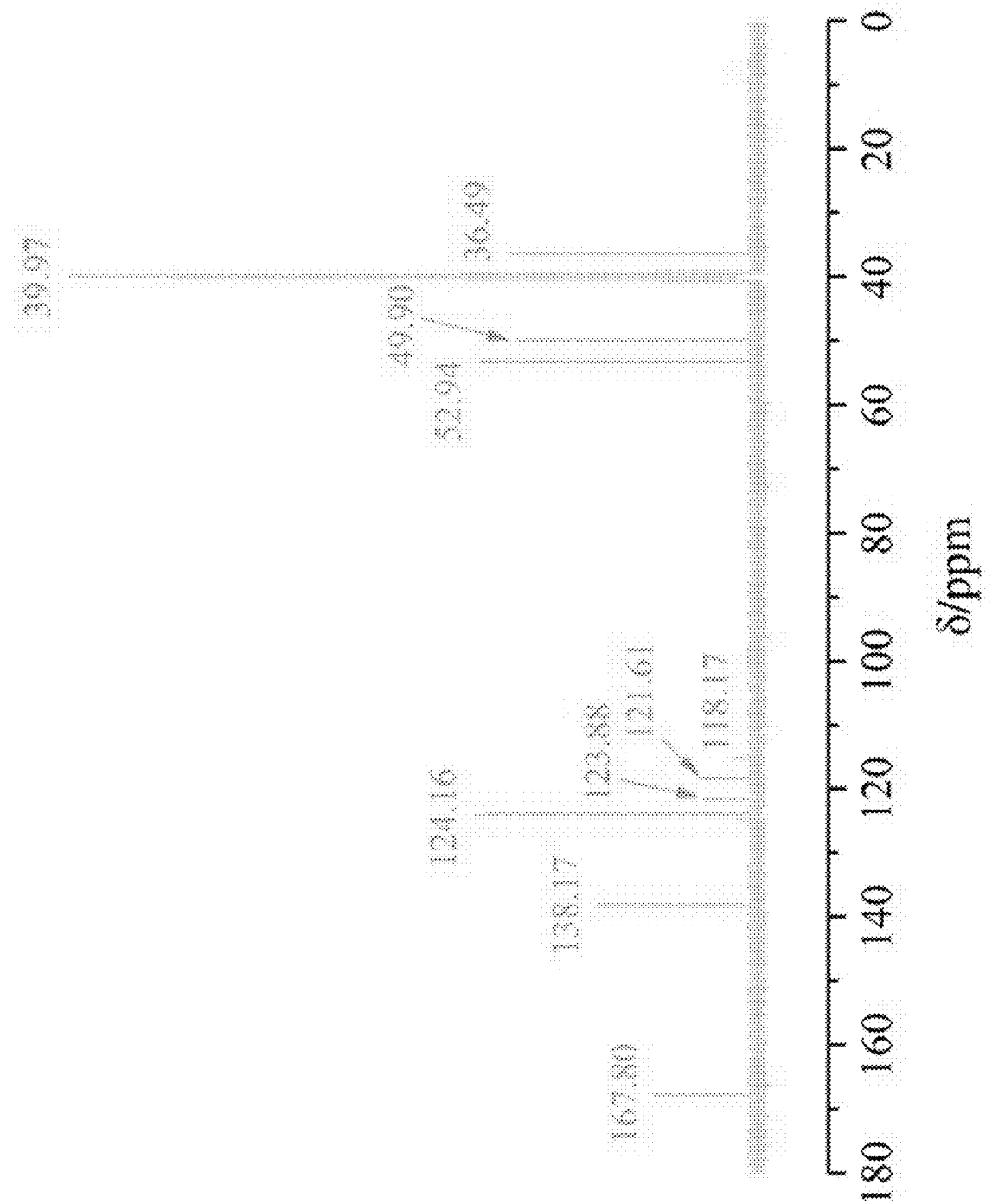
FIG. 9 illustrates $^{13}$C NMR spectrum of [EMmim$^+$][NTF$_2^-$]
Figure 10:
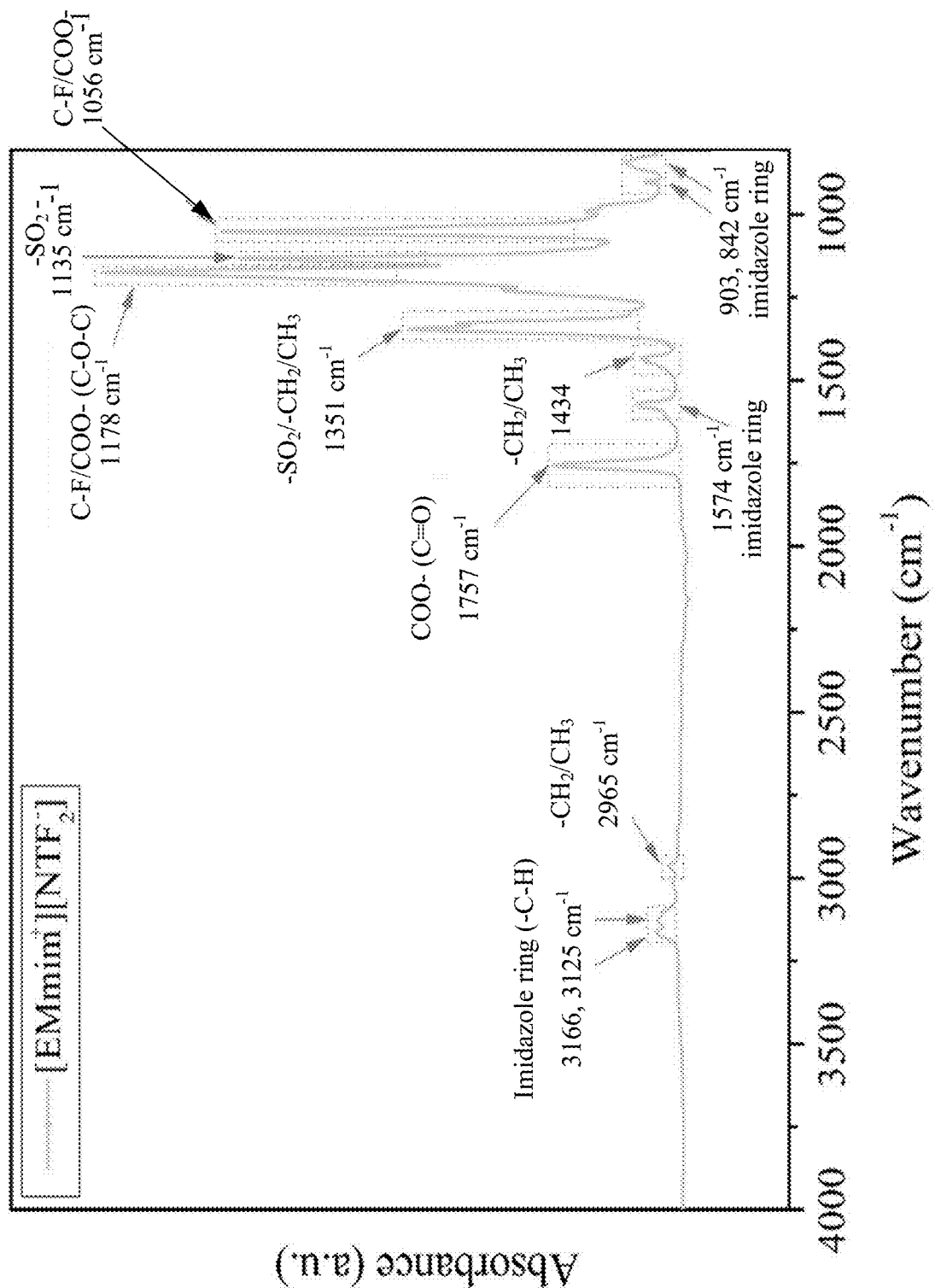
FIG. 10 illustrates FT-IR spectrum of [EMmim$^+$][NTF$_2^-$]

To further enhance the catalytic performance of the synthesized IL catalyst, the [EMmim$^+$][NTF$_2^-$] can be treated by ultrasonic treatment with the different conditions at room temperature (Powersonic P1100D-45, Advanced Ceramics Technology (M) SDN. BHD.), and then used for the catalytic CO$_2$ capture process. Structures of the synthesized IL were confirmed by $^1$H NMR, $^{13}$C NMR, FT-IR and ESI-MS spectra in FIGS. 8, 9, 11A, 11B and 30, respectively. Where, specifically, in accordance with aspects of the present disclosure, FIG. 8 shows data of the $^1$H NMR (Bruker spectrometer, 400 MHz, d6-DMSO) spectrum of [EMmim][NTf$_2$] is δ 9.07 (s, 1H, H2), 7.72 (s, 2H, H4 and H5), 5.24 (s, 2H, H6), 3.91 (s, 3H, H8), 3.75 (s, 3H, H3). Where, specifically, in accordance with aspects of the present disclosure, FIG. 9 shows data of the $^{13}$C NMR (Bruker spectrometer, 400 MHz, d6-DMSO) spectrum of [EMmim]

Figure 11A:
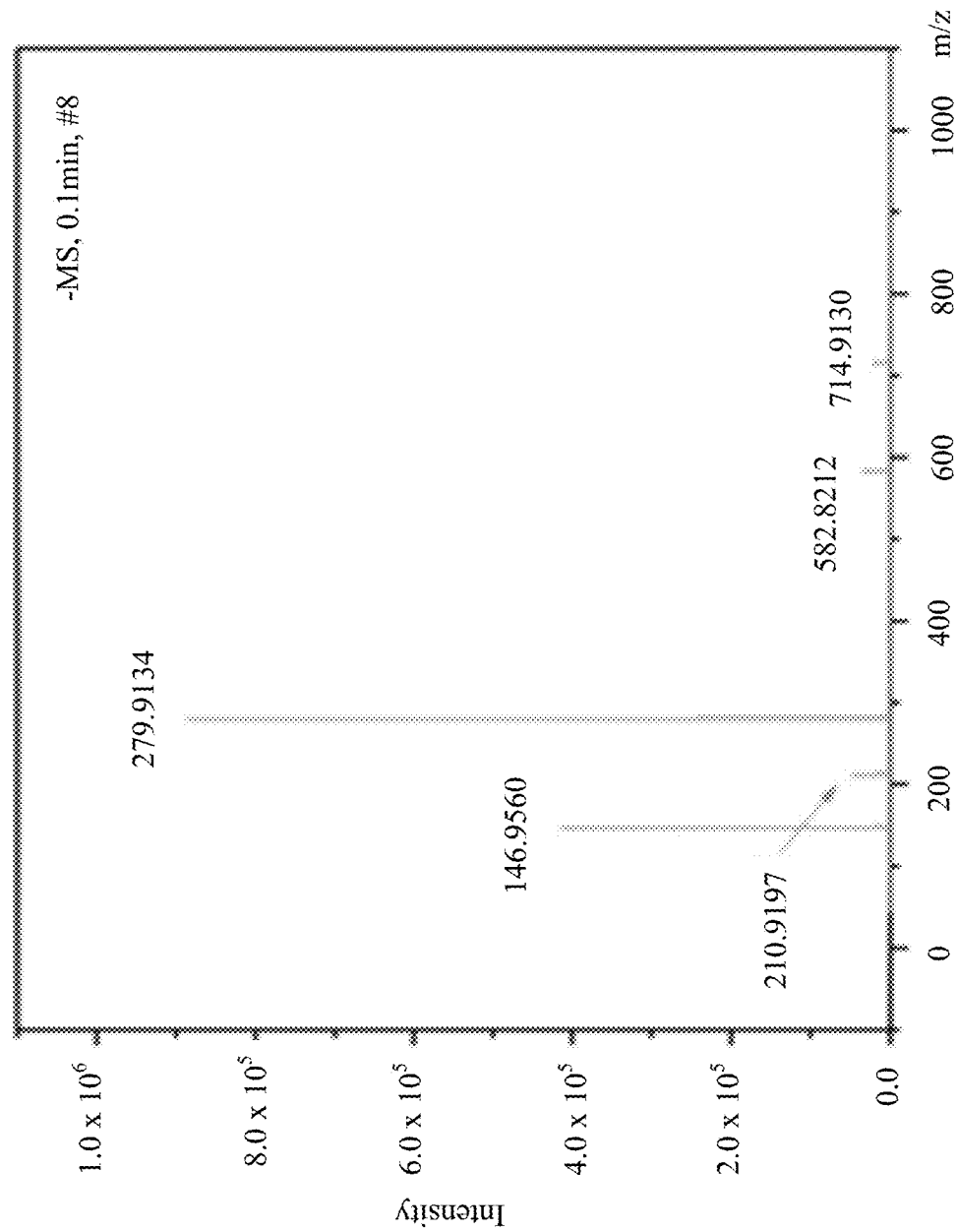
FIG. 11A illustrates an ESI-MS spectrum of [EMmim$^+$][NTF$_2^-$]
Figure 11B:
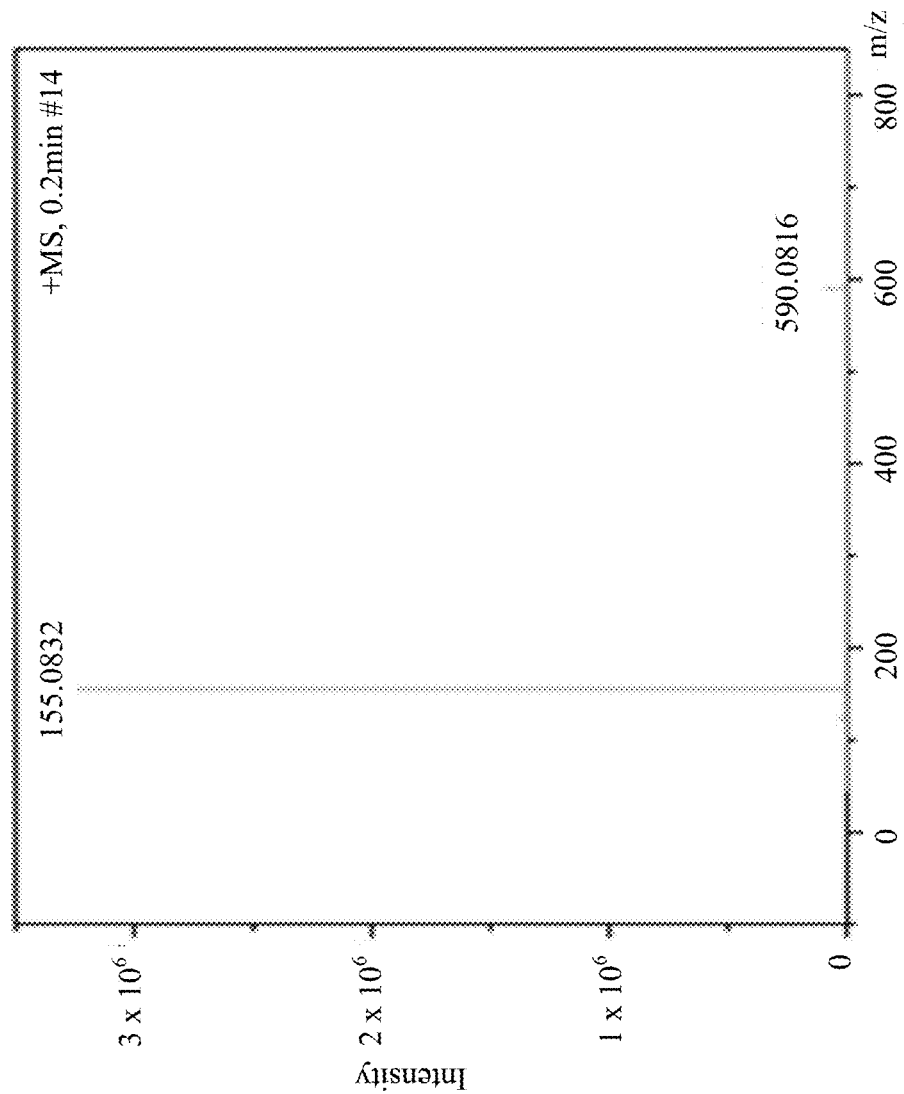
FIG. 11B illustrates another ESI-MS spectrum of [EMmim$^+$][NTF$_2^-$]

[NTf$_2$]: δ36.49 (C3), 49.90 (C8), 52.94 (C6), 118.17, 121.61 (C9), 123.88, 124.16 (C4, C5), 138.17 (C2), 167.80 (C7). And, where, specifically, in accordance with aspects of the present disclosure, FIG. 8 shows as further illustrated in FIG. 30, the FT-IR spectrum of [EMmim][NTf$_2$] collects with a Thermo Nicolet Magna-IR 760 spectrometer with a resolution of 4 cm$^{-1}$ by scanning 32 times from 4000 to 400 cm$^{-1}$. Moreover, as shown in FIGS. 11A-11B, the ESI-MS spectrum of [EMmim][NTf$_2$] may present m/z=155.1 for [EMmim]+ in FIG. 11A, and m/z=279.9 for [NTf$_2$]− in FIG. 11B, which the ESI-MS spectrum was obtained, by way of example, by ultra-high-resolution electro-spray time-of-flight mass spectrometry (Bruker micro TOF II, Germany).

5.2. Characterizations $^1$H NMR and $^{13}$C NMR spectra were recorded on a Bruker spectrometer (400 MHz) in DMSO. ESI-MS spectrum can be obtained by Ultra-high-resolution electro-spray time-of-flight mass spectrometry (Bruker microTOF II, Germany). FT-IR spectra were collected using a Thermo Nicolet Magna-IR 760 spectrometer with a resolution of 4 cm$^{-1}$ by scanning 60 times from 400 to 4000 cm$^{-1}$. Raman spectrum measurements were conducted using an Advantage 785 Raman Spectrometer with a 758 nm laser and up to 60 mW radiation power during determination. About 1.5 mL liquid sample can be introduced into a clear shell vial, and then use for the Raman test. Thermogravimetric analyses (TGA) curve of IL can be obtained using a TA Instruments SDT Q600 apparatus with a heating ramp of 10° C./min at the temperature of 20-550° C.

The Brønsted acid sites of the IL can be monitored using the Hammett function (H$_0$) which obtained by UV-Vis spectroscopy technique. The 4-nitroaniline solution (25 μm) can be employed as an basic indicator to trap the dissociated acidic protons of the [EMmim$^+$][NTF$_2^-$] in water following the published method. The acidity parameter H$_0$ can be calculated using the following equation (1).

$$H_0 = pKa + \log([I]/[IH^+]) \quad (1)$$

where pKa can be 0.99 for the aqueous 4-nirtoaniline solution, [I] and [IH$^+$] respectively represent the molar concentrations of the unprotonated and protonated forms of the 4-nirtoaniline in the aqueous solution. The absorbance of the indicator and the indicator with [EMmim$^+$][NTF$_2^-$] solution can be measured using a spectrophotometer (SpectraMax M2$^e$, CA, USA) at wavelength from 250 to 500 nm. The maximum absorbance of the samples can be found at 380 nm (aqueous 4-nirtoaniline solution).

5.3. CO$_2$ Absorption-Desorption Test

Figure 12A:
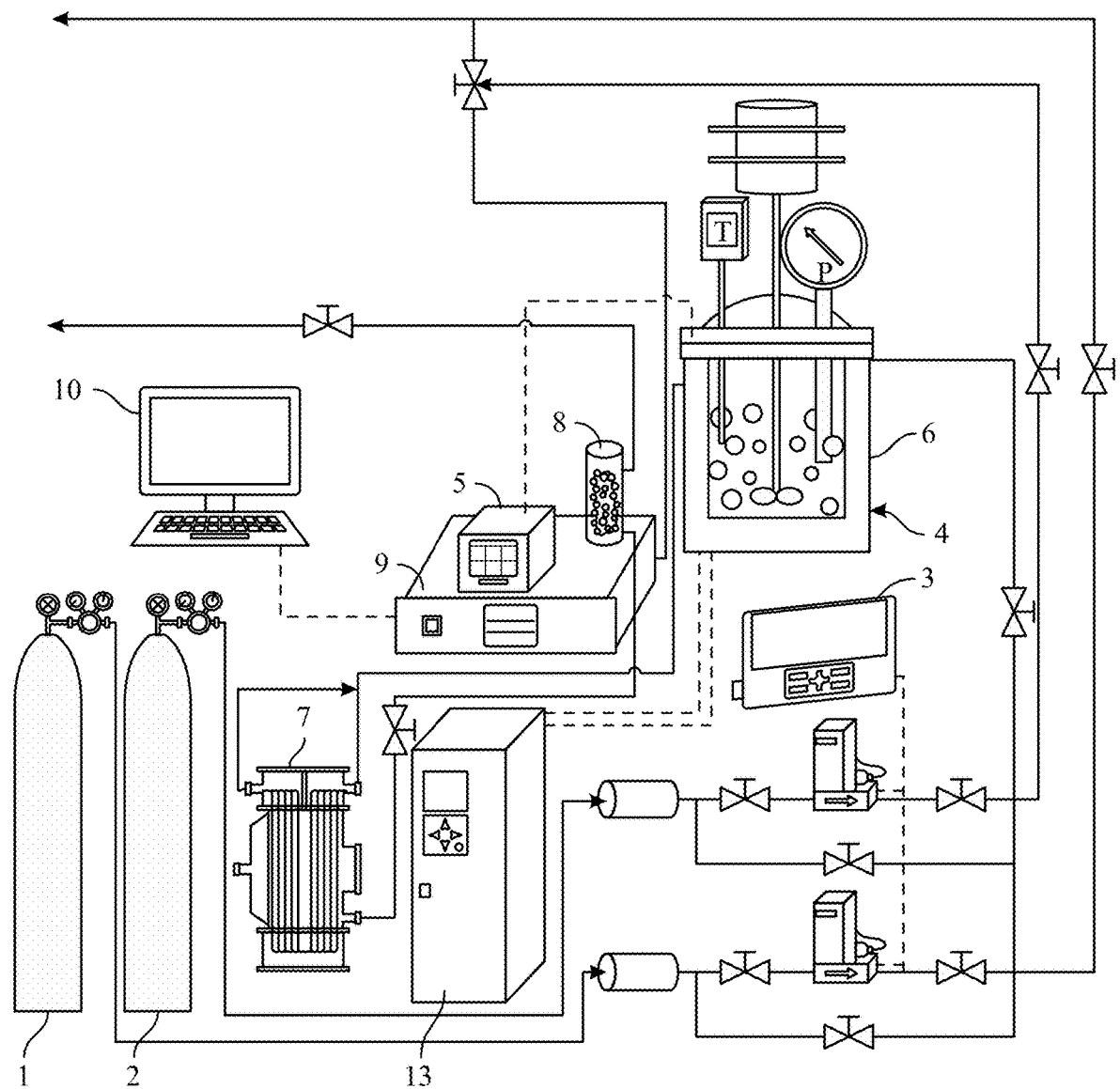
FIG. 12A provides a diagram of $CO_2$ desorption setup (1: $N_2$ cylinder; 2: Mixed gas ($CO_2$, $N_2$ and $O_2$) cylinder; 3: mass flow controller; 4: thermostatic water bath; 5: data recording unit; 6: stirred tank reactor; 7: condenser; 8: desiccator; 9: mass spectrometer; 10: data analyzing computer)
Figure 12B:
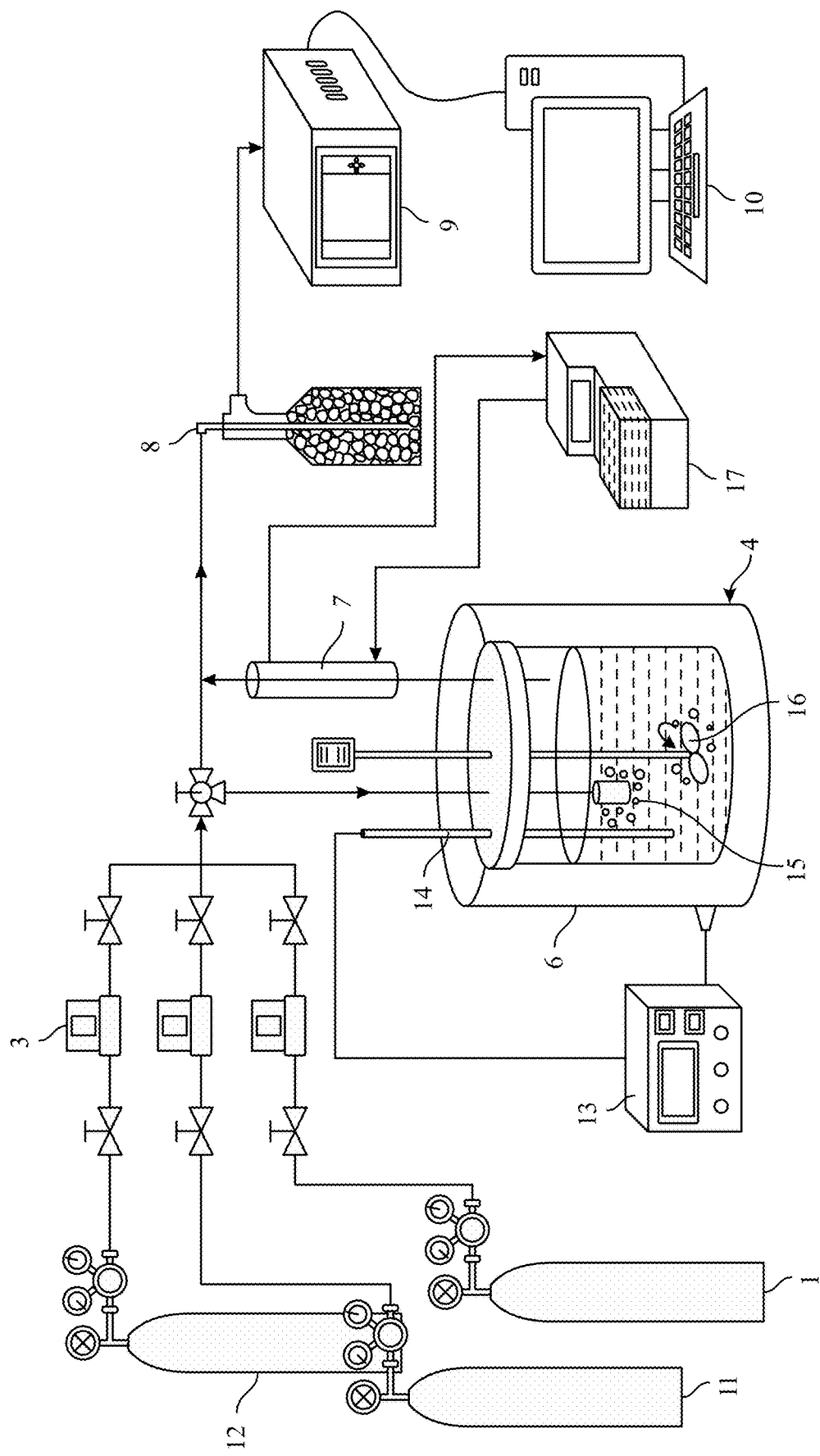
FIG. 12B is another schematic representation of a $CO_2$ absorption and desorption experimental setup in accordance with an exemplary aspect of the present disclosure.
Figure 13A:
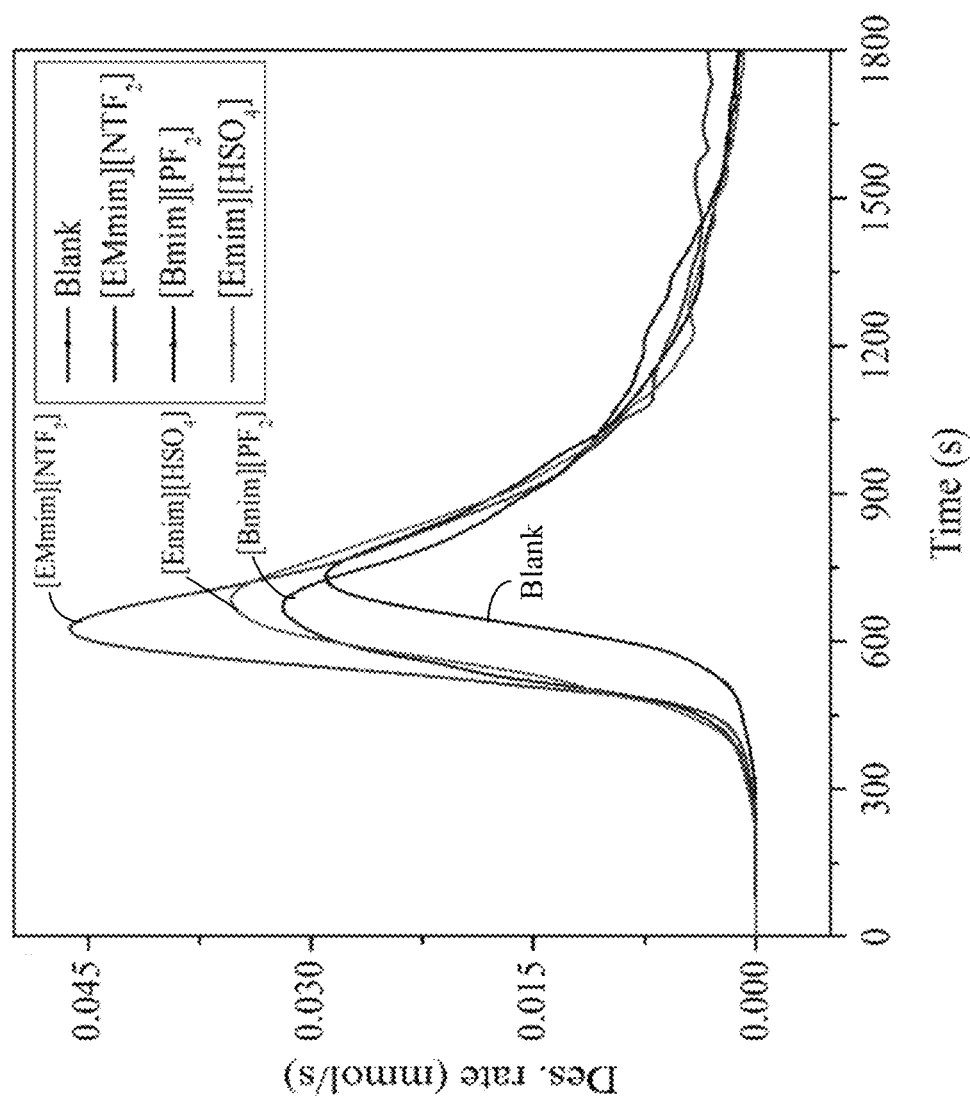
FIG. 13A provides graphs illustrating the effect of IL catalyst types ([EMmim$^+$][NTF$_2^-$], [Bmim$^+$][PF$_6^-$] and [Emim$^+$][HSO$_4^-$]) on catalytic $CO_2$ desorption (des.) performance.
Figure 13B:
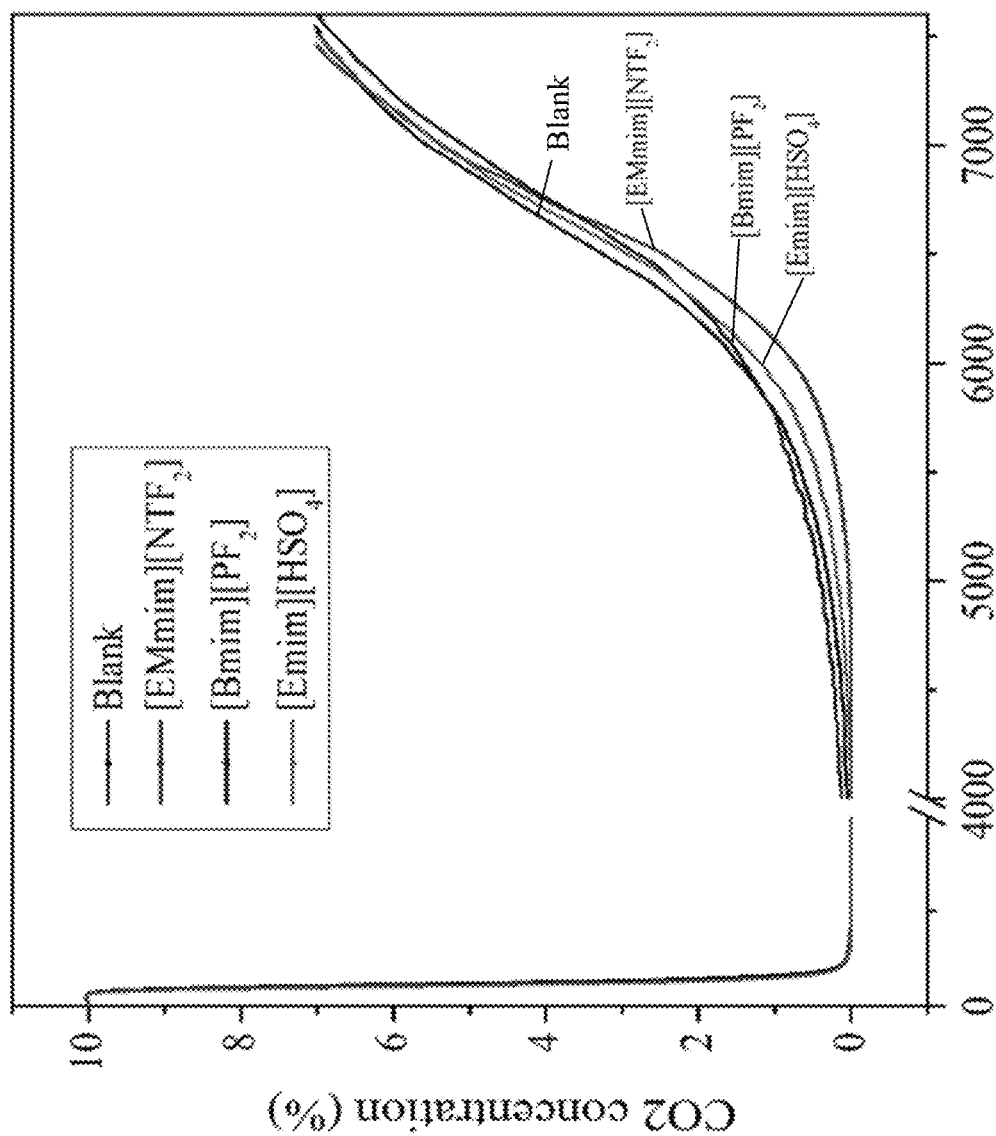
FIG. 13B provides graphs illustrating the effect of IL catalyst types ([EMmim$^+$][NTF$_2^-$], [Bmim$^+$][PF$_6^-$] and [Emim$^+$][HSO$_4^-$]) on catalytic $CO_2$ absorption performance.

The CO$_2$ absorption-desorption test can be carried out using the experimental apparatus presented in FIGS. 12A and 12B. 250 mL three-necked flask can be employed as a reactor. 100 mL of 20 wt % aqueous MEA (99+%, product number: 11016-7-4L, Aldrich chemical company, Inc.) solution with desired quality of IL catalyst were added for each test. The first run of CO$_2$ absorption process was conducted at 30° C. and atmospheric pressure (0.78 bar at Laramie, Wyo., USA, where the experiment was conducted), while the cyclic tests were conducted at 22° C. (room temperature). The 20 wt % MEA solution can be obtained by diluting pure MEA solvent with DI-water. CO$_2$ absorption process can be conducted at 30° C. and atmospheric pressure. The simulated flue gas containing 10 vol % CO$_2$, 10 vol % O$_2$ and 80 vol % N$_2$ with a flow rate of 500 mL/min can be bubbled into amine solution sing the inlet gas 15. (Gas flow can be calibrated at local atmospheric pressure: 0.78 bar at Laramie). The N$_2$ gas is kept in the N$_2$ gas cylinder 1, the O$_2$ gas may be housed in the O$_2$ gas cylinder 12 or stored in the mixed gas cylinder 2. The CO$_2$ gas may be housed in the CO$_2$ gas cylinder 11 or the mixed gas cylinder 2 along with the O$_2$. Other gases may be housed in their own cylinders or in the mixed gas cylinder 2. The gas flow from each cylinder may be controlled through the mass flow controller 3. The outlet gas concentration can be monitored with an inline gas analyzer 5 (NDIR ZRE, California Analytical Instruments) or flue gas analyzer 5, and then recorded using a data recording unit 5 and sent to a data analyzing computer 10. The quality of absorbed CO$_2$ in the MEA solution can be calculated by integrating the obtained CO$_2$ absorption curves (CO$_2$ concentration vs. absorption time). For the fresh MEA solution absorbed CO$_2$ process, when the desired amount of absorbed CO$_2$ can be obtained (178.0 mmol), the absorption process can be stopped. Absorption time for the first run test was 7800 s and that for each cyclic test was 1800 s.

Upon the finish of the CO$_2$ absorption experiment, the temperature of the MEA solution, housed in a furnace 6 of a thermostatic water bath system 4, can be gradually heated to 85° C. using a thermocouple 14 controlled by a temperature controller 13. During the desorption process, the released CO$_2$ can be carried by the N$_2$ gas with the flow rate of 500 mL/min from the reaction system to the gas analyzer. Each CO$_2$ desorption process can be duration for 1,800 s. A magnetic stirring 16 or mechanical stirring can be used to make the MEA solution and catalyst uniform. A condenser 7 with a cooling water (5° C.) can be connected with the three-necked flask to avoid the loss of MEA solution. A cooling unit 17 may be operatively connected to the condenser 7 to cool the condenser 7 or control the temperature. Moisture is removed by the moisture remover 8 prior to being sent to the flue gas analyzer 5 or the mass spectrometer 9.

5.4. Theoretical Studies

Density functional theory (DFT) studies on catalytic mechanism of CO$_2$ absorption and desorption processes are performed by means of Dmol$^3$ program in Materials studio 6.0 package. The exchange correlation functional utilized can be the local density approximation with Perdew-Burke-Ernzehof, known as GGA-PBE, and a double numerical basis set with polarization function on all atoms (the DNP basis set) can be used throughout the study. The following thresholds are used for the geometry optimization: 1×10$^5$ Hartree for the maximum energy change, 2×10$^{-3}$ Hartree/Å for the maximum force, and 5×10$^{-3}$ Å for the maximum displacement. The complete linear synchronous transit and quadratic synchronous transit (LST/QST) calculations are performed to obtain the structures of transition state. Vibrational frequencies are calculated at the optimized geometries to identify the nature of the stationary points (no imaginary frequency) and the transition state (only one imaginary frequency). Bond dissociation energy of A-B bond can be calculated as follow:

$$BDE(A\text{-}B) = Energy(A) + Energy(B) - Energy(A\text{-}B).$$

FIG. 29 provides graphs illustrating all the configurations, including reactants, intermediate, such as complexes, transition states and products listed in the Figures.

The disclosure is not to be limited to the particular aspects described herein. In particular, the disclosure contemplates numerous variations in ultrafast catalytic CO$_2$ capture catalyzed by a novel ultrasound-treated ionic liquid. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

What is claimed is:

1. An ionic liquid catalyst for catalytic $CO_2$ capture, the ionic liquid catalyst comprising:
    a catalytic amine configured to capture $CO_2$;
    an ionic liquid;
    wherein the ionic liquid reacts with the catalytic amine to produce an ionic liquid catalyst;
    wherein the ionic liquid catalyst is selected from the group of $[EMmim^+][NTF_2^-]$ based catalysts;
    wherein the ionic liquid catalyst is configured to capture $CO_2$.

2. The ionic liquid catalyst of claim 1, wherein the catalytic amine is monoethanolamine.

* * * * *